H. HOPKINS.
CALCULATING MACHINE.
APPLICATION FILED APR. 9, 1906.

1,336,904.

Patented Apr. 13, 1920.
37 SHEETS—SHEET 1.

Attest
Lenore Wilson
A. J. McCauley.

Inventor
Hubert Hopkins.
by Bakewell Cornwall
Att'ys.

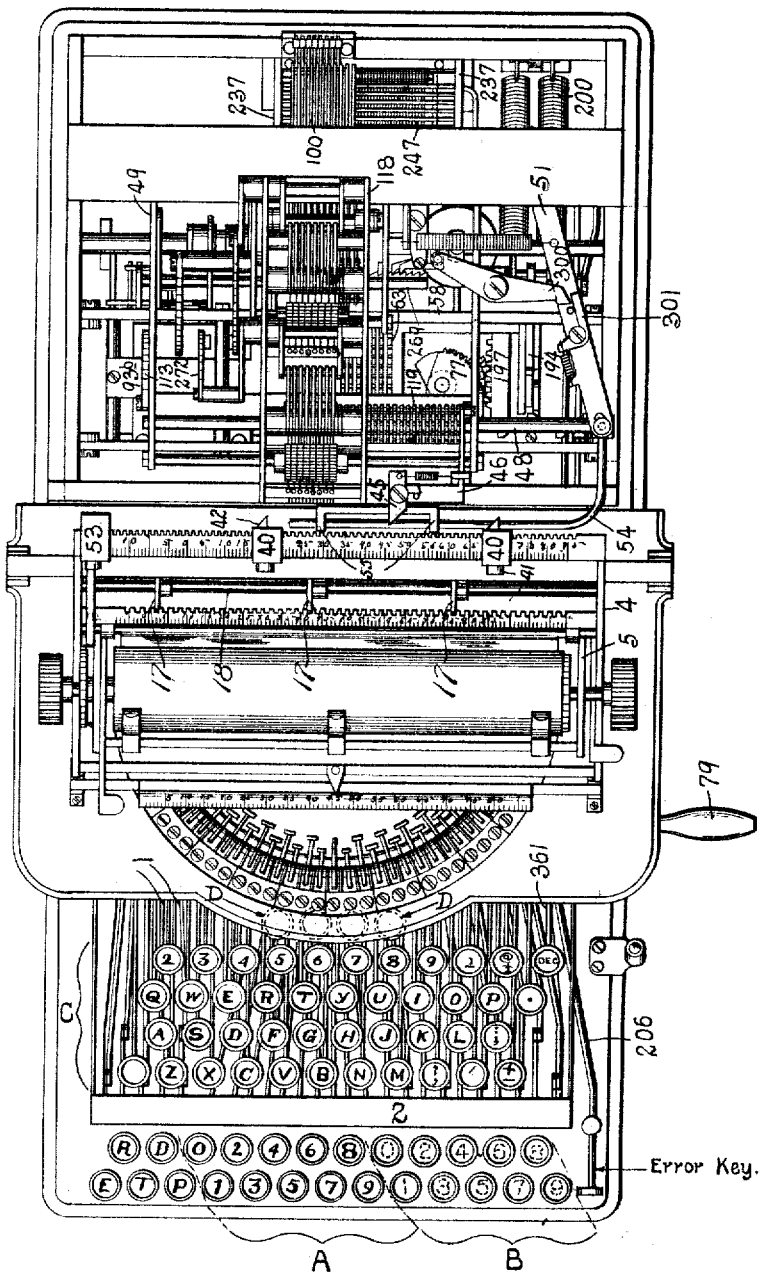

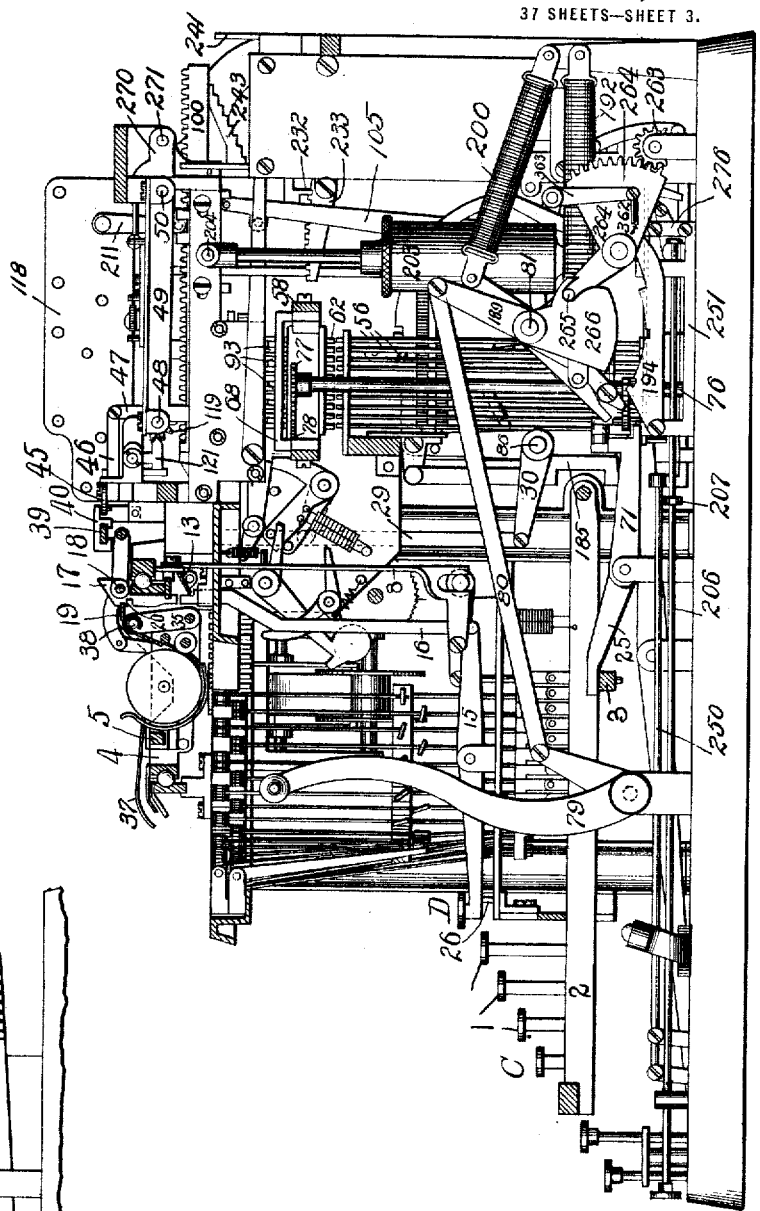

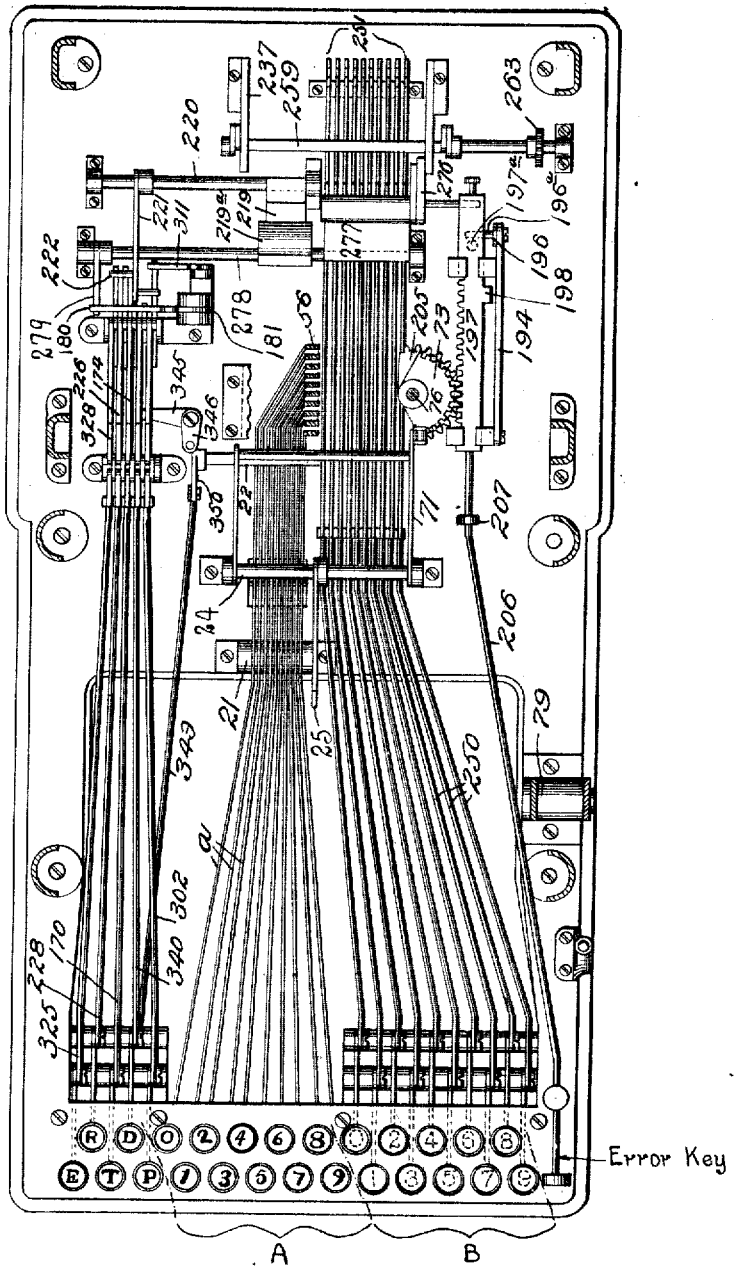

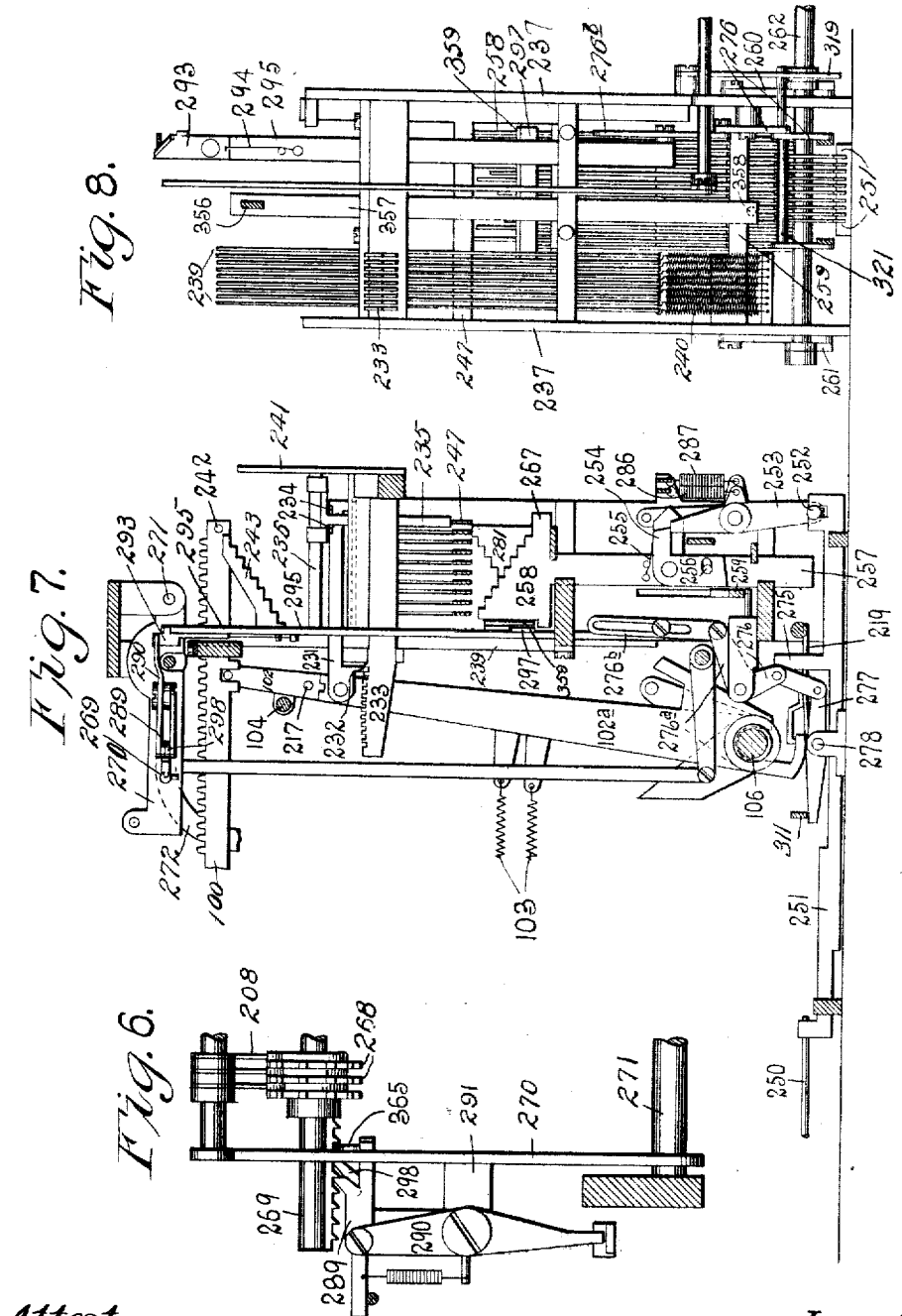

H. HOPKINS.
CALCULATING MACHINE.
APPLICATION FILED APR. 9, 1906.
1,336,904.
Patented Apr. 13, 1920.
37 SHEETS—SHEET 6.
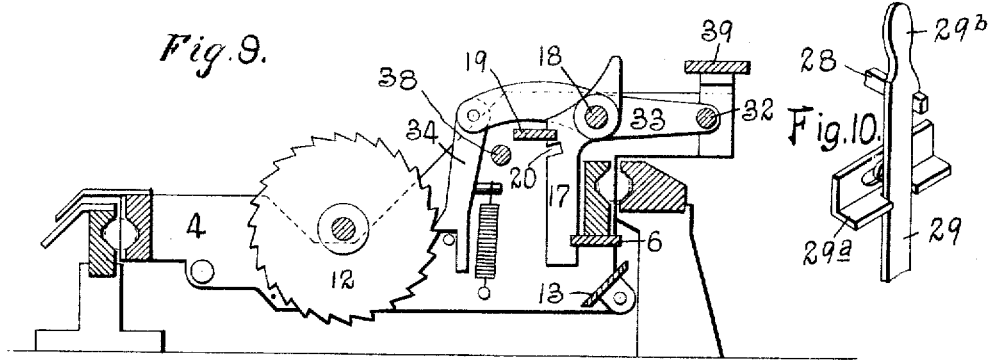
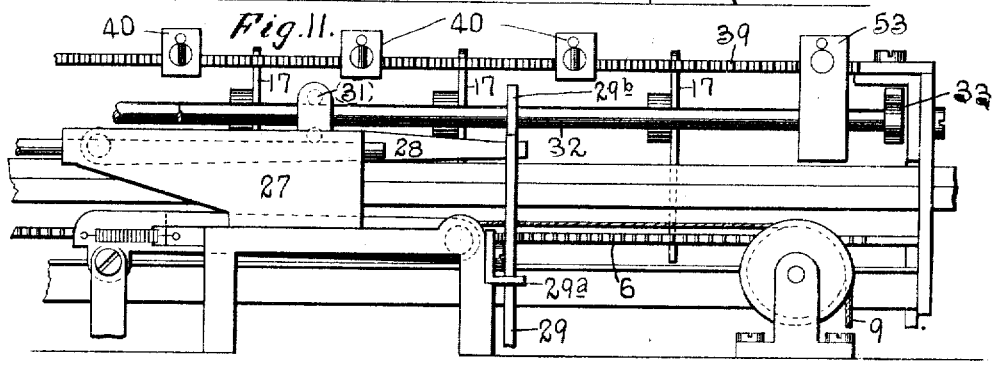
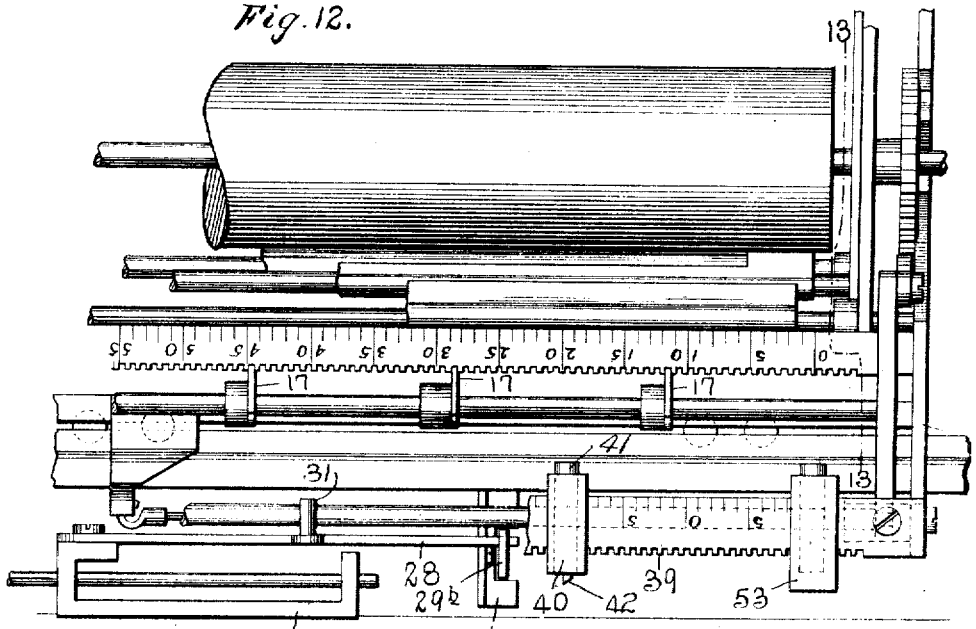
Attest
Lenore Wilson
A. J. McCauley
Inventor
Hubert Hopkins.
by Bakewell Cornwall Att'ys

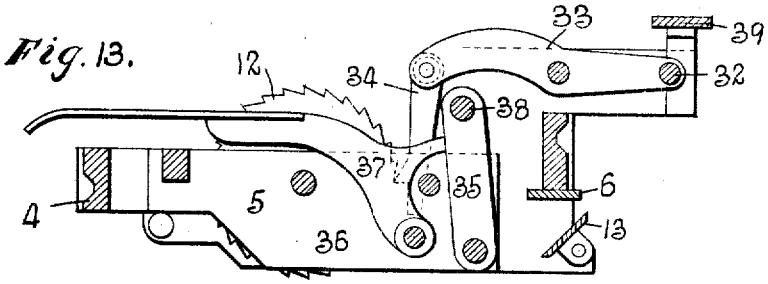
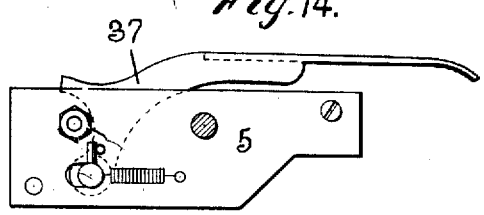
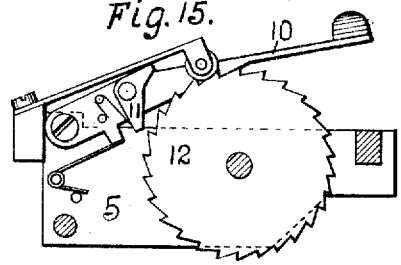
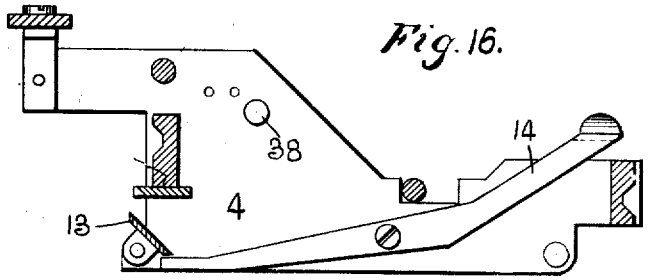
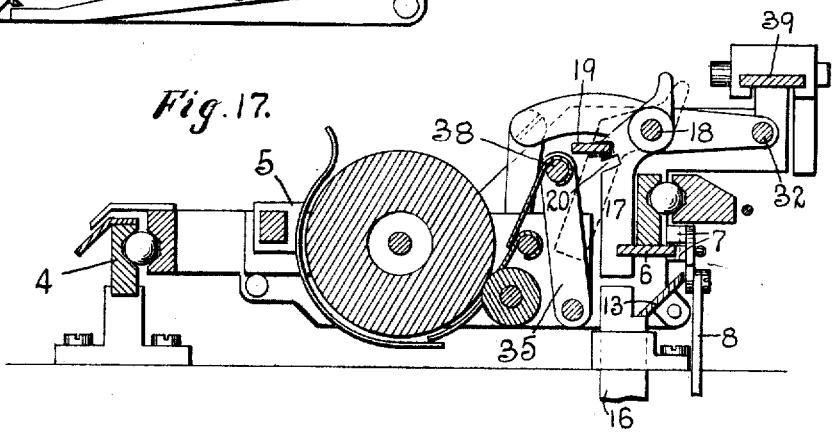

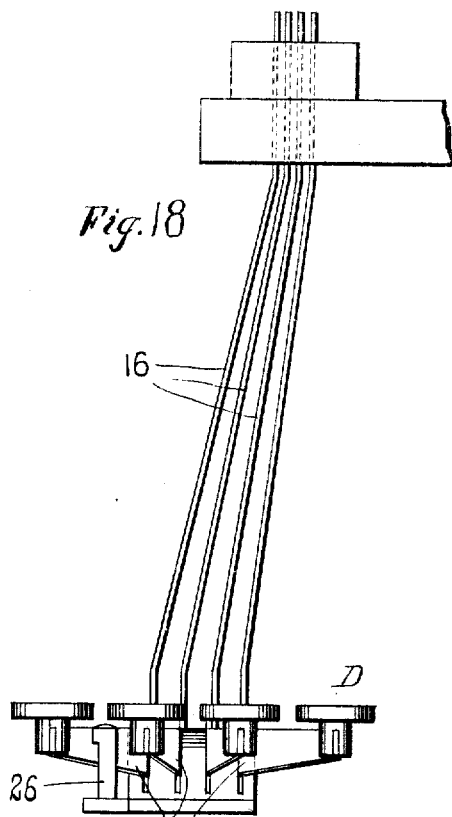
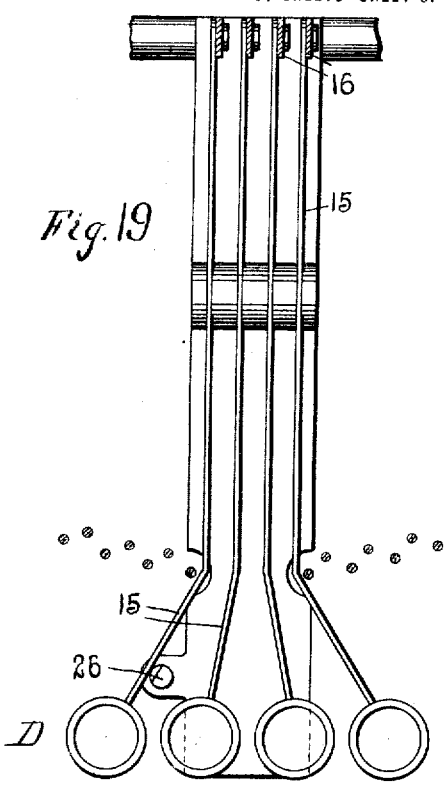
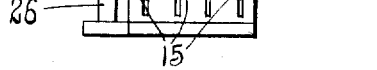
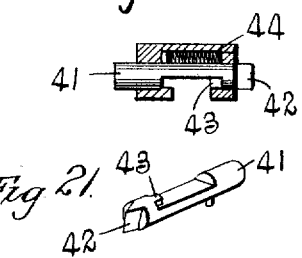
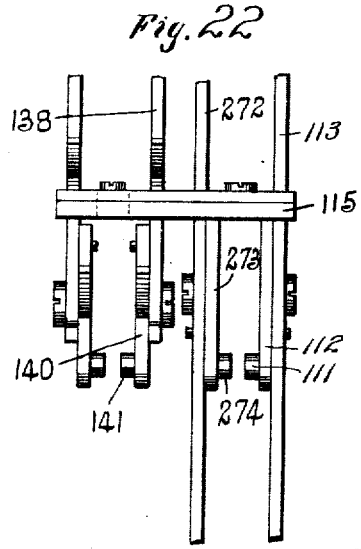

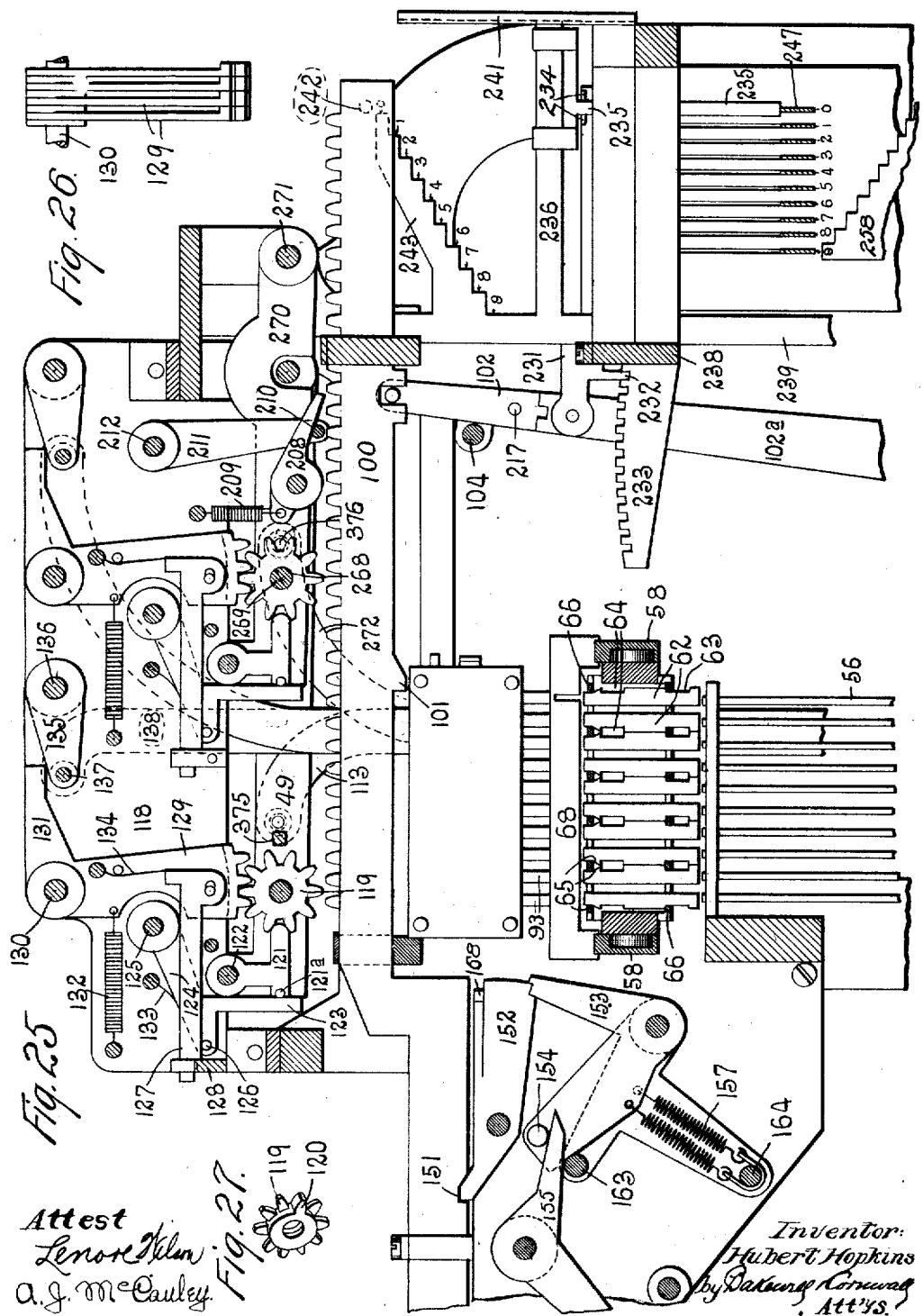

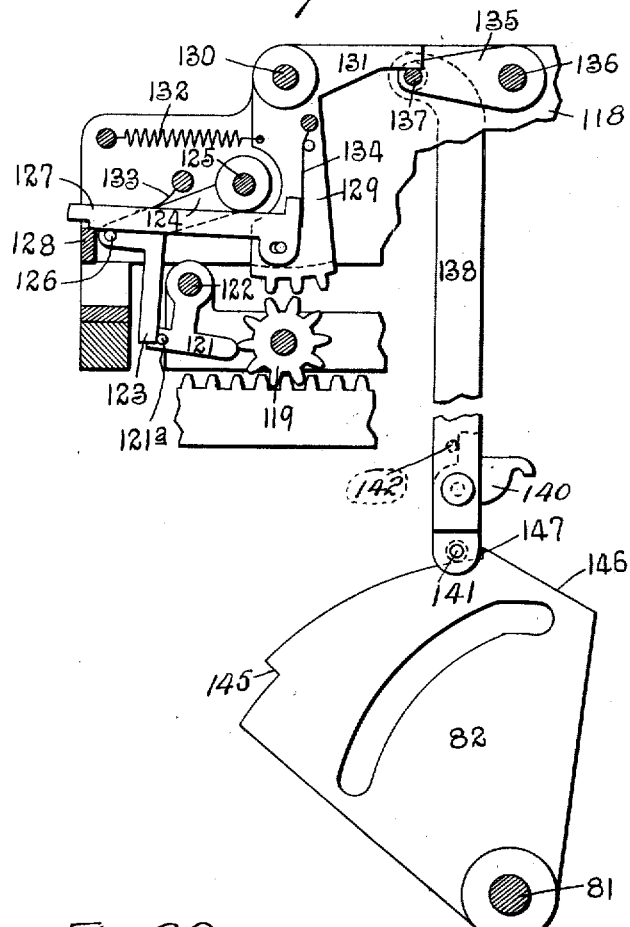
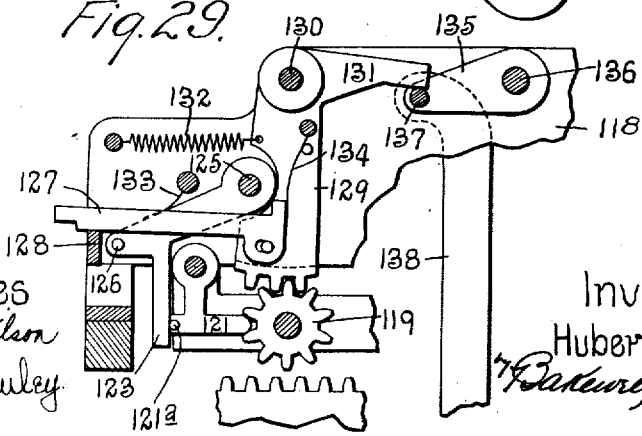

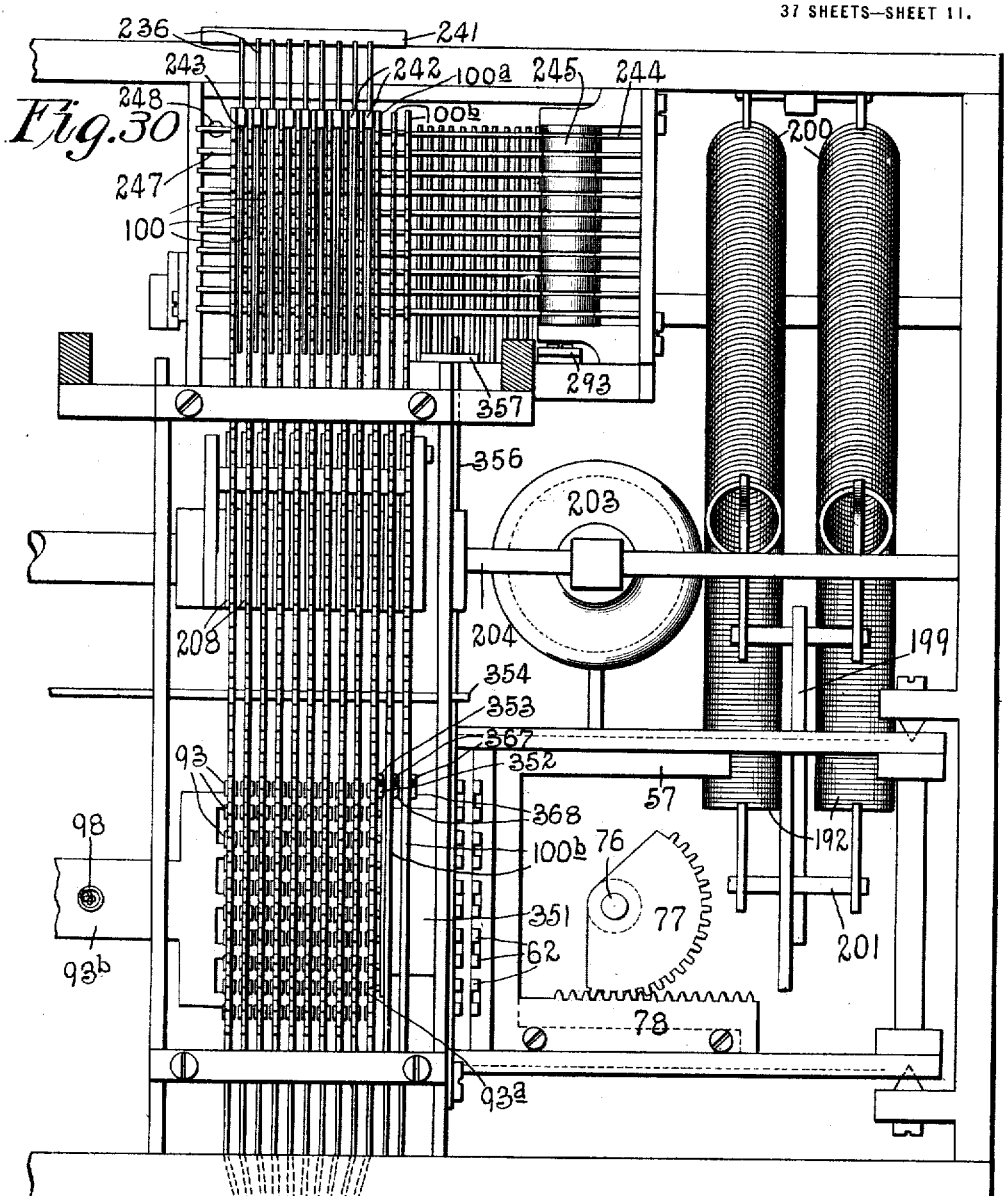
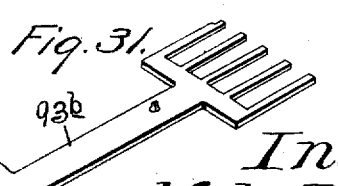

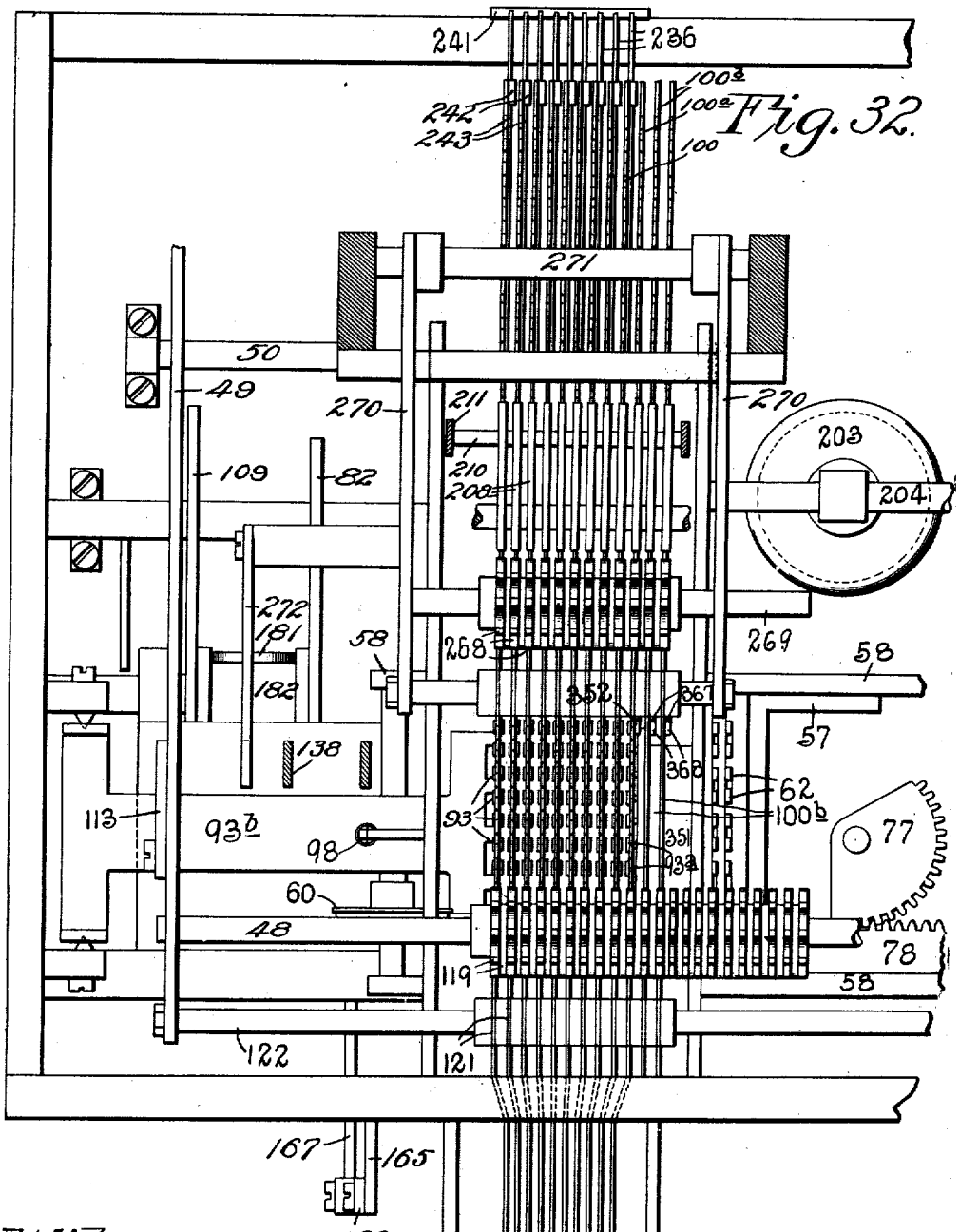

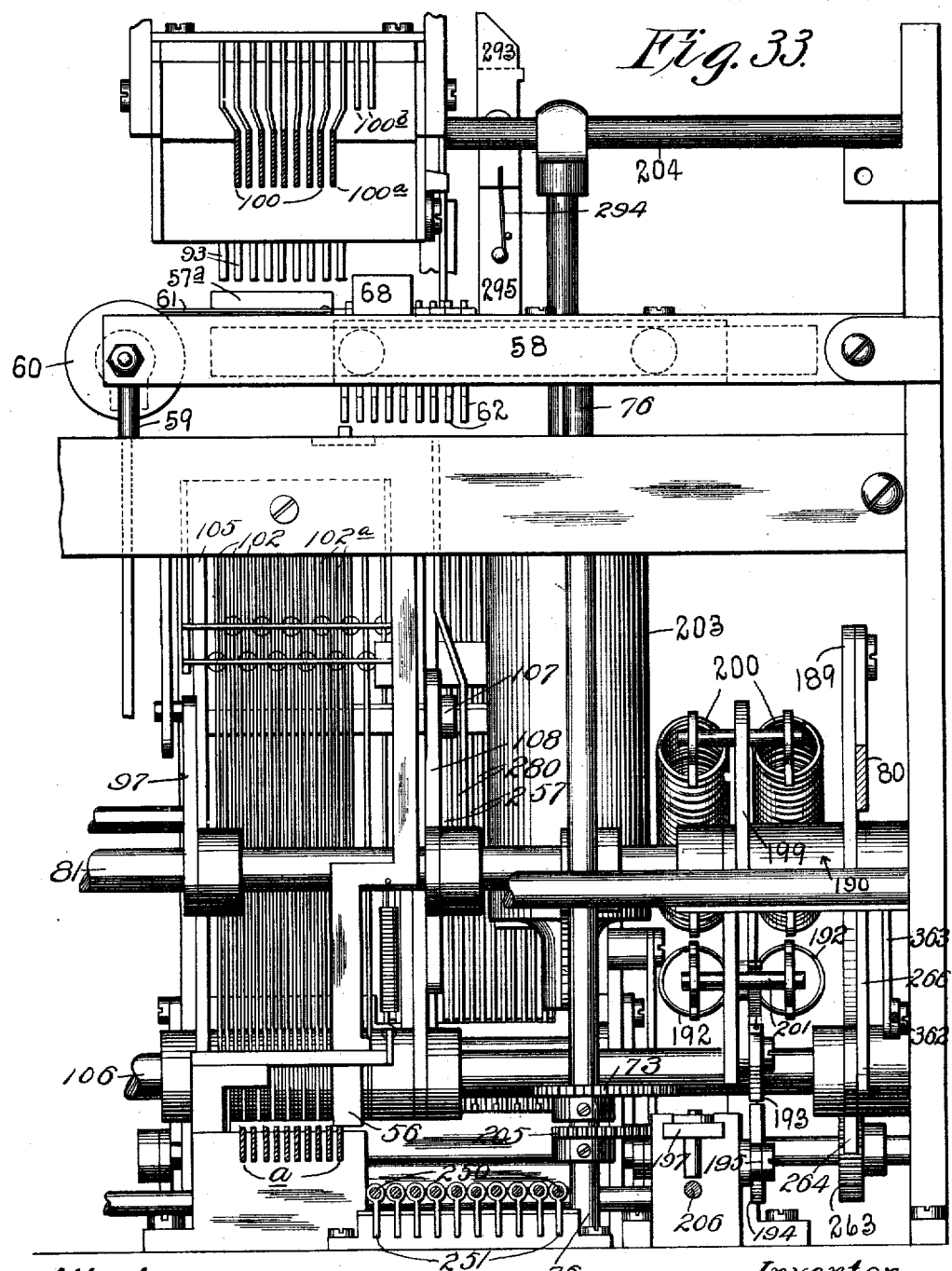

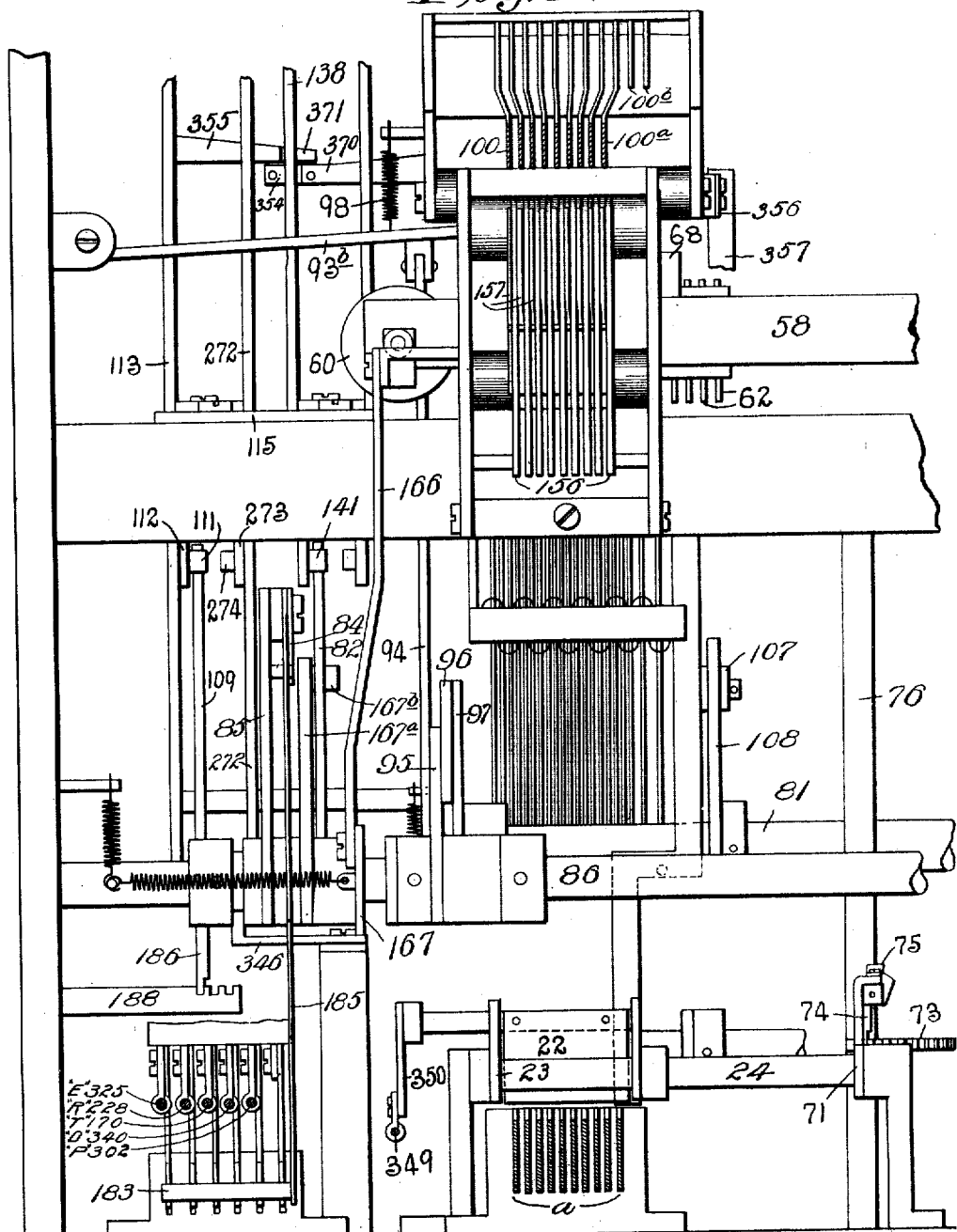

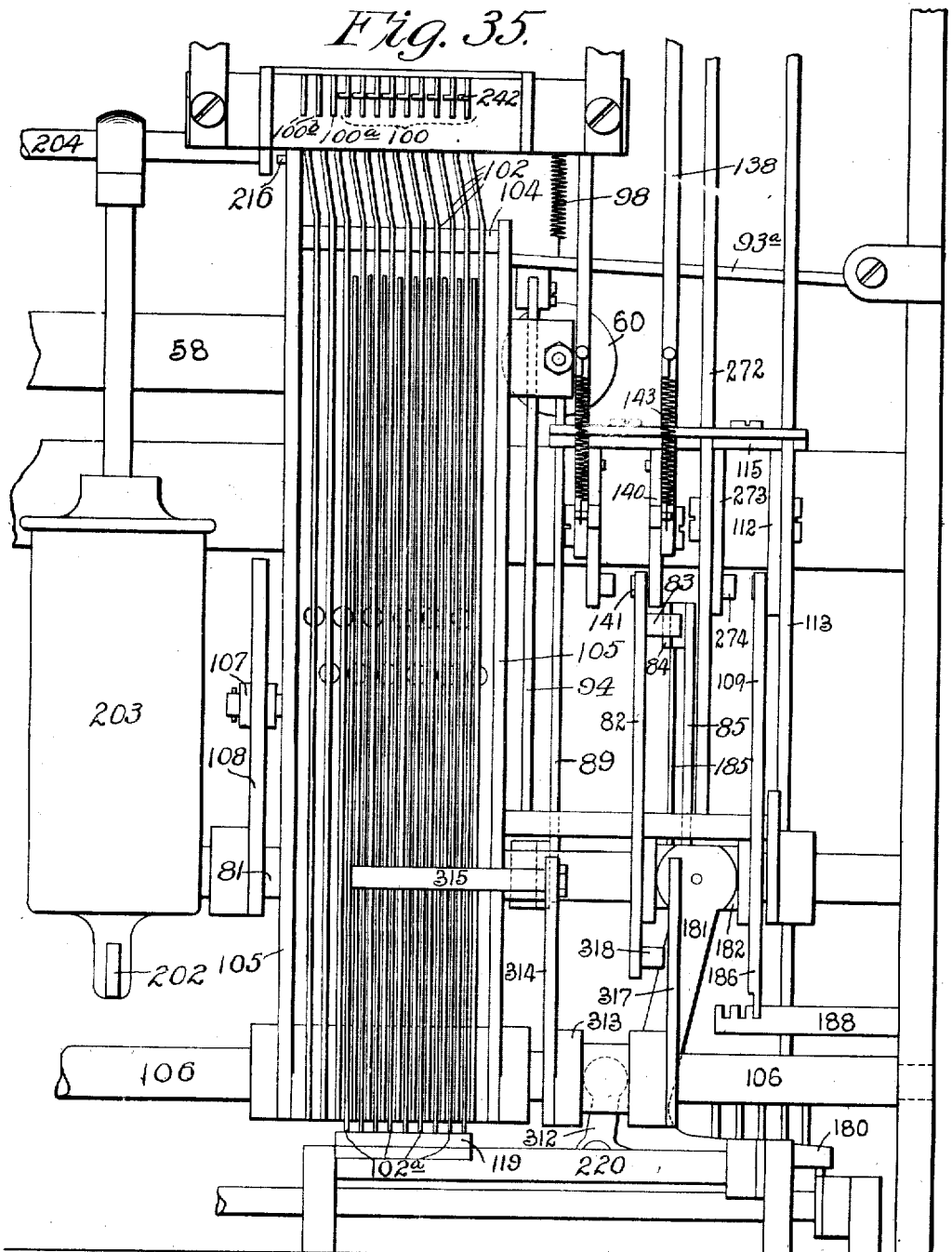

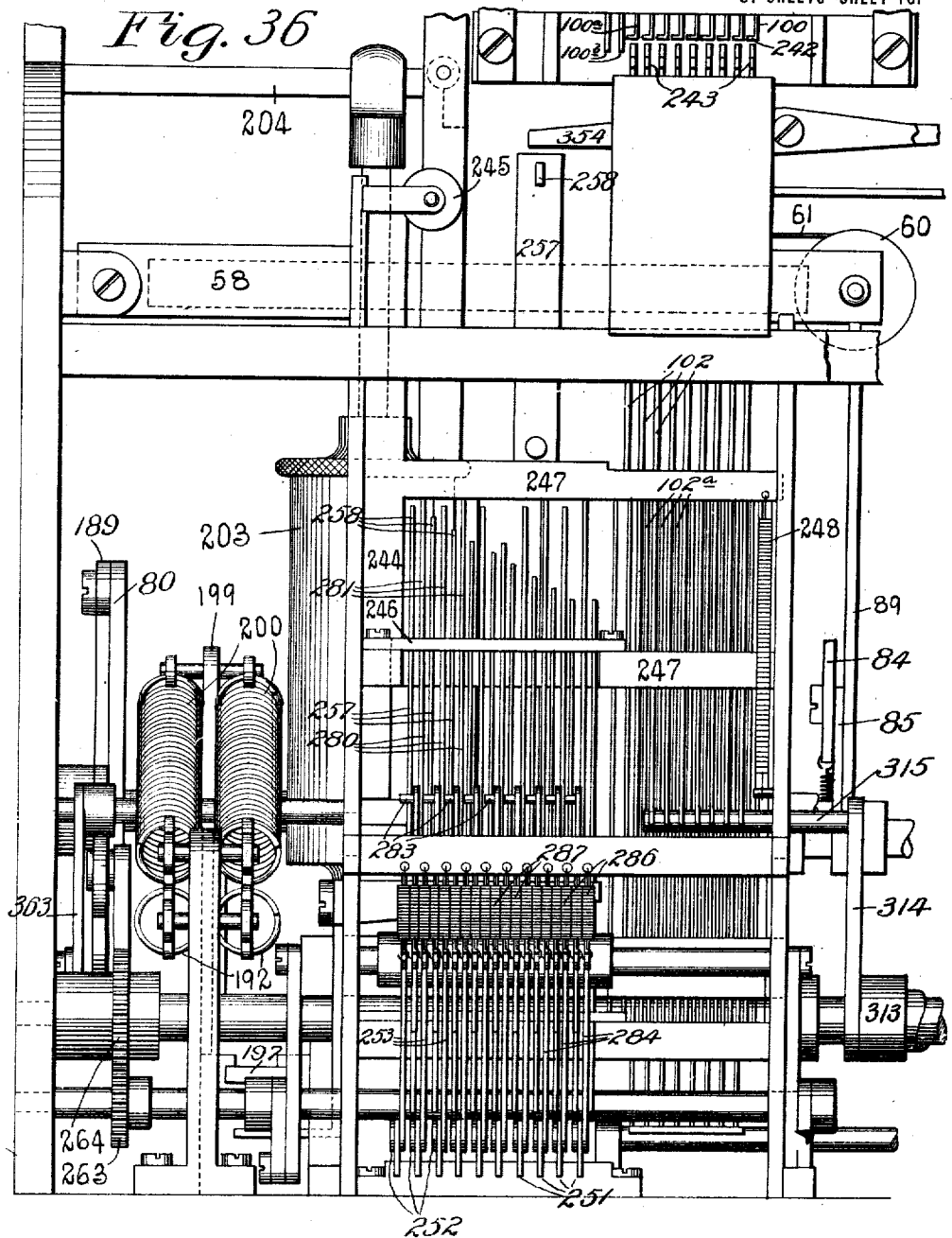

H. HOPKINS.
CALCULATING MACHINE.
APPLICATION FILED APR. 9, 1906.
1,336,904.
Patented Apr. 13, 1920.
37 SHEETS—SHEET 17.
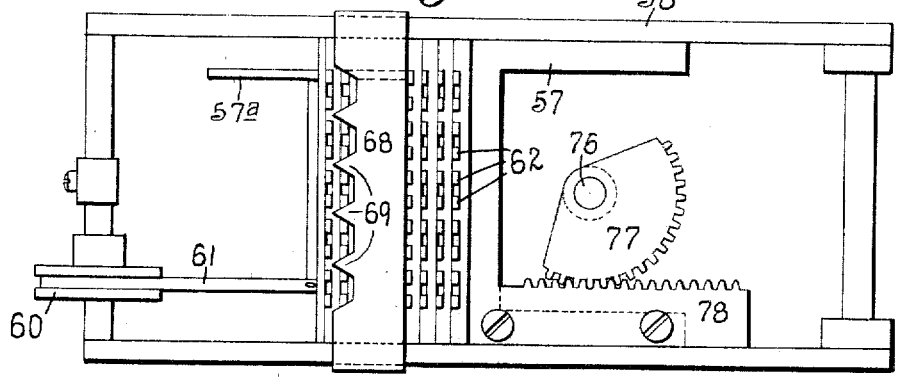
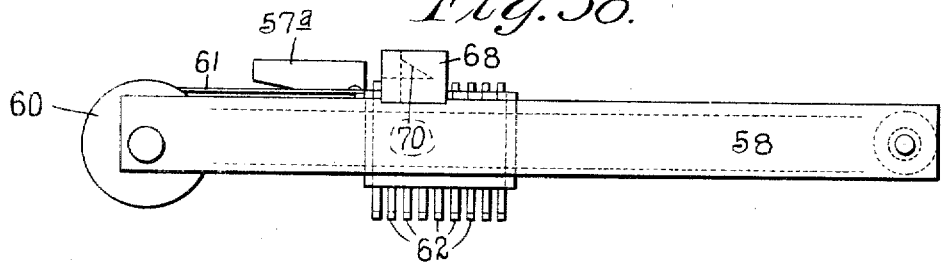
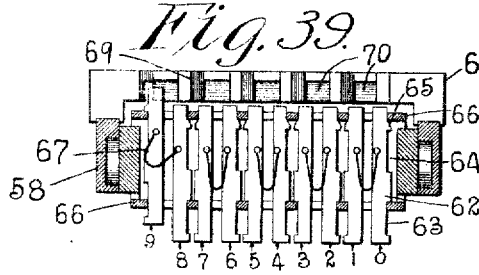
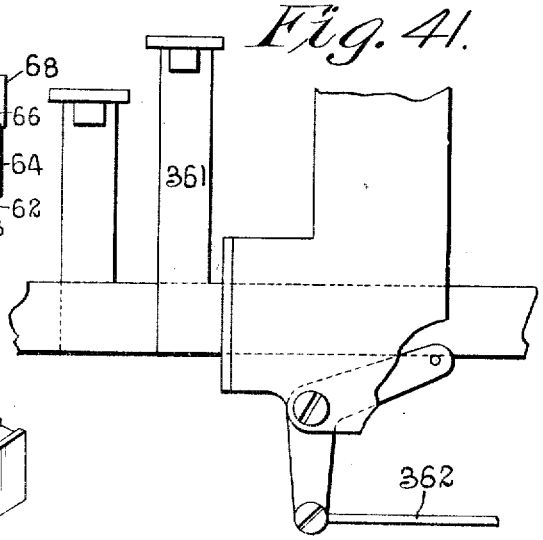
Witnesses:
Lenore Wilson
A. J. McCauley
Inventor:
Hubert Hopkins.
by Bakewell Cornwall Attys.

H. HOPKINS.
CALCULATING MACHINE.
APPLICATION FILED APR. 9, 1906.
1,336,904.
Patented Apr. 13, 1920.
37 SHEETS—SHEET 18.
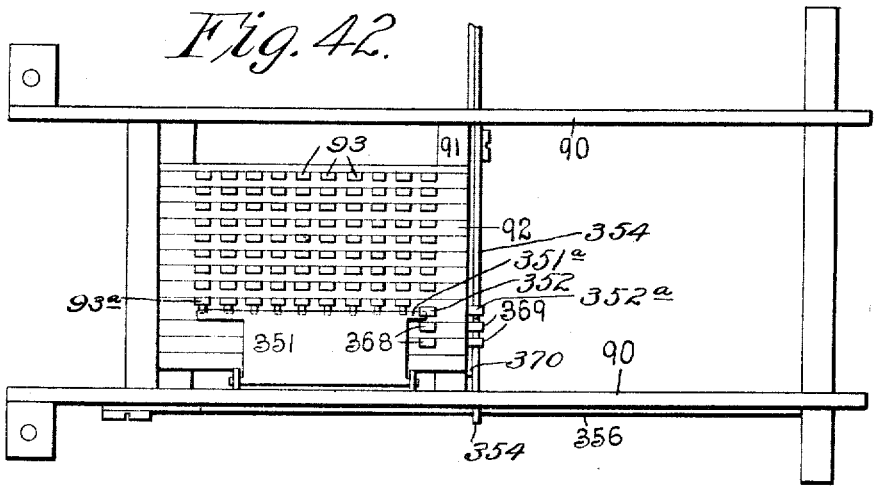
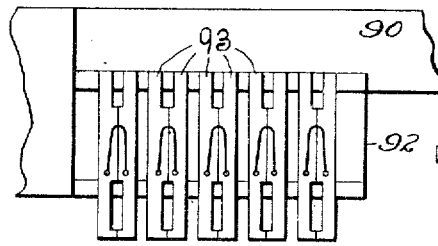
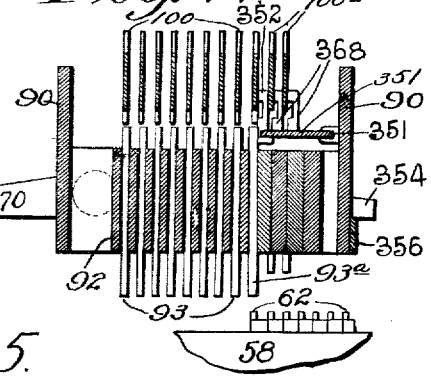
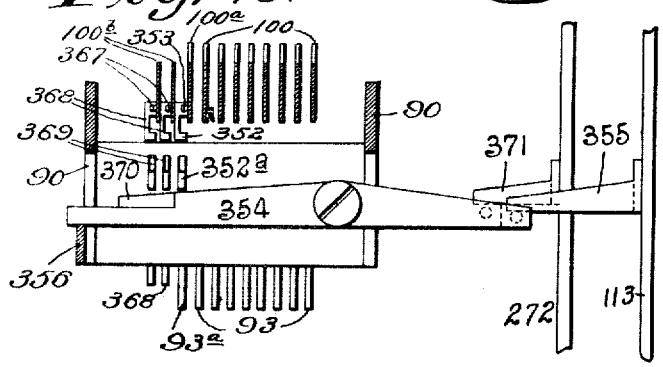
Witnesses:
Lenore Wilson
A. J. McCauley
Inventor:
Hubert Hopkins.
by Bakewell Cornwall Attys.

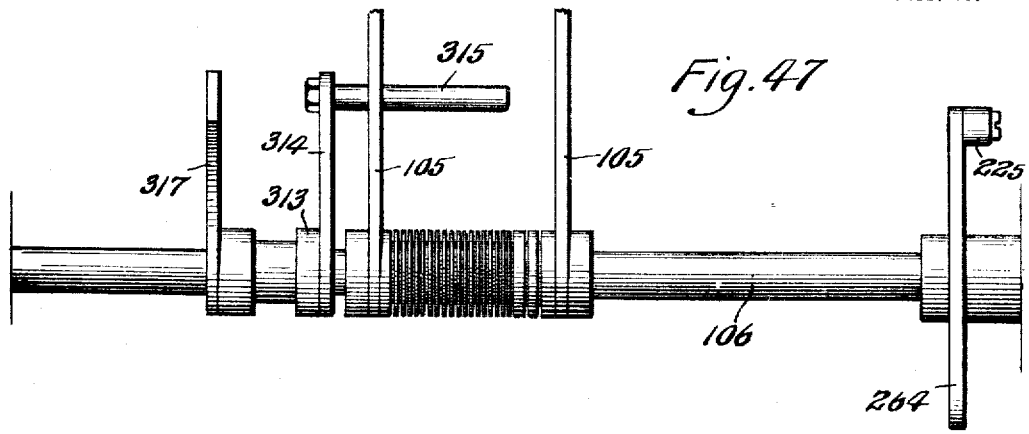
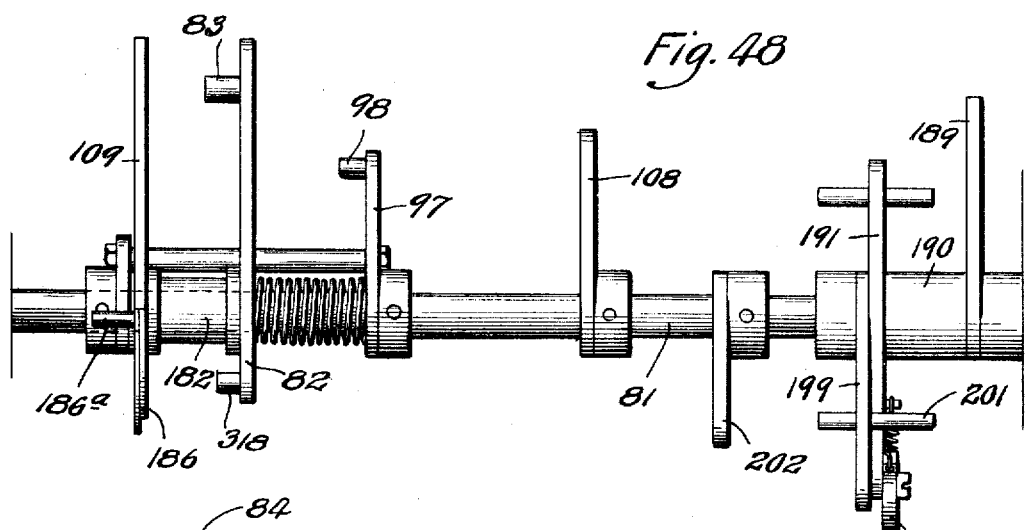
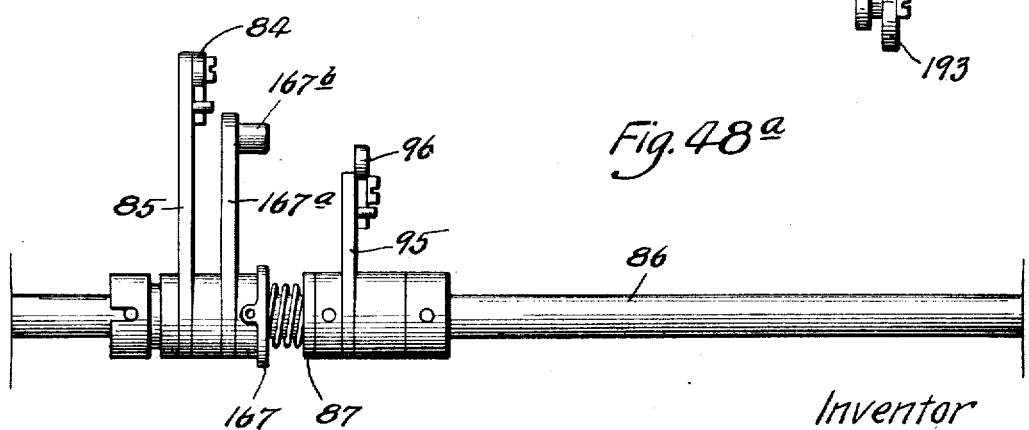

H. HOPKINS.
CALCULATING MACHINE.
APPLICATION FILED APR. 9, 1906.
1,336,904.
Patented Apr. 13, 1920.
37 SHEETS—SHEET 20.
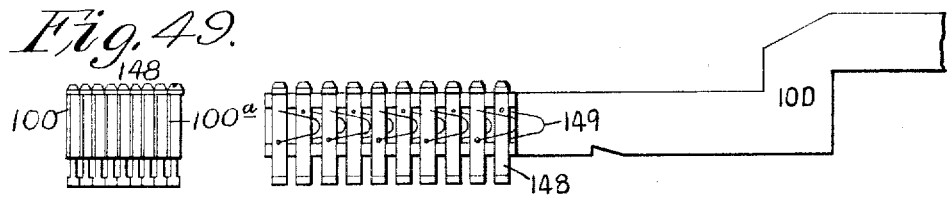
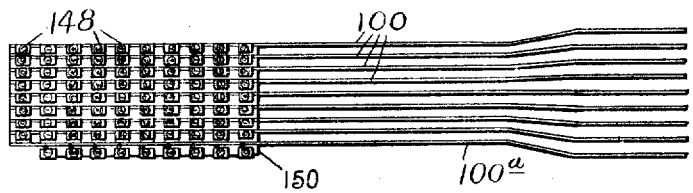
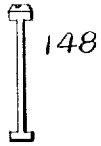
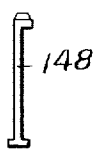
Attest.
Lenore Wilson
A. J. McCauley
Inventor
Hubert Hopkins.
by Bakewell Cornwell
Att'ys

H. HOPKINS.
CALCULATING MACHINE.
APPLICATION FILED APR. 9, 1906.

1,336,904.

Patented Apr. 13, 1920.
37 SHEETS—SHEET 21.

Witnesses:
Lenore Wilson
A. J. McCauley

Inventor:
Hubert Hopkins.
by Bakewell Cornwall Attys.

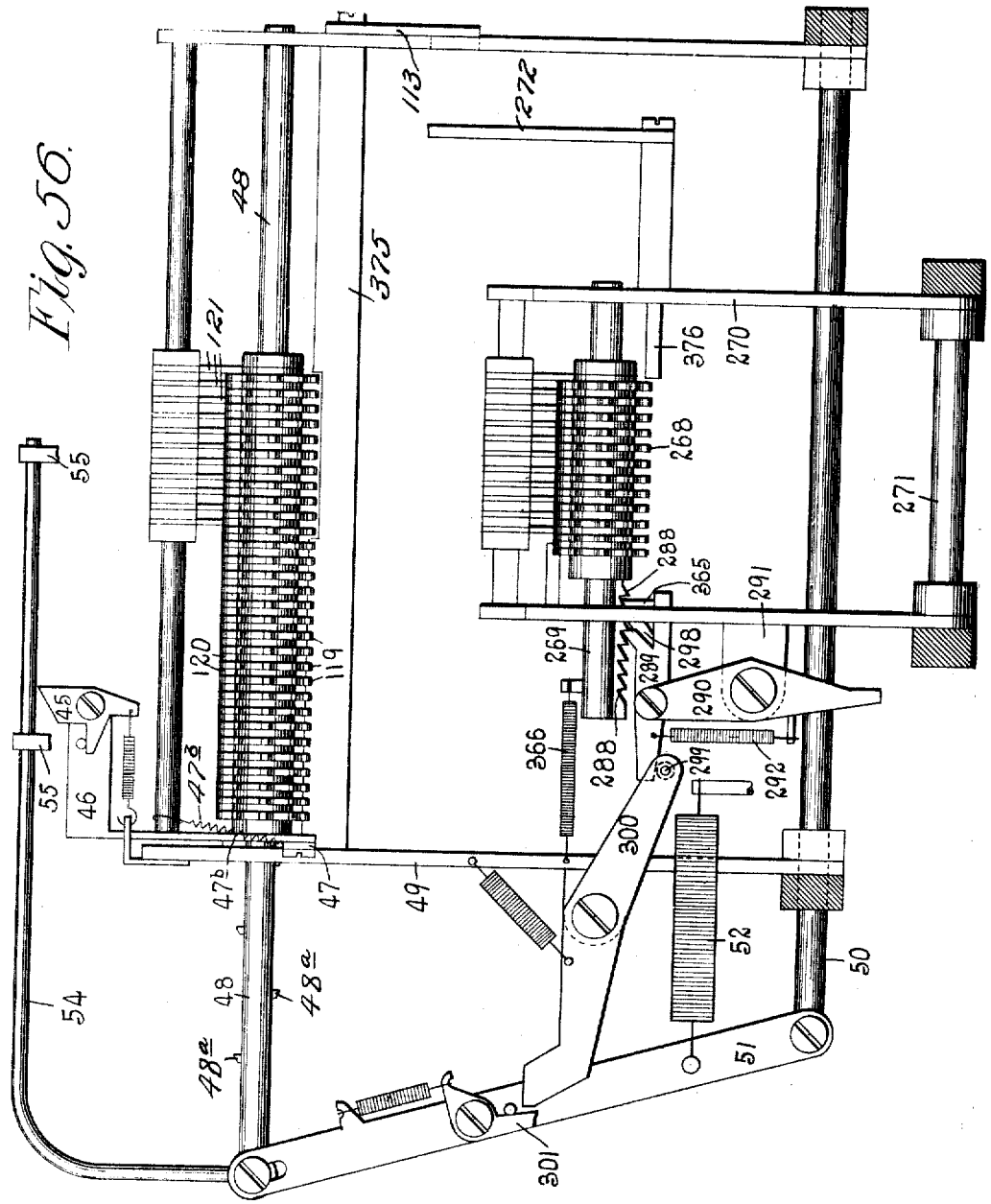

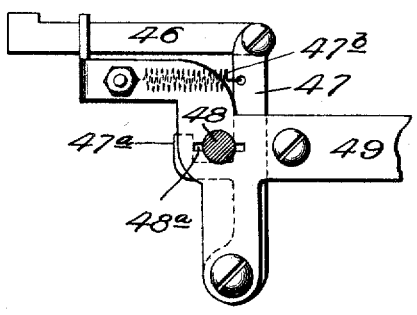
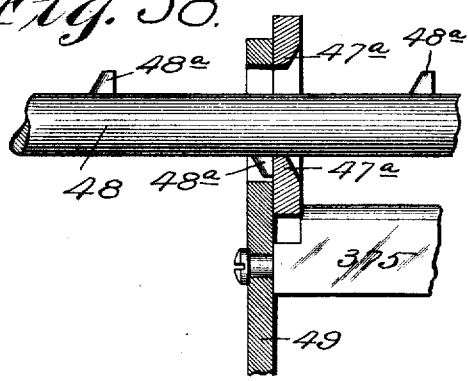
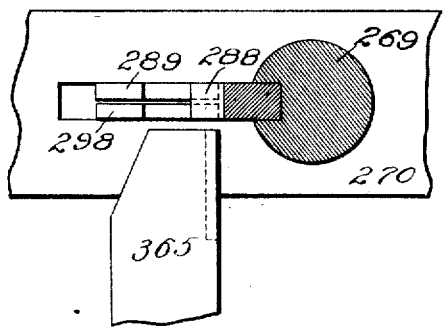
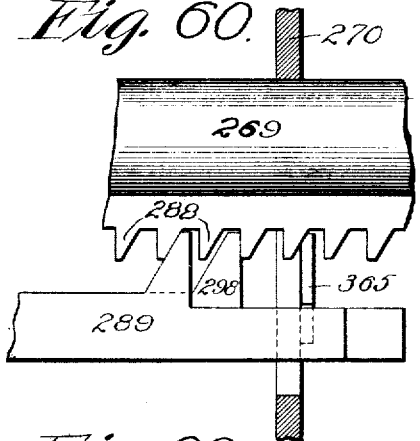
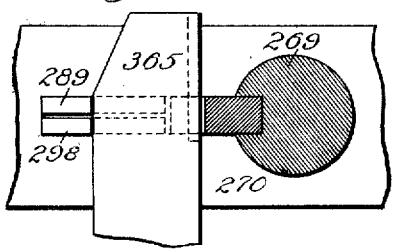
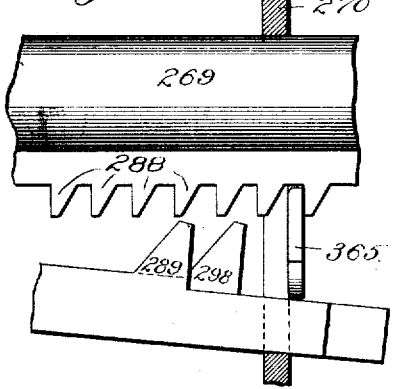

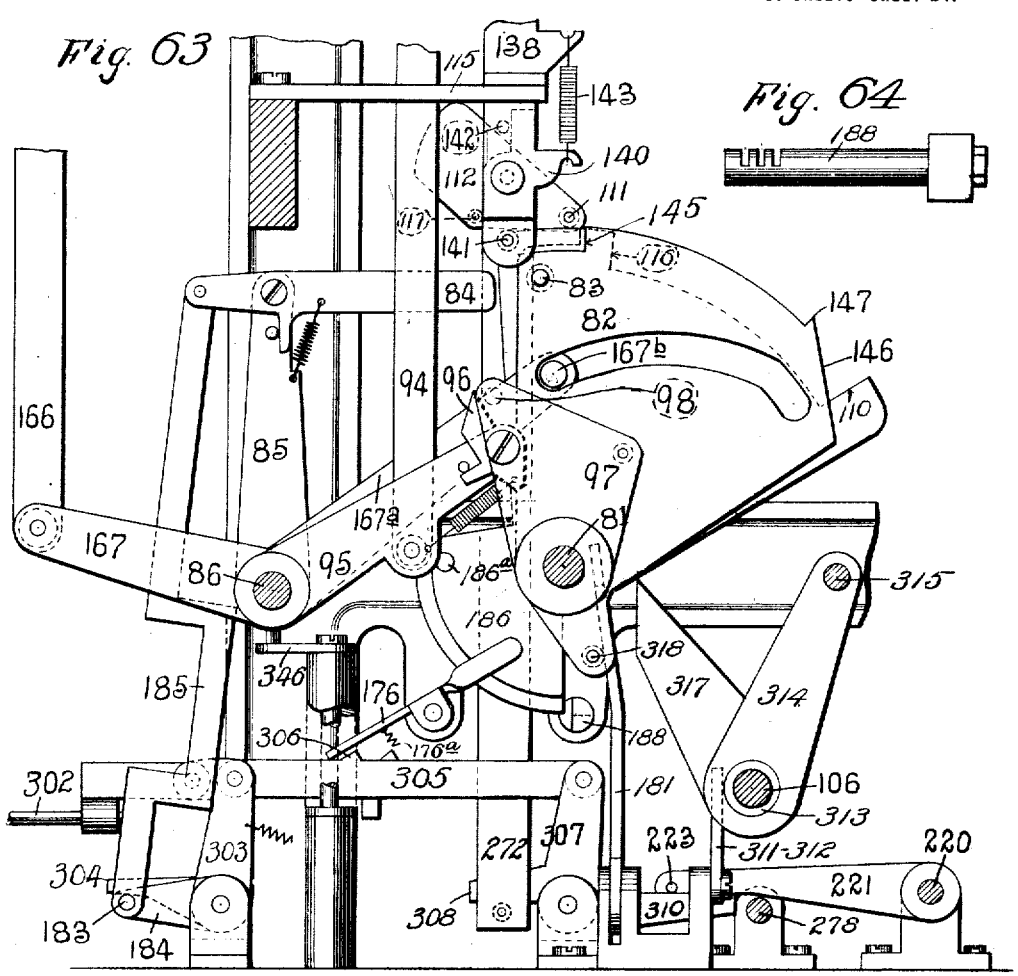

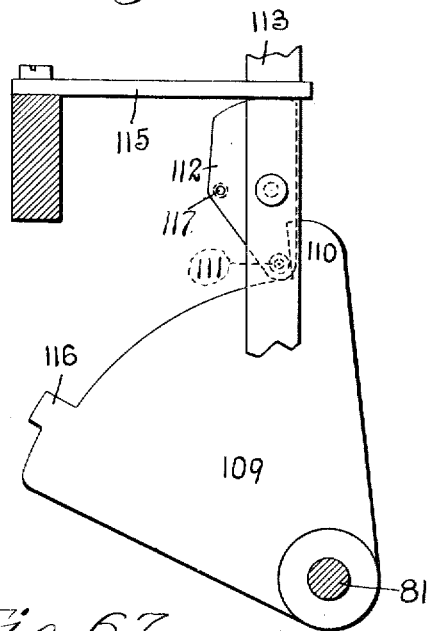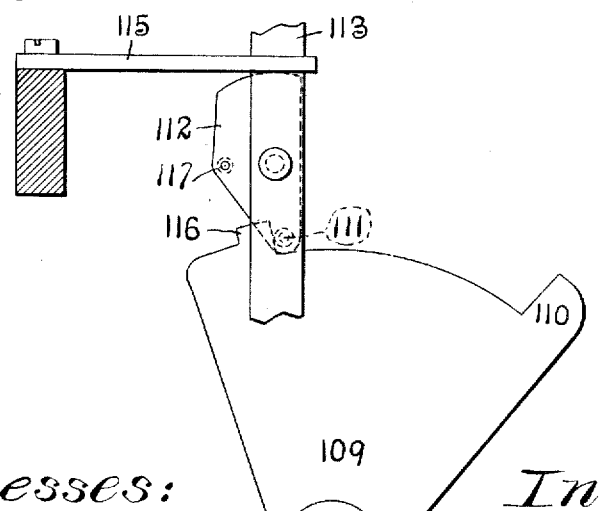

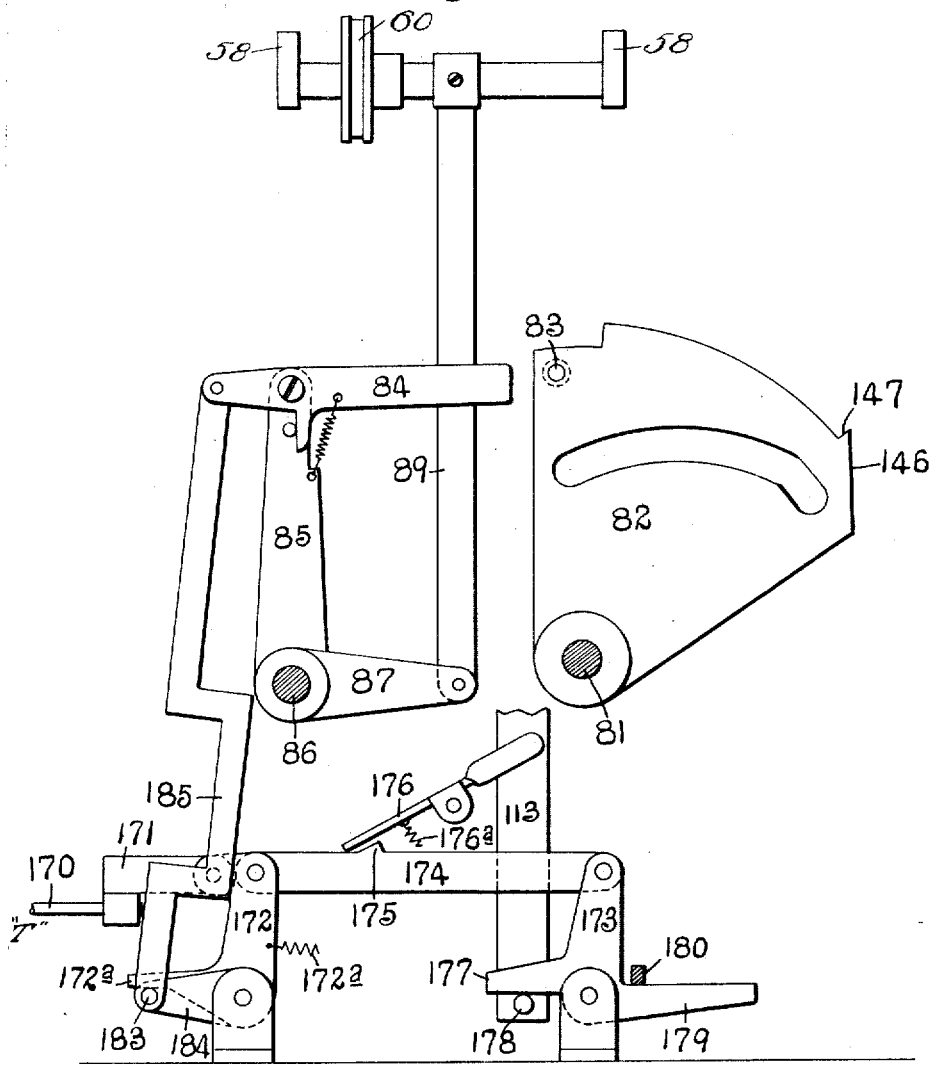

H. HOPKINS.
CALCULATING MACHINE.
APPLICATION FILED APR. 9, 1906.
1,336,904.
Patented Apr. 13, 1920.
37 SHEETS—SHEET 28.
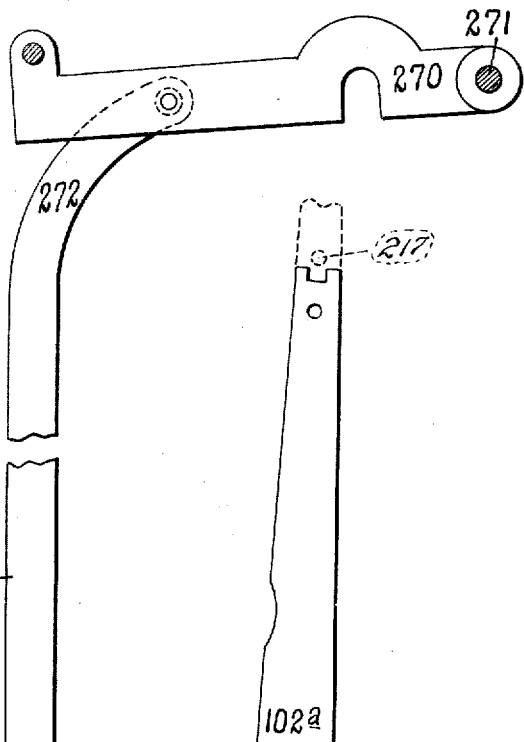
Fig. 70.
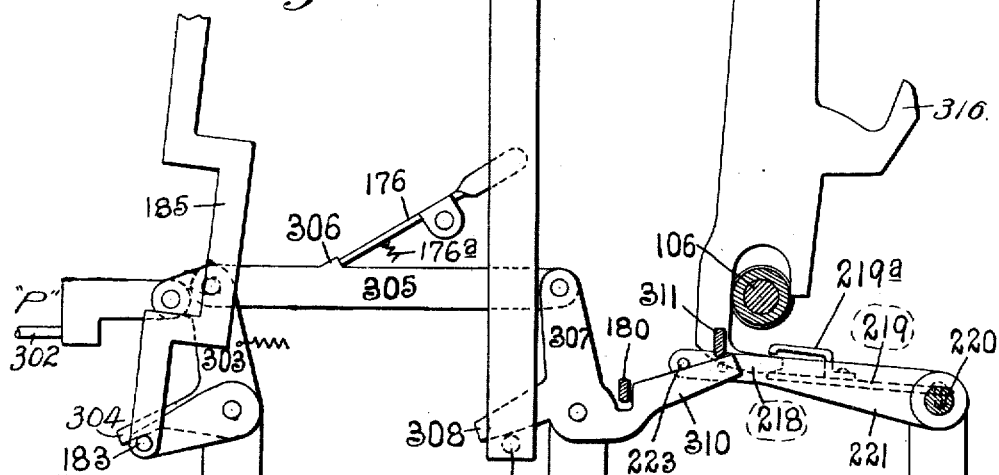
Witnesses:
Lenore Wilson
A. J. McCauley
Inventor:
Hubert Hopkins.
by Bakewell Cornwall Attys.

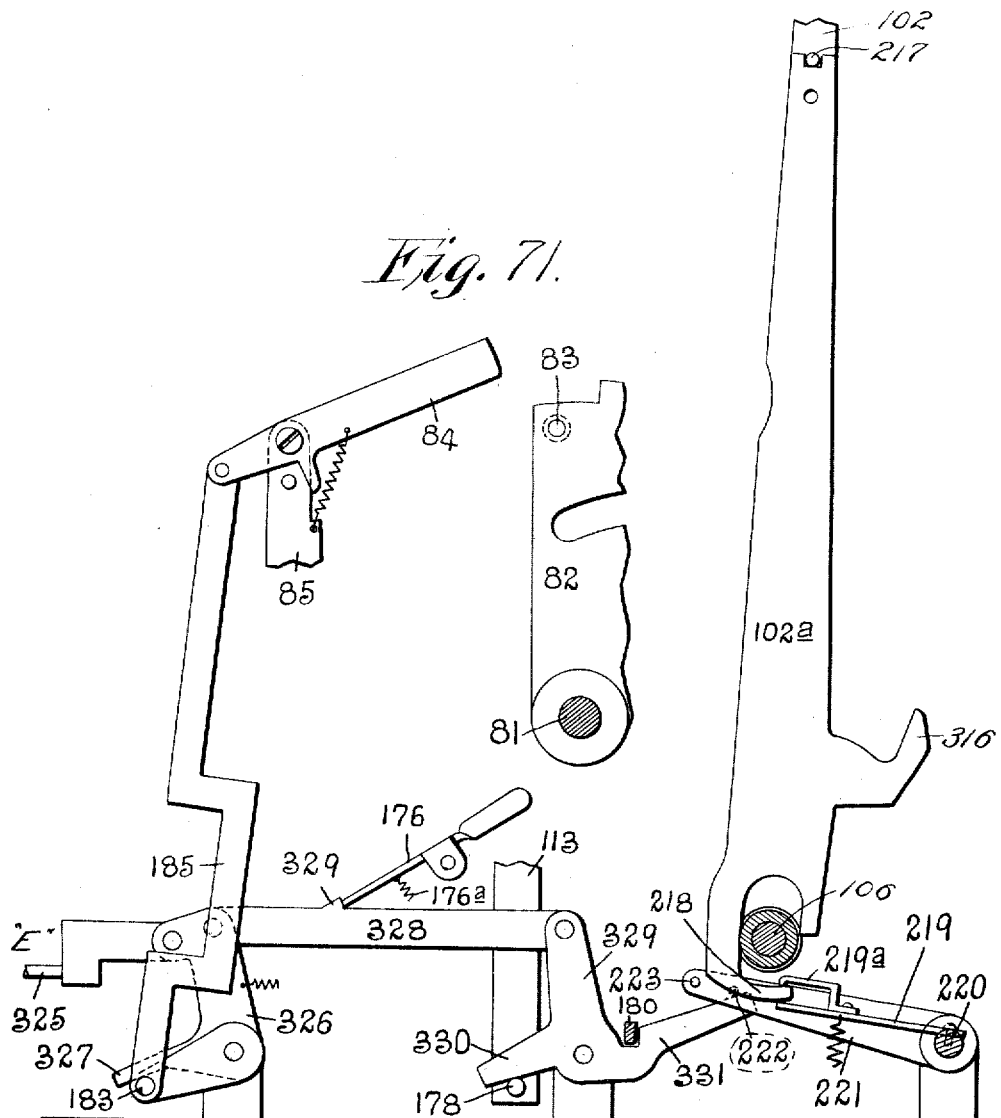

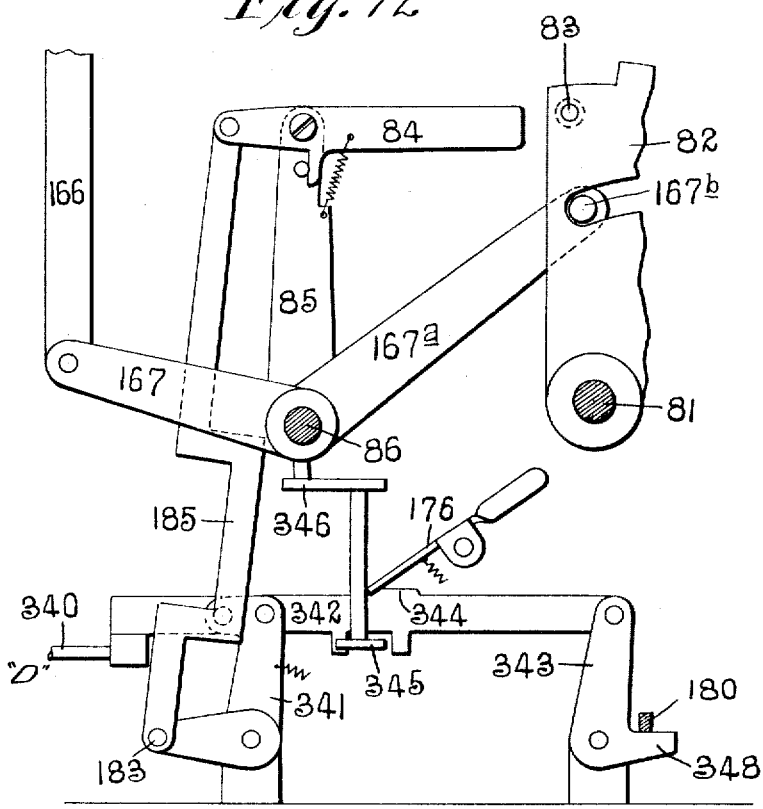

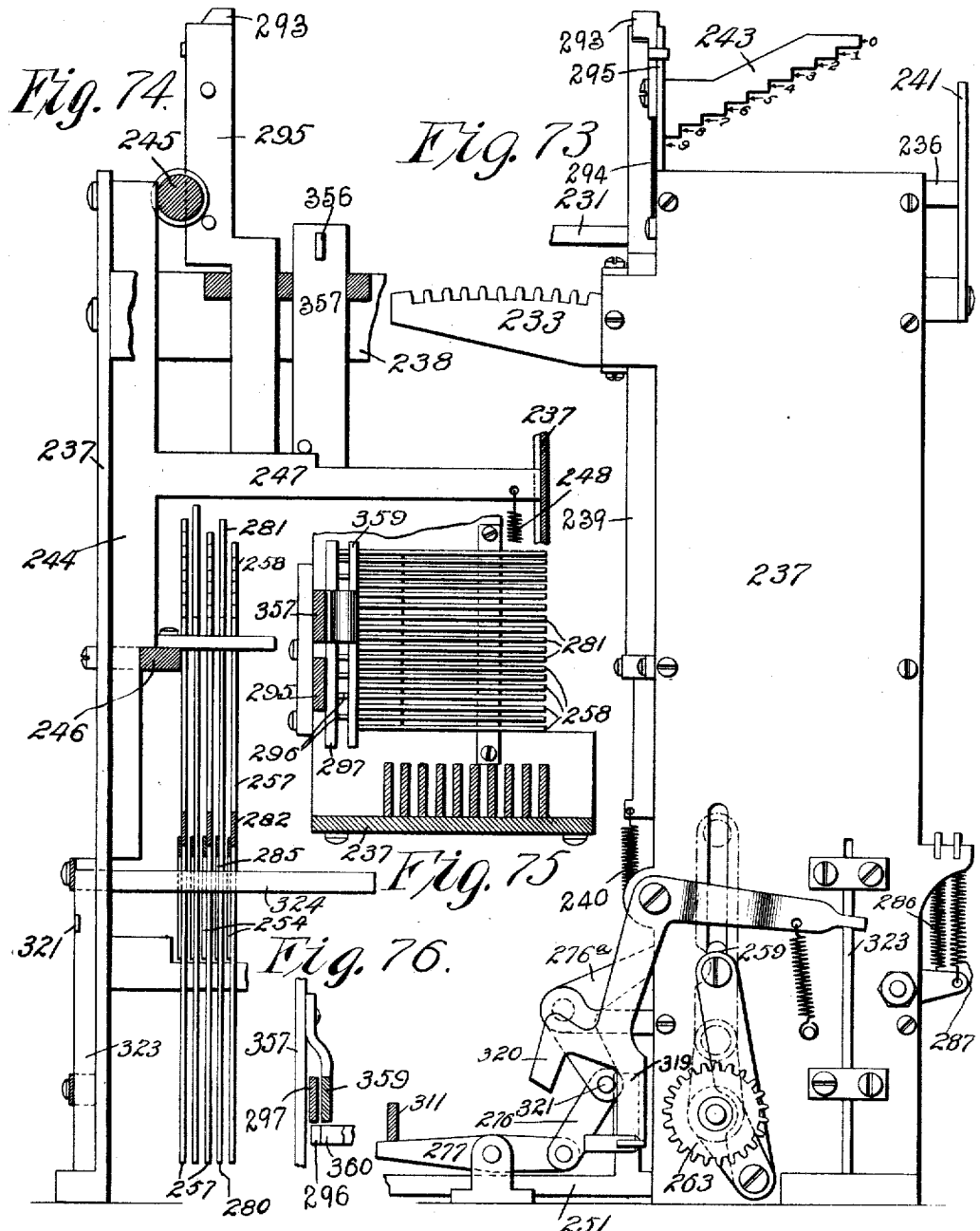

H. HOPKINS.
CALCULATING MACHINE.
APPLICATION FILED APR. 9, 1906.

1,336,904.

Patented Apr. 13, 1920.
37 SHEETS—SHEET 32.

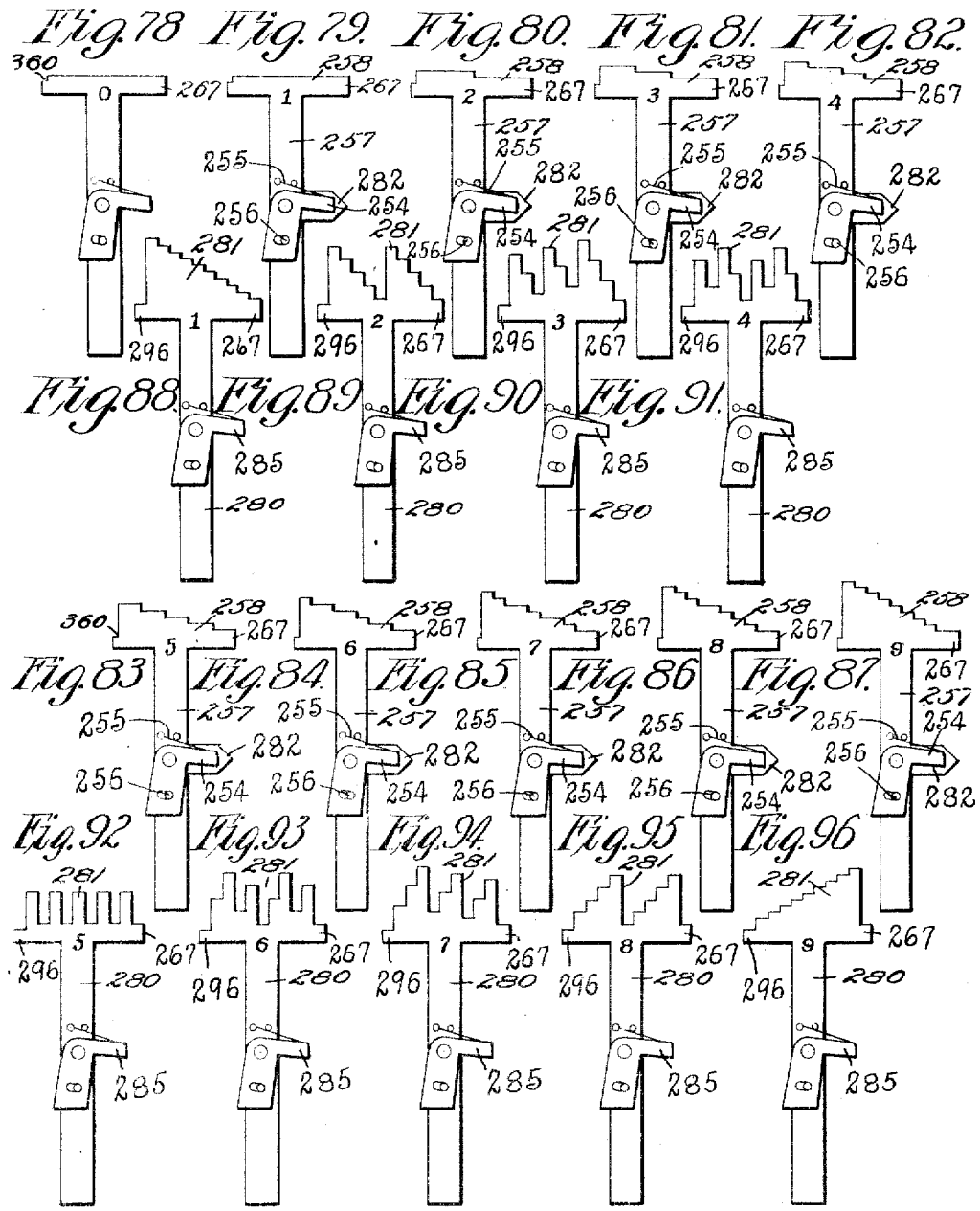

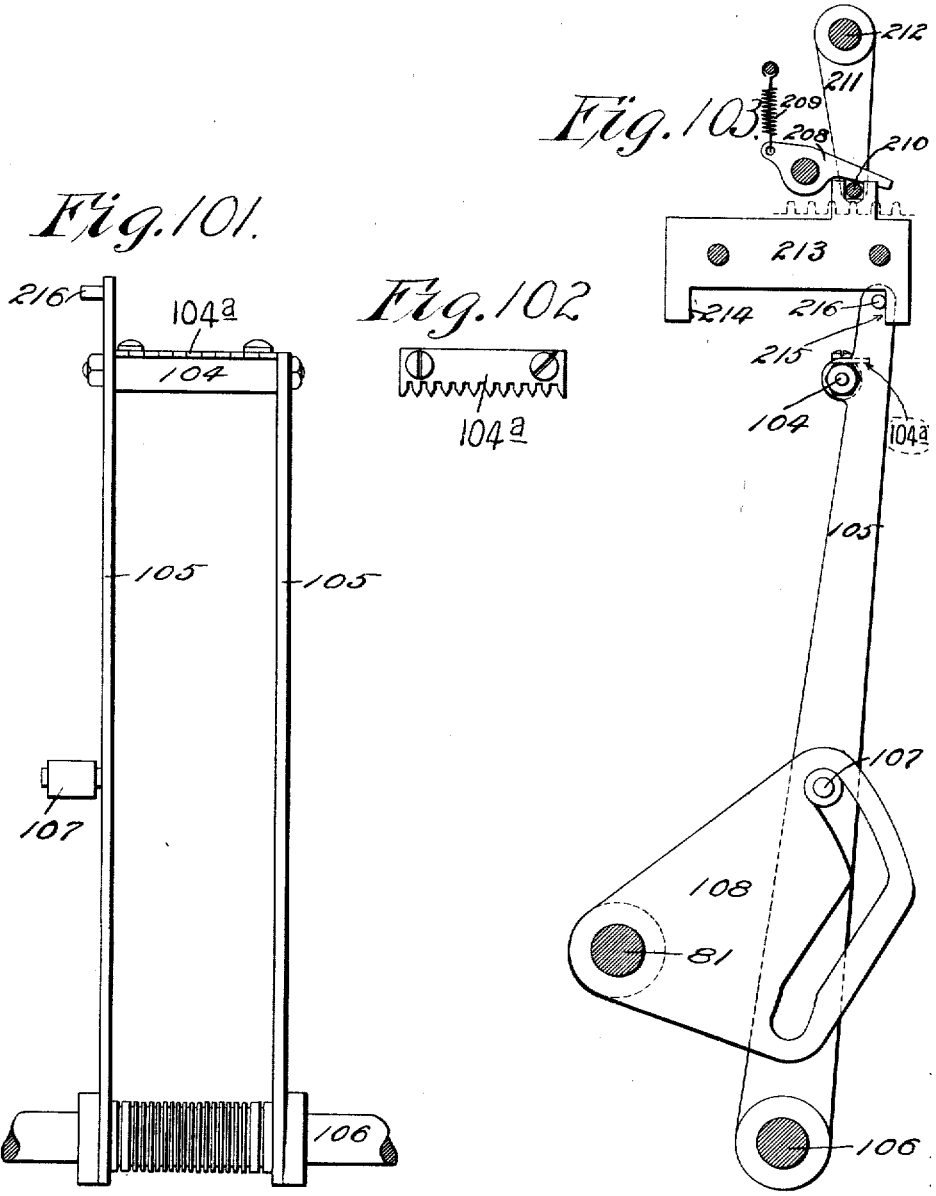

H. HOPKINS.
CALCULATING MACHINE.
APPLICATION FILED APR. 9, 1906.
1,336,904.
Patented Apr. 13, 1920.
37 SHEETS—SHEET 36.
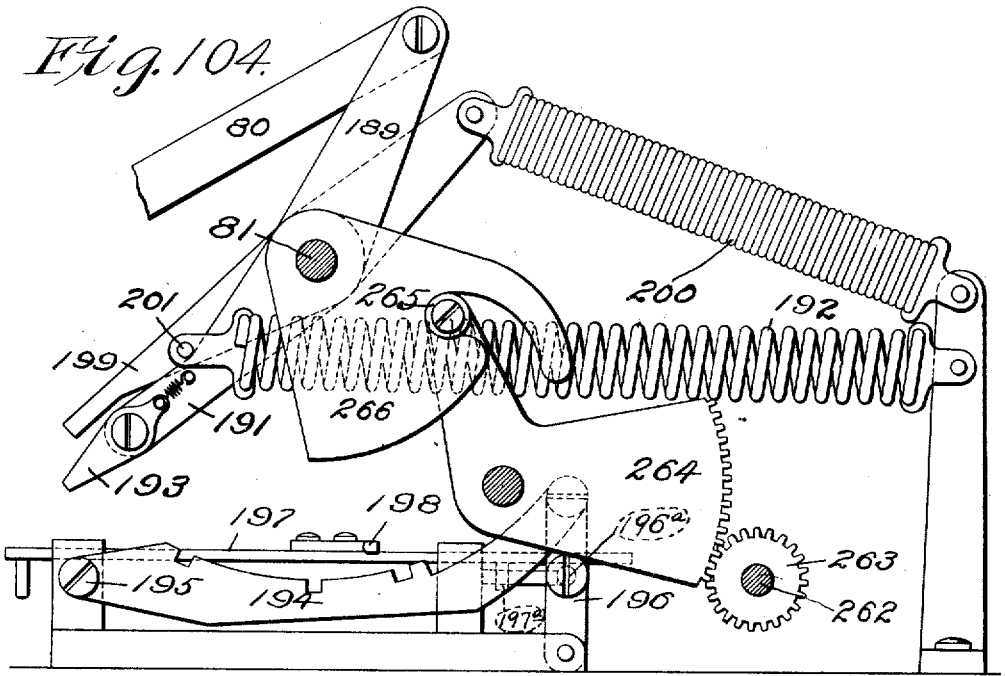
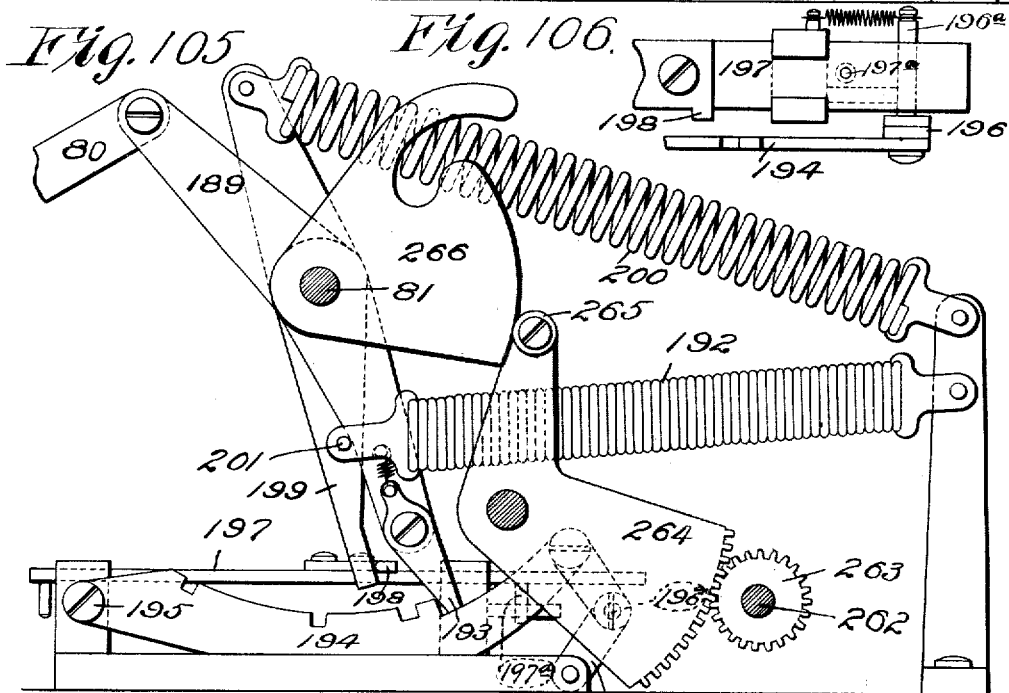
Witnesses:
Lenore Wilson
A. J. McCauley
Inventor:
Hubert Hopkins.
by Bakewell Cornwall Atty's

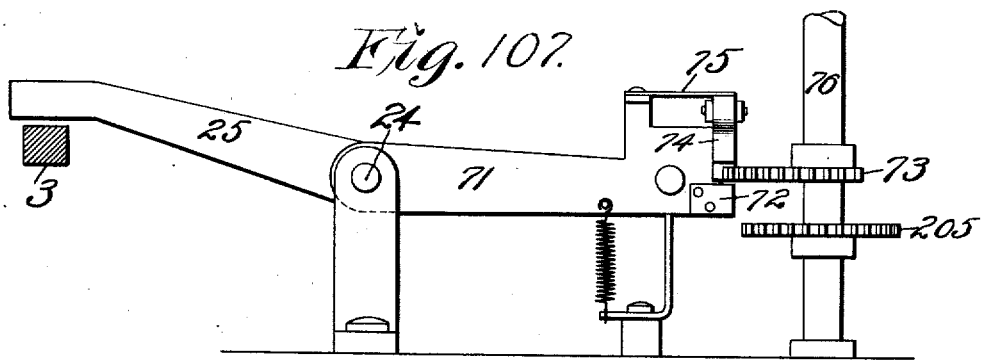
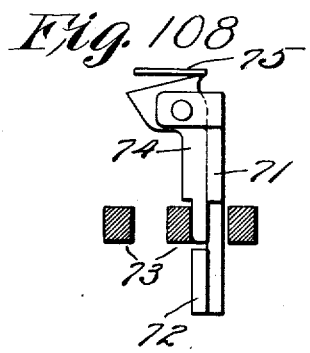
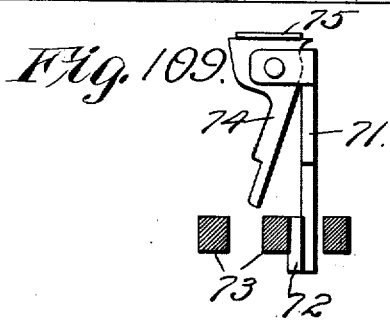
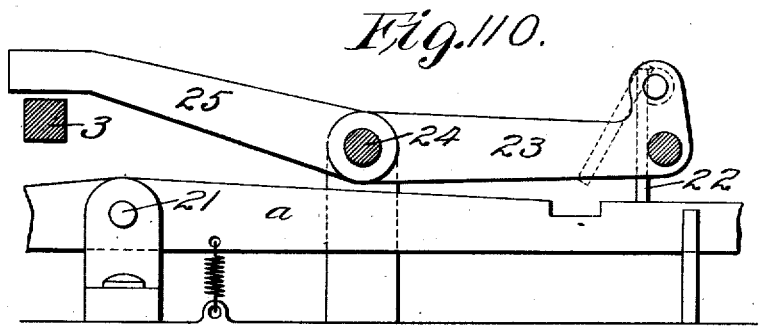

UNITED STATES PATENT OFFICE.

HUBERT HOPKINS, OF ST. LOUIS, MISSOURI, ASSIGNOR TO MOON-HOPKINS BILLING MACHINE CO., OF ST. LOUIS, MISSOURI, A CORPORATION OF MISSOURI.

CALCULATING-MACHINE.

1,336,904.     Specification of Letters Patent.     Patented Apr. 13, 1920.

Application filed April 9, 1906. Serial No. 310,739.

*To all whom it may concern:*

Be it known that I, HUBERT HOPKINS, a citizen of the United States, residing at the city of St. Louis, State of Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification.

Fig. 2 is a plan view of the same;

Fig. 3 is a side elevational view, partly in vertical section, through the machine;

Fig. 4 is a detail view showing the rear ends of the adding key bars;

Fig. 5 is a plan view showing the adding key bar arrangement;

Fig. 6 is a plan view illustrating the means for stepping the rear totalizer laterally;

Fig. 7 is a vertical sectional view through the multiplying devices;

Fig. 8 is a front elevational view of said multiplying devices;

Fig. 9 is a sectional view through the laterally movable carriage;

Fig. 10 is a detail view illustrating the means for throwing the handle-operated line-spacing mechanism into and out of operation;

Fig. 11 is a rear elevational view of a portion of the laterally movable carriage;

Fig. 12 is a top plan view of said carriage;

Fig. 13 is a sectional view through the carriage on the line 13—13 of Fig. 12;

Fig. 14 is a detail view illustrating the swinging frame in the laterally movable carriage;

Fig. 15 is a detail view illustrating the manually operable line-spacing mechanism;

Fig. 16 is a detail view of the main frame of the movable carriage;

Fig. 17 is a vertical sectional view through said carriage illustrating the escapement mechanism therefor;

Fig. 18 is a front elevational view of the tabulating keys;

Fig. 19 is a plan view of said keys;

Fig. 20 is a sectional view through one of the adjustable stops on the laterally movable carriage;

Fig. 21 is a detail view of the spring-pressed bolt carried by said stop;

Fig. 22 is a detail view in elevation of the several bars connected to the totalizer frames;

Fig. 23 is a detail view of means for locking one of the tabulating keys in a depressed position;

Fig. 24 is a similar view showing the tabulating key depressed;

Fig. 25 is a sectional longitudinal view showing the front and rear totalizers and their associate parts;

Fig. 26 is a detail view of the toothed segments in the carrying mechanism;

Fig. 27 is a detail view of one of the totalizer wheels;

Fig. 28 is a detail view showing the position of the parts of the carrying mechanism when initially tripped;

Fig. 29 is a similar view showing the position of the carrying devices in their final carrying position;

Fig. 30 is a top plan view of the right-hand side of the rear portion of the machine with the totalizers and carrying devices removed;

Fig. 31 is a detail view of the restoring plate for the rack bar stop pins;

Fig. 32 is a top plan view similar to Fig. 30, but of the left-hand side of the rear portion of the machine;

Fig. 33 is a front elevational view of the parts shown in Fig. 30;

Fig. 34 is a front elevational view of the parts shown in Fig. 32;

Fig. 35 is a rear elevational view of the parts shown in Fig. 34;

Fig. 36 is a rear elevational view of the parts shown in Fig. 33;

Fig. 37 is a top plan view of the traveling carriage and its setting-up pins;

Fig. 38 is a side elevational view of said traveling carriage;

Fig. 39 is a cross sectional view through said carriage;

Fig. 40 is a detail view of the restoring bar for the setting-up pins in said traveling carriage;

Fig. 41 is a side elevational view of the decimating key;

Fig. 42 is a top plan view of the stop pins which coöperate with the rack bars;

Fig. 43 is a detail view showing a longitudinal series of said stop pins;

Fig. 44 is a cross sectional view showing the relation of said stop pins to the rack bars and to the setting-up pins of the traveling carriage;

Fig. 45 is a side elevational view illustrating the operating mechanism for the releasing devices for the clearing and decimal rack bars;

Fig. 46 is a detail view of one of the latch bars which coöperates with the clearing and decimal rack bars;

Fig. 47 is a front elevational view of the shaft on which the multiplying plates are mounted.

Fig. 48 is a top plan view of the power operating shaft showing the parts mounted thereon.

Fig. 48^A is a detailed view of one of the operating shafts of the machine.

Figure 54:
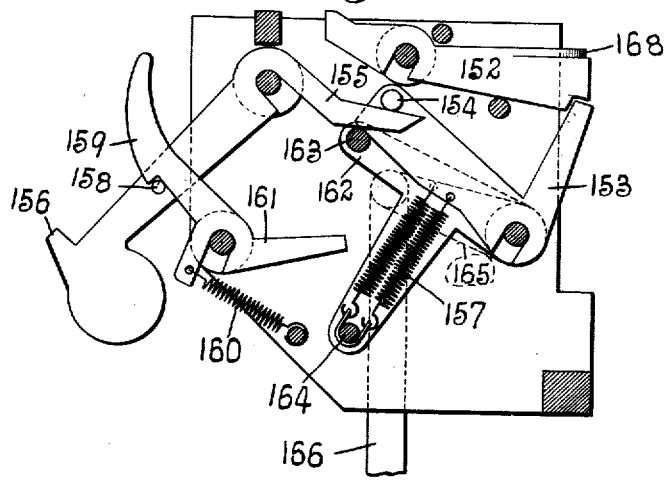
Figure 55:
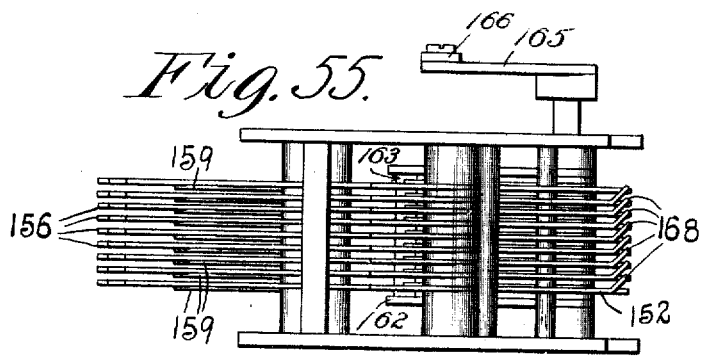
Figure 69:
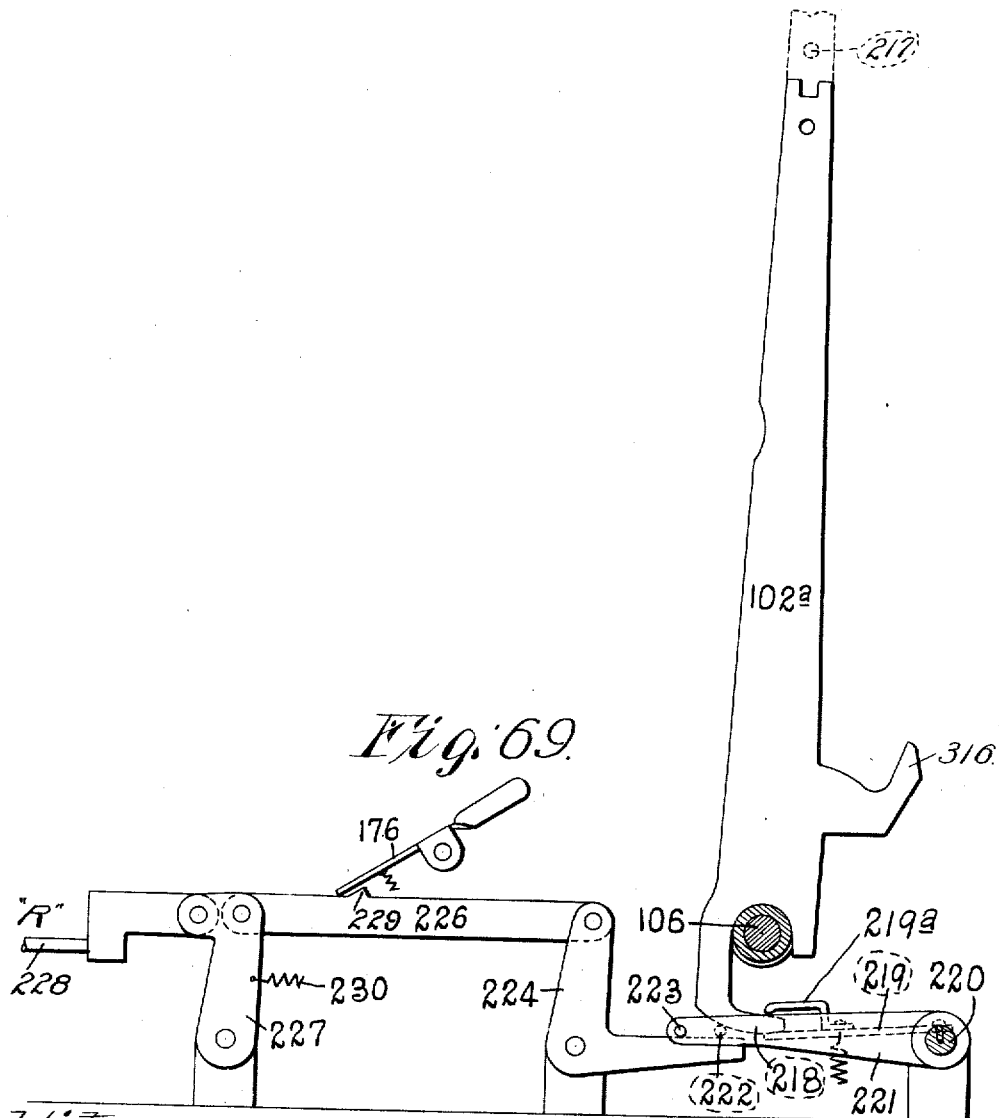
Figure 77:
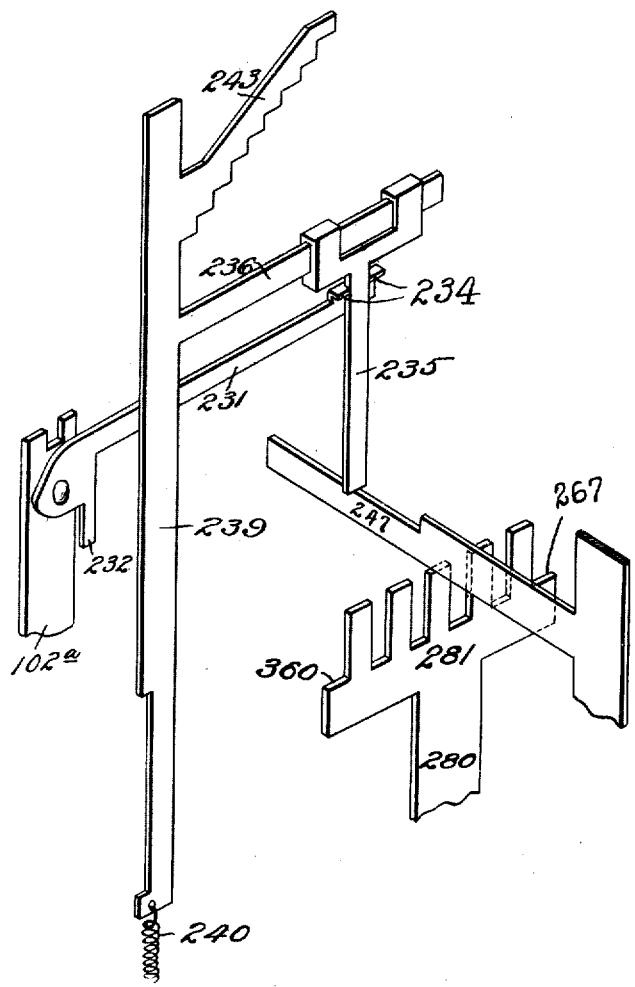
Figure 97:
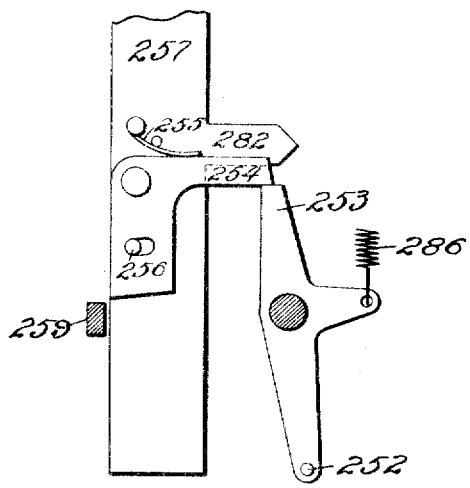
Figure 98:
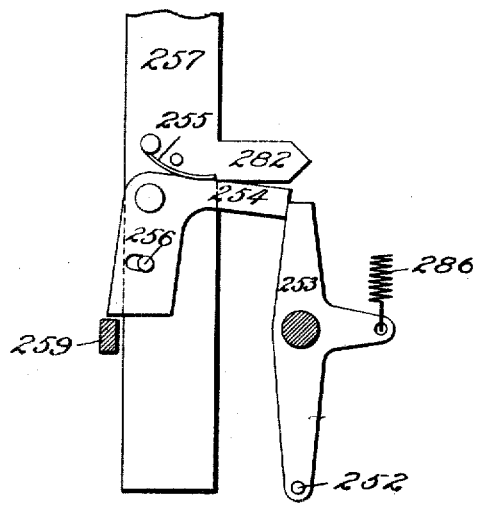
Figure 99:
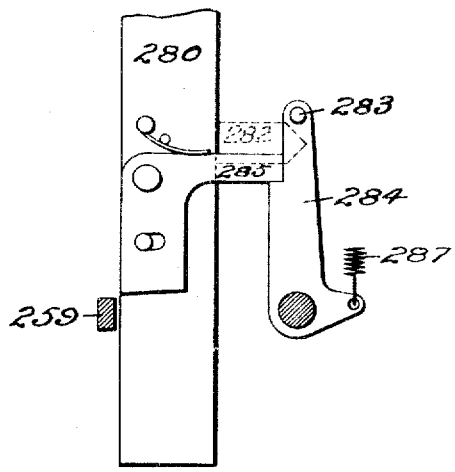
Figure 100:
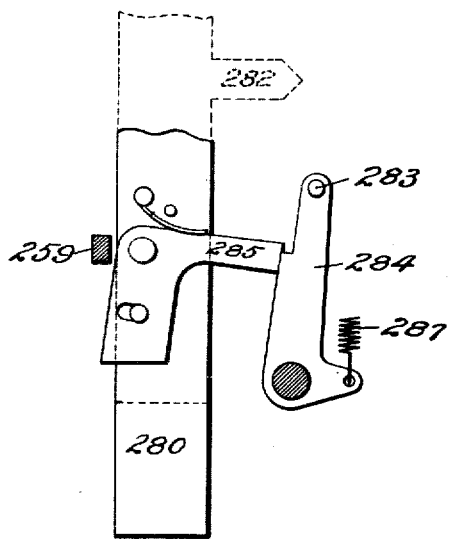

Fig. 49 is a front elevational view of the type-carrying rack bars;

Fig. 50 is a side elevational view showing one of the type-carrying rack bars and its printing type;

Fig. 51 is a top plan view of the type-carrying rack bars;

Fig. 52 is a detail view of one of the type on the decimal bar;

Fig. 53 is a detail view of one of the type on the remaining type-carrying bars;

Fig. 54 is a detail view of the type hammers and their associate parts;

Fig. 55 is a top plan view of said type hammers and their associate parts;

Fig. 56 is a top plan view of the front and rear totalizers and their carrying frames;

Fig. 57 is a detail view of the escapement mechanism identified with the laterally movable forward totalizers;

Fig. 58 is an enlarged horizontal sectional view in the plane of the totalizer shaft, showing the relation of the escapement teeth to the projections on said shaft;

Fig. 59 is an enlarged detail view showing the stepping pawls for the rear totalizer and the relation of the decimating bar thereto;

Fig. 60 is a top plan view of the parts shown in Fig. 59;

Fig. 61 is a view similar to that of Fig. 59, with the decimating bar elevated in operative position;

Fig. 62 is a view showing the parts in the position illustrated in Fig. 61;

Fig. 63 is a side elevational view illustrating the handle-operated shaft and the relation of the result keys thereto;

Fig. 64 is a detail view of the grooved post which compels the full movement of the parts when a result key is depressed and the handle initially operated;

Fig. 65 is a plan view of the parts controlled directly by the several result keys;

Fig. 66 is a detail view of the mechanism for raising and lowering the frame carrying the forward totalizers;

Fig. 67 is a similar view showing the parts illustrated in Fig. 66, in a changed position;

Fig. 68 is a side elevational view of the parts controlled by the "T" or total key;

Fig. 69 is a side elevational view of the parts controlled by the "R" or recording key;

Fig. 70 is a side elevational view of the parts controlled by the "P" or product key;

Fig. 71 is a side elevational view of the parts controlled by the "E" or extension key;

Fig. 72 is a side elevational view of the parts controlled by the "D" or decimal key;

Fig. 73 is a side elevational view of the housing frame of the multiplying devices, showing the parts mounted thereon;

Fig. 74 is a vertical sectional view through said framing looking from the rear, and showing certain of the parts;

Fig. 75 is a horizontal sectional view showing the relation of the vertically slidable bars which are operated by the units and tens multiplying plates;

Fig. 76 is a detail elevational view, partly in section, showing the relation of said bars to said plates;

Fig. 77 is a detail view illustrating the principal members of the multiplying devices;

Fig. 78 is a detail view of the zero multiplying plate;

Fig. 79 is a detail view of the tens multiplying plate identified with the "1" key;

Fig. 80 is a detail view of the tens multiplying plate identified with the "2" key;

Fig. 81 is a detail view of the tens multiplying plate identified with the "3" key;

Fig. 82 is a detail view of the tens multiplying plate identified with the "4" key;

Fig. 83 is a detail view of the tens multiplying plate identified with the "5" key;

Fig. 84 is a detail view of the tens multiplying plate identified with the "6" key;

Fig. 85 is a detail view of the tens multiplying plate identified with the "7" key;

Fig. 86 is a detail view of the tens multiplying plate identified with the "9" key;

Fig. 87 is a detail view of the tens multiplying plate identified with the "9" key;

Fig. 88 is a detail view of the units multiplying plate identified with the "1" key;

Fig. 89 is a detail view of the units multiplying plate identified with the "2" key;

Fig. 90 is a detail view of the units multiplying plate identified with the "3" key;

Fig. 91 is a detail view of the units multiplying plate identified with the "4" key;

Fig. 92 is a detail view of the units multiplying plate identified with the "5" key;

Fig. 93 is a detail view of the units multiplying plate identified with the "6" key;

Fig. 94 is a detail view of the units multiplying plate identified with the "7" key;

Fig. 95 is a detail view of the units multiplying plate identified with the "8" key;

Fig. 96 is a detail view of the units multiplying plate identified with the "9" key;

Fig. 97 is a detail view showing one of the tens multiplying plates and its coöperating tripping pawl;

Fig. 98 is a similar view showing the pawl in its tripped position;

Fig. 99 is a detail view of one of the units multiplying plates and its companion tripping pawl;

Fig. 100 is a similar view showing the position of the parts, to wit, the pawl tripped by the upward movement of the complementary tens multiplying plate;

Fig. 101 is a detail view of the rocking frame and its carried restoring bar;

Fig. 102 is a detail view of the centering and spacing comb on the said restoring bar;

Fig. 103 is a detail view showing the means of operating the rack-bar-restraining-pawls from the restoring rocking frame;

Fig. 104 is a side elevational view of the parts for cushioning the stroke of the handle and compelling a full stroke thereof;

Fig. 105 is a similar view showing said parts in the positions they occupy when the handle is in its forward position;

Fig. 106 is a detail top plan view of the rack bar which carries means for breaking the toggle to permit the notched track to be depressed when the handle is in its forward position and initially starts upon its backward movement;

Fig. 107 is a side elevational view of the escapement mechanism which controls the traveling carriage;

Fig. 108 is an enlarged detail view of the escapement pawl in its normal position;

Fig. 109 is a similar view showing the position of the escapement pawl when the parts are elevated; and Fig. 110 is a side elevational view showing means for rendering the escapement mechanism illustrated in Figs. 107 to 109 inoperative upon the depression of adding keys.

This invention relates to a new and useful improvement in calculating machines, the object being to carry a plurality of totals in the several sets of totalizers with which the machine is provided, whereby different items may be printed in different columns and introduced into the totalizers so that separate totals can be printed as separate footings for each column without interfering with footings of other columns. The columns of figures so separately printed and totalized can also be collectively totalized and a grand total thereof printed. Another object of the invention is to retain numbers registered in the machine and the totals of such numbers while the machine is being operated for other purposes. Another object is to multiply any number or total of numbers within the capacity of the machine without the usual operation of repeated addition, my improved machine only requiring two operations of the handle for each number in the multiplier. Another object is to prevent the printing of certain numbers registered in the machine if desired, the machine, however, registering said numbers or multiplying them as required in the particular work being done. A still further object is to combine in a simple, cheap and effective manner a typewriting mechanism with the adding mechanism capable of performing the objects above set forth in such a manner that words or phrases may be printed on a sheet of paper arranged in the paper carriage as in the making out of bills or invoices to specify the items therein, after which the adding mechanism may be operated, the printing devices thereof alining with the type of the typewriter so as to produce a joint result of the typewriting mechanism and the adding mechanism upon the same sheet of paper.

In order to illustrate the work of the machine the following examples are reproduced:

(1) *Lineal addition.*
123  456  789=1368, Total (2) *Parallel column addition.*
123    987    147
456    654    526
789    321    893
1,368 Total  1,962 Total  1,566 Total=4,896 Grand total.

(3) *Addition and extending.*
123×12= 1,476
456×54=24,624
789×35=27,615
1,368    53,715

(4) *Lineal addition and multiplication.*
275+79+834+135=1323×8¾=11,576.2 less 5%=10997.4.

(5) *Sample tax list.*

| Dist. | Valuation. | Rate. | Tax. |
|---|---|---|---|
| 1 | 464 | .05 | 23.20 |
| 2 | 575 | .04 | 23.00 |
| 3 | 830 | .03 | 24.90 |
|  | 1,869 |  | 71.10 |

(6) *Sample invoice.*
Jan. 25, 7 Ladies' waists @ 3.75.... 26.25
         12  "    skirts @ 6.00.... 72.00
                                    98.25

(7) *Sample rent list.*

| Premises. | Rental. | Occupant. | From— | To— | Amt. |
|---|---|---|---|---|---|
| 1 1st St. | 40.00 | Roe | On acct. | Dec. 31 | 20.00 |
| 2 2nd St. | 50.00 | Doe | Nov. 31 | Dec. 31 | 50.00 |
| 3 3rd St. | 60.00 | Loe | Nov. 31 | Dec. 15 | 30.00 |
|  | 150.00 |  |  |  | 100.00 |

*Charges.*
Dec. 31, To 1% com. on $50.00........ $  .50
  "   "   " 3%  "   "  50.00........   1.50
  "   "   Our check to balance........  98.00
                                       $100.00

(8) *Sample freight bill.*

| Article. | Weight. | Rate. | Amount. | Bk-Ch. | Total. |
|---|---|---|---|---|---|
| 100 bbls. of apples.... | 19600 | .19 | $37.24 | $12.35 | $49.59 |
| 75  "   " onions.... | 15680 | .15 | 23.52 | 10.23 | 33.75 |
| 125 "   " potatoes.. | 24500 | .14 | 34.30 |  | 34.30 |
|  | 59780 |  | $95.06 |  | $117.64 |

(9) *Squaring and cubing a number.*
(a) 12×12=144
(b) 12×12×12=1728

(*10*) *Sample discount sheet.*
(a) $10.00 price per article—80%—7%—2%=1.8228
(b) $17.00—60%—10%—5%—2%(cash)=5.69772

(*11*) *Complementary subtraction.*

```
              Deposits.
         Jan. 1, $75.00
          "   2,  25.00
          "   3,  23.00
                 ------
                 $123.00
              Checked out.
         Jan. 1, $40.00
          "   2,  30.00
          "   3,  15.00
                        85.00
                        -----
         Balance to cr.. $38.00
```

Before entering into a detailed description of the several parts constituting my improved machine, I shall describe the manner of operating the machine to produce the above examples. In order to understand the several operations of the machine it will be well to remember that the printing type of the adding mechanism are carried by horizontally arranged bars whose forward position is controlled by the adding mechanism so as to impart definite movement to the registering wheels of the totalizers, and also position the printing type in a printing line under the platen and its carried paper. The printing hammers are released to strike the type and separately force them up against the paper, making a printing impression. The printing mechanism is so designed that only the type of the actuated bars are struck. These bars and their carried printing type occupy a fixed relation to the frame of the machine while the paper carriage is laterally adjustable for letter-spacing as in the ordinary operation of a typewriter, and also rotatably mounted for manual line-spacing as in ordinary typewriting, or mechanical line-spacing by a pull from the handle when the printing devices of the adding mechanism are operative. The carriage of the typewriter may also be spaced in predetermined lateral positions by the operation of tabulating keys, which keys, when operated, as well-known, will cause the side motion of the escapement mechanism of the carriage to be thrown out in such a manner that the motor spring connected to the carriage will move the same laterally (to the left) a predetermined distance and arrest it in such new position. By operating the tabulating key again the carriage may be caused to jump another space.

These tabulating keys are preferably numbered 1, 2, 3 and 4, the numbers representing the arrested position of the carriage with regard to letter or digit spaces. Thus, if printing a column of numbers having a different number of digits it is possible to arrange them in numerical alinement. Any one of the tabulating keys will perform the operation of column spacing, but this is usually done by the left-hand tabulating key marked "1." If tabulating key "2" is struck, it will step the typewriter carriage one letter space to the right of the position in which the carriage would be stopped if key "1" was operated. If the "3" key is struck, the carriage will be arrested two spaces to the right, and key "4" will locate the carriage three spaces to the right. To illustrate this the following example is given:

```
    9 (tabulating key "1" struck)
   27 (      "      "   "2"   "    )
  134 (      "      "   "3"   "    )
 7556 (      "      "   "4"   "   .)
```

These tabulating keys are used advantageously in properly alining multipliers written by the printing devices of the typewriting machine.

The carriage of the machine is connected by suitable devices to a longitudinally movable shaft capable of motion across the machine, and on which shaft are mounted three groups or sets of totalizers. For purposes of distinction these may be referred to as the forward totalizers, and, depending upon the position of the carriage, the left-hand, middle, or right-hand group of totalizer wheels are placed in operative relation to the sliding rack bars which carry the printing type of the adding mechanism. Thus if the carriage is positioned for the first column, the left-hand group of totalizer wheels would be in operative relation to the sliding rack bars, the second-column-position of the carriage will locate the middle group of totalizers in operative relation to the rack bars, and the third-column-position of the carriage would locate the right-hand group of totalizer wheels in operative relation to the rack bars. This connection between the carriage and the transversely movable groups of totalizers might be severed, if desired, so that the movement of the totalizer groups will not be coincident with the movement of the carriage; also, the connection may be such that the three groups of totalizer wheels may be brought into operative relation with the rack bars when the carriage occupies the second, third and fourth column positions which would enable the "1" tabulating key to position the carriage for the first column in which could be written a date or other matter by the typewriting mechanism.

Behind the transversely movable groups of totalizer wheels is another set of totalizer wheels which for purposes of distinction may be designated as the rear totalizer. This rear totalizer occupies a fixed relation at all times to the rack bars and may be brought into operative mesh therewith in connection with any one group of forward totalizers which may be in operative relation to the rack bars. Thus in introducing an item into the left-hand forward totalizer said item may be simultaneously introduced into the rear totalizer. The same is true of the middle and right-hand forward totalizers respectively. Likewise in taking a total from the left-hand forward totalizer said total may be registered in the rear totalizer and retained in or canceled from the forward totalizer if desired. Likewise the total in the middle and right-hand forward totalizers may be accumulated in the rear totalizer which adds all three totals together making a grand total of the three totals contained in the forward totalizers. The rear totalizer also registers the products resulting from the operations incident to multiplying, any one of the forward totalizers serving to register the multiplicand introduced into the machine in the multiplying operations, while another of the forward totalizers registers the product.

I will now describe the operations of the machine incident to the production of the examples heretofore given, it being understood of course that in starting, the machine is clear and the carriage properly positioned, usually at the right-hand side of the machine.

*(1) Lineal addition.* — The operator strikes the keys in group or bank A in the order in which the figure occurs in the item to be introduced into the machine. The first number being "123" the operator strikes the keys so marked in the order given, after which the "D" key is pressed in order to place this number in the rear totalizer. The handle 79 at the right-hand side of the machine is then pulled. The "D" key is operated in lineal addition to place the item in the rear totalizer because the lateral movement of the carriage would cause the groups of forward totalizer wheels to travel therewith if the connection existed between the carriage and said groups of totalizers, and consequently no one group would occupy the proper position with relation to the rack bars upon the introduction of the several items into the wheels constituting the forward totalizers. If, however, the connection between the carriage and the forward totalizers is rendered inoperative so that any one group of forward totalizer wheels can remain in a fixed relation to the rack bars irrespective of the lateral position of the carriage then it will be unnecessary to press the "D" key to register the number in the rear totalizer unless such was specially desired. For present purposes we will assume that the connection between the forward totalizers and the carriage remains intact and therefore the items will be introduced into the rear totalizer.

The second number "456" will now be struck on the keys in group A in the order named, key "D" depressed, and the handle pulled, key "D" being released when the handle reaches its forward limit. It will of course be understood that the carriage is spaced laterally so as to provide a clear printing space for the second number before the handle is pulled to print the second item, and also that this lateral spacing is done while each number is being set up on the keys, the "D" key pressed and the handle pulled after each number is set up.

Lineal addition may also be performed by striking the numbers on keys in group A, as in letter writing on the typewriting machine, and using the space key after each number is written. Of course the handle is pulled after each number is written. Or the tabulating key "1" may be operated after each number to carry down two or more columns of numbers simultaneously. In both of these instances the "D" key is not used.

To secure a total of the items introduced into the rear totalizer, the carriage is spaced to provide a clear printing field therefor, the "P" key is pressed, and the handle pulled. If the "P" key is released at the end of the forward stroke of the handle the rear totalizer wheels will be cleared and occupy a zero position for the commencement of another example. If the "P" key is held down until the handle reaches home the total will be retained in the rear totalizer. If desired, the total can be introduced into any one of the forward totalizers. The typewriting mechanism may be resorted to to write in the word "Total" if desired.

In the operation of lineal addition the vertical line-spacing mechanism operated by the handle 79 is rendered inoperative. Should the numbers take up more than one line the vertical line-spacing devices are manually operated.

*(2) Parallel column addition.*—In this example the same numbers constituting the first example in the lineal addition are struck on the keys in the order named, means, however, being operated to insure the vertical line-spacing of the paper at each pull of the handle so as to present a new printing surface for the type immediately under the preceding printed number. The total can be printed as a footing of the first column and the paper turned back to start the second column even with the first, if desired, or the three top numbers of the three columns can be printed successively as the headings of the respective columns by operating the tabulating keys. The movement of the typewriter carriage from right to left places the groups of forward totalizers successively in operative relation to the rack bars so that the columns will be added separately.

In printing the individual totals as footings to the three columns the "T" key is pressed when the typewriter carriage is properly positioned, which will insure the printing of the correct total of the column of figures in line with the printing type, and which are registered in the active group of totalizer wheels in operative relation to the rack bars. Adjusting the carriage laterally to present the printing type in line with the second column brings into operative relation the middle group of totalizer wheels so that the proper total of the second column can be printed thereunder. This being true with respect to the third column, the positioning of the carriage to print the total of which brings into operative relation to the rack bars the third group of totalizer wheels.

In the event that it is desired to take a grand total of the three totals printed as footings for the three columns, the key marked "D" is pressed down in conjunction with the "T" key in taking the individual totals, which results in placing the individual totals in the rear totalizer, from which the grand total can be taken by pressing the key marked "P" and pulling the handle.

If it is desired to keep a "running" grand total in the machine, the items to be separately set up in the forward totalizers may be separately introduced into the rear totalizer by depressing the D key, and, when the handle is forward, depressing the T key. In this manner the D key causes the rear totalizer to become engaged with the racks when the racks have reached their forward position, and by depressing the T key the forward totalizers are also thrown into engagement with the racks so that the rearward movement of the racks simultaneously introduces the items into both forward and rear totalizers.

*(3) Addition and extending.*—The word "extending" is a commercial term commonly employed by merchants in making out invoices wherein a number of articles are itemized at so much per dozen or piece, after which the extensions are carried out, these extensions being the product of the number of articles multiplied by the price per article or dozen articles as the case may be. The example given involves the printing of numbers in a vertical column with a footing at the bottom thereof, and these may be said to represent numbers of articles, each of which is multiplied by a certain number which may indicate the price of the article, the products being placed opposite in a vertical column at the bottom of which is a footing. In this example the number "123" we will say indicates a number of articles, and the keys in bank A are struck so that the active totalizer will register these numbers upon the pull of the handle. Before the handle is pulled, however, the key marked "R" is pressed which causes the number "123" to be set up in the multiplying devices. As the number "123" is to be multiplied by 12, 12 may be written in by operating the numeral keys of the typewriting mechanism, but to obtain the product 1476 (123×12), the following operations of the adding mechanism are necessary: In the group of keys B, each of which bears a numeral, preferably in a color different from the numerals on the keys of group A, and being represented by dotted lines and running from "1" to "9" including the "0" character, as in the case of the keys of group A, the "1" key will be struck and the operating handle pulled twice, then the "2" key in group B is struck and the operating handle pulled twice. This places the product in the rear totalizer and this may be printed as an extension by adjusting the carriage laterally, pressing the "P" key and operating the handle, the "P" key being released at the end of the forward stroke of the handle to clear the rear totalizer for another operation. When the "P" key is pressed the product will be registered in the forward totalizer in operative relation to the rack bars at the time of printing said product. The carriage is now adjusted to aline the printing type of the adding mechanism with the first column, when the number "456" is set up on the keys in group A, the "R" key depressed, and the handle pulled once. This number "456" now appears in the multiplying devices and is also registered in the forward totalizer in operative relation to the rack bars in this position of the carriage. The multiplier "54" may be written in by the use of the numeral keys of the typewriting mechanism when the carriage is adjusted laterally to place the printing type of the adding mechanism in line with the "product" column. The "5" key in group B is now depressed and the handle pulled twice, after which the "4" key is depressed and the handle pulled twice. This next pull of the handle in the operation of printing the product places the product in the front totalizer. When the "P" key is depressed to print the product in the column at the right, the carriage must be shifted accordingly, which places the totalizer wheels identified with said right-hand column in operative relation to the rack bars so that the product is added to the one previously registered in the forward totalizer. The rear totalizer is of course cleared for the next operation, which, when performed as above indicated, completes the example and by properly positioning the carriage the sum of numbers registered in the first column may be printed as a total by pressing the "T" key and pulling the handle, and by re-positioning the carriage, the sum of the products in the forward totalizer may be printed by pressing the "T" key and pulling the handle. If it is desired that these totals shall remain in the front totalizers, the "T" key is held down until the handle returns home. If it is desired to clear the forward totalizers the "T" key is released when the handle reaches the forward limit of its movement.

(4) *Lineal addition and multiplication.*— This example may be performed by striking the numbers on keys A as in the case of lineal addition heretofore described, and when the total is obtained in front of the forward totalizer, by pressing the "E" key and pulling the handle this total will be printed and set up in the multiplying devices. Or the example may be performed, so far as the lineal addition of the numbers 275 79 834 135 is concerned, by setting these numbers up on the keys in the group A, pressing the "D" key and adding them together in the rear totalizer, the carriage being spaced laterally so that the total "1323" may be printed by pressing the "P" key. This clears the rear totalizer and places the total in one of the forward totalizers. To multiply this total by "8¾" the fraction must be reduced to a decimal so that the number will appear as "8.75". When the number is in the forward totalizer the same can be set up in the multiplying devices by pressing the "E" key and pulling the handle. This clears the forward totalizer. The process of multiplication is the same as that heretofore described, to wit, the "8" key (being the highest order in the multiplier) is pressed in the group B and the handle pulled twice, after which the "7" and "5" keys in group B are pressed and the handle pulled twice after each key is operated respectively. This places the product in the rear register and by pressing the "P" key and pulling the handle once the product "11756.2" will be printed. Deducting 5% from this number may, as is well known, be done by multiplying the number by ".05" and subtracting the product from the multiplicand; or the more direct method would be to multiply the multiplicand by ".95", equaling 95%. This latter method is practised in the machine, and to set up the number in the multiplying devices from the forward totalizer the key "E" is pressed and the handle pulled, after which the "9" key of group B is pressed, the handle pulled twice, and the "5" key in group B pressed and the handle pulled twice. The decimating key is now operated twice, when the "P" key can be pressed and the product in the rear totalizer can be printed.

(5) *Sample tax list.*—This example is substantially the same as the third, "Addition and extending". Of course, the words at the top of each column are printed in by the typewriting mechanism as well as the district numbers and rate.

(6) *Sample invoice.*—This example is similar to the "Sample tax list" and illustrates the utility of the machine in writing invoices where the number of pieces are to be multiplied by the price per piece, the product printed in the column at the right, which column may be totalized as before described. This sample invoice shows that it is also possible where a number of articles of different yardage or weights, but at the same price per yard or pound, are to be listed, the yardage or weights can be first ascertained by totalizing them in the first column, then by pressing the "T" key print the total thereof and place said total in the rear totalizer to be multiplied by the price per yard or pound, as the case may be.

(7) *Sample rent list.*—This is similar to the invoice except for the statement of discounts in the nature of commissions at the bottom, which are ascertained by multiplying the amount collected or a portion thereof by the rate or rates of commission and adding to the product the products determined by multiplying the sum by the rate of commission. For instance, there is 1% commission charged on $50.00. This is performed by setting up the amount on the keys in group A, pressing the "R" key, and placing that number in the multiplying devices. Then, by pressing the "1" key in the group B and pulling the handle twice, the product is introduced in the rear totalizer. By pressing the decimating key twice, and then pressing the "P" key the product is printed and introduced into the forward totalizer.

The second charge of 3% commission on $50.00 is performed in the same way.

To obtain the sum of the check for balance, "$50.00" is introduced into the multiplying devices, setting up that sum in the multiplying devices through the keys of group A, and pressing the "R" key, after which it is multiplied by "99". The second item of "$50.00" is similarly multiplied by "97". Devices are provided on the machine for preventing the printing, or a record being made, of calculations such as these, and consequently they do not appear in the example. In order, however, to illustrate what is meant by the above, the following may be referred to:

$$50.00 \times .01 = .50$$
$$50.00 \times .03 = 1.50$$
$$50.00 \times .99 = 49.50$$
$$50.00 \times .97 = 48.50$$

100.00

(8) *Sample freight bill.*—This example is performed on the machine in the following manner: The articles are written in with the typewriter such, for instance, as "100 bbls. of apples." The weights "19600" are struck on the keys in group A and by pressing the "R" key in this number "19600" is printed, when the handle is pulled, and also set up in the multiplying devices. The rate ".19" is printed by the typewriting keys after properly spacing the carriage. The product of the weight multiplied by the rate appearing in the "Amount" column is produced in the usual manner, viz., by striking each rate number, commencing with the highest order, on the keys in group B and pulling the handle for each number. The decimating key marked "Dec." in the key-board of the typewriter will now be pressed twice so as to reduce the number to hundredths, making the proper charge at per hundred rate. The "P" key is now pressed and held down while the stroke is made with the handle, which prints the product in the "Amount" column, said product being retained in the rear totalizer and added in the middle set of forward totalizers. In order to print the back charges, the same are struck on the keys in group A, after which the "D" key is depressed and held down while the handle is making a full stroke. This adds the back charges to the product in the rear totalizer in addition to printing the amount of the back charges in its proper column. The platen is now spaced, the "P" key is pressed and the handle pulled in order to print the sum of the product "37.24" (19600×.19 per 100 lbs.) and the back charges "12.35," to wit, "49.59" as appears in the "Total" column. This amount "49.59" is added in the forward totalizers which are properly positioned by the typewriter carriage and is thus registered to be added to items made up of corresponding charges in order to produce the total of the products plus back charges.

In the last item of the example, where no back charges are indicated, the operation of introducing the back charges into the rear totalizer by pressing the "D" key at the time of printing said back charges is, of course, omitted, and the typewriter carriage is properly spaced in order to print the total of the product in the "Total" column and register the same in the forward totalizer to produce the total of this column. The totals in the "Weight" column, the "Amount" column, and the "Total" column which have been separately totalized in the forward totalizers in the usual manner are obtained by pressing the "T" key when the typewriter carriage is properly positioned, and pulling the handle. Of course, it will be understood that the tabulating stops are properly set on the typewriter carriage to position the carriage for these various columns.

(9) *Squaring and cubing a number.*—To square a number it is obvious that the number is multiplied by itself once, and this can be done by setting up the number on the keys in group A and pressing the "R" key so as to place said number in the multiplying devices, after which the number is multiplied by itself and the product obtained.

To cube a number, the number is set up on the keys in group A, the "R" key pressed and the handle pulled, after which the groups of totalizers are shifted so as to bring a new set of totalizer wheels into operation with the rack bars; otherwise, the number to be cubed would be in the forward totalizer and make the answer to the problem wrong. Another way of doing this without necessitating the shift of the forward totalizer would be to set up the number to be multiplied in the forward totalizer, depressing the "E" key and pulling the handle, which would take said number out of the forward totalizer and set it up in the multiplying devices. The number to be cubed is now multiplied by itself and the "P" key pressed and the handle pulled, which clears the rear totalizer and places the product in the forward totalizer. The "E" key is now pressed, which transfers the product of the number multiplied by itself from the forward totalizer to the multiplying devices, leaving the forward totalizer clear. The multiplying keys in group B may now be operated for the second multiplication and the product, which is the cube of the number, registered in the rear totalizer. This product can be printed by pressing the "P" key and placed in the forward totalizer, the rear totalizer being cleared at the end of the operation.

If it is desired to carry the number to a higher power, the "E" key may be operated to transfer the number from the forward totalizer to the multiplying devices, whereby the repetition of this operation will permit the multiplication of the number by itself an indefinite number of times.

(10) *Sample discount sheet.*—This example is performed in the following manner: The price per article is set up on the keys in group A and the "R" key pressed and the handle pulled, after which the totalizer wheels are shifted to locate a clear set of totalizer wheels in operative relation to the rack bars. This number is multiplied by the first discount, to wit, 100 less the percentage of discount, in this instance the discount is 80%, and therefore the price would be multiplied by 100% less 80% equals 20%, and the resultant product would be "2.". To obtain the product it is obvious that the decimating key must be operated twice before the handle is pulled in order to properly position the decimal point. This product is obtained by pressing the "P" key and pulling the handle, which places the product in the forward totalizer, after which the "E" key is pressed to set up the product in the multiplying devices and clear the forward totalizer.

The second discount is now computed, to wit, 100 less 7% equals 93% by which the number set up in the multiplying devices is multiplied. The product obtained from this operation is treated in the same manner as the product first obtained, and when set up in the multiplying devices is multiplied by the result of 100 less the amount of the third discount, to wit, 98%.

In the second example of the discount list the fourth discount is obtained in the manner above described.

Instead of using the "R" key in originally setting up the price of an article to be discounted, the price of the article can be introduced into the forward totalizer in the usual manner without operating the "R" key, after which, by pressing the "E" key and pulling the handle, the example will be set up in the multiplying devices and the forward totalizer cleared. The multiplication can now be performed as before.

(11) *Complementary subtraction.* — In the example of complementary subtraction given, the amounts deposited are set down opposite the respective dates of deposit, and the amounts checked out are set down opposite the respective dates when the checks were presented for payment. It will of course be understood that the example given is merely illustrative, as in arithmetical computations there are many instances where subtraction can be performed, such, for instance, as deducting discounts or commissions, etc. So far as the totalizers of the machine are concerned, in the example given, the sum total of deposits amounting to $123 will be treated as a single number, and the sum total of the amount checked out, to wit, $85, will also be treated as a single number, as these numbers stand as such in the totalizers.

The simplest way to perform the operation of complementary subtraction is to set up the deposits in one of the forward totalizers and the amounts checked out on another one of the forward totalizers; as, for instance, the totalizer at the left would exhibit $123 and the middle totalizer $85. The former in this instance may be designated as the minuend totalizer and the latter the subtrahend totalizer.

To obtain the complement of the subtrahend, a series of nines is set up in the rear totalizer. The following is illustrative of the relation of the totalizers under these conditions:

```
        9999
0123    0085
```

The P and T keys are now simultaneously depressed and the handle pulled forward, causing the racks to engage the rear or third totalizer and the subtrahend totalizer, and on their forward movement the racks would be arrested when the reverse rotation of the active wheels of the subtrahend totalizer reached zero, causing said subtrahend totalizer to stand cleared and the rear totalizer to exhibit the difference between its wheels set at the "9" position and the movement of the racks.

The rear or third totalizer now contains the complement of the number 85 formerly set up in the subtrahend totalizer, or a series of 9 and 14, 14 being the complement of 85. The following illustrates the condition of the totalizers when standing thus:

```
        9914
0123    0000
```

The forward totalizers are now shifted so as to place the minuend register into operative relation to the racks as per the following illustration:

```
9914
0123    0000
```

The D and T keys are now depressed and the handle pulled, which causes the racks to engage both the rear or third totalizer and the minuend totalizer, which results in the addition of the complement of the subtrahend to the minuend, so that the totalizers now stand as follows:

```
0000
0037    0000
   1
   ──
0038
```

It will be seen from the above illustration that the number 37 standing on the minuend register is not the correct remainder, and it is therefore necessary to add 1 when obtaining the remainder in the manner above given for the purpose of getting a correct answer. The 1 may be added either at the end of the operation or before beginning the subtracting operation. The purpose of adding the 1 is to compensate for the elimination of the nines. In additive registers where the carrying mechanism which operates when the wheels are moving in an adding direction, it is necessary in obtaining the complement of a number to set up wheels of a certain register at "9," which is one less than the tenth or zero position of the wheels. The "1" must therefore be added to move the wheels to their zero or normal position before the correct remainder can be obtained. As stated before, this "1" may be added in the minuend register before the operation of subtraction begins, or it may be added to the remainder after the subtracting operations have been practically completed.

Another method of complementary subtraction may also be performed on my improved machine, and in this second method which I am about to describe, it is unnecessary to add the 1 to the minuend register or to the remainder to compensate for the ninth (instead of the zero) position of the wheels in the rear or third totalizer. To perform this second method of subtraction, the number 123 is set up in the minuend register, and the number 85 is set up in the subtrahend register, both being forward totalizers as before. The complement of the minuend may now be obtained by setting up a series of nines in the rear or third totalizer, the registers bearing the following relations to each other:

9999
0123    0085

By depressing the P and T keys and pulling the handle, the rear totalizer will contain the complement of the number formerly set up in the minuend register or a series of nines and the numbers 876, which numbers 876 are the complements of the number 123, the minuend register standing clear at the end of the operation as illustrated in the following:

9876
0000    0085

The forward totalizer is now shifted so as to place the subtrahend register in operative relation to the racks, as shown in the following illustration:

9876
0000    0085

The D and T keys are now depressed so as to add the complement of the minuend to the subtrahend in the rear totalizer, which shows a series of nines followed by the sum of the subtrahend and the complement of the minuend, or 85 plus 876 equals 961. The subtrahend register stands clear at the end of this operation as illustrated in the following:

9961
0000    0000

To obtain the remainder it is now only necessary to determine the complement of the number set up in the rear totalizer, which, as before stated, consists of a series of nines followed by the numbers 61. A series of nines is now set up on what was the subtrahend register, as illustrated in the following:

9961
0000    9999

The P and T keys are now depressed and the handle pulled, which causes the former subtrahend register to exhibit the complement of the sum of the subtrahend and the complement of the minuend, or 38, which is the difference or remainder after subtracting 85 from 123. This 38 can be printed by pressing the P key and again pulling the handle.

*Repeating a number.*—To repeat a number, that is, set up a number on the key board and add the number set up a number of times in the totalizer, without operating the keys of the key board each time the number is introduced into the totalizer, two methods may be employed. In the first, the example to be repeated in the totalizer is set up on the keys in group A, after which the platen is turned back so that no record will be made of this number. The "D" key is now pressed down so as to introduce the number into the rear totalizer. The platen is lowered to normal position and the "P" key is held down while the handle is pulled as many times as the number is to be repeated in the forward totalizer. By releasing the "P" key and depressing the "T" key the total of the number repeated in the forward totalizer may be obtained.

Another method is to introduce the example in the ordinary way in the forward totalizer, lifting the platen so that the type will not print in such an operation; then by holding the "D" key down the item may be repeated and recorded a number of times and accumulated in the rear totalizer. When the required number of items have been repeated and printed the "D" key is released. To obtain a total of the items accumulated in the rear totalizer, the "P" key is operated and the handle pulled.

It may be well to state here, in the operation of the machine wherever a "0" occurs in a number being introduced into the machine through either of the groups of keys A or B, the "0" key has to be struck the same as the numeral keys; further, when a key in group B is struck in the operation of multiplication, the handle must be pulled twice except when the "0" key is struck, when the handle need be pulled but once, which moves the rear totalizer one step to the left and is equal in effect to multiplying the number thereon by "10." For all other operations of the adding mechanism the operating handle is pulled once. The carrying device for the forward and rear totalizers are so constructed that at the end of the rearward movement of the handle the totalizer wheels stand fully carried. It may also be well to state that means are provided in the machine for stepping the rear totalizer to the right for the purpose of decimating a product and also for eliminating unnecessary decimals. This means is under the control of a key which, for the sake of distinction, may be called a "decimating" key.

In the operation of multiplication, the number of highest order is first struck and successively the numbers in each succeeding lower order are struck and the handle pulled twice, except for the "0." This advances the rear register one step to the left for each order, and when the product is printed the rear register is restored to normal position, in readiness for another multiplying operation. Means are provided which are operable by the carriage of the typewriter to automatically restore the rear register to normal position after the printing of a product. For convenience of reference the several groups of keys have been included in brackets in Fig. 2 of the drawings, group A being the keys used in the ordinary additive operations of the machine; group B including the keys used in connection with the multiplying operations of the machine; group C including the keys of the typewriting mechanism containing the characters usual in a key-board of this kind; and group D including the tabulating keys, four in number. In the typewriting key-board is a key marked "Dec." which is the decimating key, and opposite the group A are keys marked "R," "D," "E," "T," and "P" heretofore referred to, the letters on these keys being abbreviations of:

"R"=Recording.
"D"=Decimal.
"E"=Extending.
"T"=Total.
"P"=Product.

In the following description, for the sake of convenience, I shall employ appropriate headings in connection with the various parts of the machine:

*Typewriting mechanism.*—The typewriting mechanism consists of the usual keys and key-board whose keys are comprehended within the group C, to which keys are connected the usual key bars 1. 2 is the spacing key of the keys and typewriting mechanism which, with the bars 1, operates a spacing bar 3, see Fig. 3, connected to the escapement mechanism of the typewriter carriage. The typewriter carriage consists of a frame 4 mounted in suitable tracks, preferably ball bearing, and supports a carriage 5. This carriage, as shown in Figs. 9 to 17, is provided with an escapement rack 6 with which coöperate escapement pawls 7 connected to a rod 8, which rod is in turn connected to the escapement rack 6. Whenever the rod 8 is vibrated the carriage and its connected parts move to the left the distance of one letter space, the impelling power being a spring-actuated cable 9 shown in Fig. 11 as is well understood.

10 indicates a hand lever carrying a pawl 11 coöperating with a ratchet 12 on the end of the platen, whereby when said hand lever is depressed the platen is caused to rotate a part of a revolution to effect a line-spacing movement. 13 indicates a swinging plate mounted in the carriage adjacent the escapement pawls whereby when said plate is swung rearwardly the escapement pawls are thrown out of operative position so as to permit the carriage to respond to the action of its motor spring and move freely toward the left until arrested by some means. This plate 13 may be operated manually by a lever 14, see Fig. 16, or it may be operated by the tabulating keys D of the typewriting machine.

*Tabulating keys.*—Referring to Figs. 18 and 19, it will be observed that the tabulating keys D are mounted on levers 15 whose rear ends, as shown in Fig. 3, are connected to bars 16, the upper ends of said bars 16 being provided with a shoulder which is located under the swinging plate 13. 17 indicates adjustable stops pivotally mounted on a bar 18 arranged on the carriage, said stops in normal position being received at their lower ends in notches in the front edge of the escapement rack 6, their upper edges fitting in notches in a scale bar 19 mounted on the carriage of the typewriter. 20 indicates a notch in the forward edge of the stop 17, which notch, when the stop is swung on its pivot bar 18, registers with the scale bar 19 and permits the stop to be moved longitudinally so as to be positioned according to the will of the operator. There are preferably three of these adjustable stops on the carriage so that the operator is thus enabled to regulate the widths of the column spaces.

In operation, the typewriter carriage may be moved to its extreme position at the right and the typewriter keys are operated, as, for instance, in writing in the date. If it is desired to position the carriage for the first column of figures to be printed, one of the tabulating keys D is depressed which swings the bar 13 rearwardly, releasing the escapement pawls, and at the same time placing the upper end of bar 16 in the path of the lower end of stop 17 whereby the carriage is arrested. Upon releasing the tabulating key, bar 13 is permitted to swing forwardly so as to enable the escapement pawls to again enter into coöperative relation with the escapement rack 6. After a number is printed in the column according to the position of the stop, the operation of a tabulating key will again position the carriage for the next adjacent column, at the right, bar 16 in this instance coöperating with the second stop 17, and so on.

*Operating the escapement by adding keys.*—The bars *a* which are connected to the keys of group A preferably converge and are mounted on a common pivot 21, said bars extending rearwardly beyond said pivot for purposes hereinafter to be described. Referring to Fig. 110, it will be seen that the ends of these bars extend under a plate 22 pivotally mounted in the free end of a yoke frame 23 pivoted on the rod 24. This yoke frame has a forward extension 25 which rests on top of the spacing bar 3 of the typewriter, see Fig. 3. In this manner if the carriage is positioned for any particular column, the operation of keys in group A will depress the bar 3 and actuate the escapement mechanism of the typewriter carriage; thus the typewriter carriage will be moved laterally, step by step, a number of spaces equal to the number of figures to be added in that column. The operation of the carriage escapement from the keys in group A is particularly useful in lineal addition as there it is only necessary to strike the space key once after the printing of each number.

*Locking the carriage against lateral movement.*—In certain operations of the machine, as, for instance, printing vertical columns, it is necessary to lock the carriage against lateral movement in order that the figures of each denomination shall appear one under the other. The stops 17 are useful in this operation, as said stops may be adjusted to proper positions, after which one of the tabulating keys in group D may be depressed and locked down, in which event the upper end of bar 16 serves as a permanent stop for the carriage. Referring to Figs. 23 and 24, it will be seen that a shouldered post 26 is arranged by the side of one of the tabulating key bars 15 so that when said bar is depressed it may be moved laterally under the shoulder of the post, and thus the tabulating key will be held depressed and the bar 16 held elevated. It is only necessary to move the tabulating key laterally to release it in order to free the carriage and permit its lateral step-by-step movement. It is obvious that the bar 16 connected to the tabulating key adjacent the post 26 may coöperate with any one or all of the stops 17.

*Line-spacing.*—In the ordinary use of the typewriting mechanism it is obvious that when a line is written the platen must be rotated for line-spacing which is accomplished by the operation of the lever 10 heretofore described. In the operation of the adding mechanism, as, for instance, in printing a column of numbers to be added together, it is obvious that the line-spacing mechanism must be automatically operated in order to avoid the necessity of manual operation after the printing of each item. The automatic operation of the line-spacing mechanism is accomplished by means under control of the handle which operates the adding devices.

Referring now to Fig. 11, it will be seen that a rigid bracket 27 is secured to the frame of the typewriting machine, to which bracket is pivoted a lever 28. The end of this lever is connected to a bar 29 which, as shown in Fig. 3, is connected at its lower end to a rock arm 165 mounted on a rock shaft identified with the printing mechanism, which rock shaft is operated whenever the actuating handle for the adding machine is operated, except when the printing mechanism is disabled in the operation of obtaining the tens and units partial products, hereinafter described, in which operation (of obtaining the tens and units partial products) both the printing mechanism and the line spacing mechanism are disabled. By this means whenever the printing mechanism is operated the bar 29 and its connected lever 28 are operated. Lever 28 carries two pins 31 arranged above and below the bar 32, which bar is mounted in rock arms 33 pivoted on the rod 18. One of the rock arms 33 is extended forwardly and carries an operating pawl 34 which coöperates with the ratchet wheel 12 of the platen. By this construction it will be observed that the typewriter carriage with its bar 32 may be moved laterally, and in its different laterally adjusted positions the bar 32 maintains operative relation with respect to the pins 31; thus line-spacing of the platen from the printing mechanism of the adding machine may be effected in all the positions of the carriage.

In operations involving lineal addition, it will be obvious that the line-spacing mechanism operated by the handle must be rendered inoperative; otherwise the platen would have to be re-set by hand after each pull of the handle. This is done by extending the upper end of bar 29 through a sliding bracket 29$^a$ mounted on the frame of the typewriter and providing the upper end of said bar with a handle 29$^b$, which handle may be grasped by the operator and the bar 29 shifted forwardly where it is held by friction so as to be out of engagement with the lever 28. Thus, when the handle is pulled the bar 29 will be idly vibrated and the lever 28 will not be operated.

*Tilting the typewriter carriage.*—As it is desired at times to tilt the platen in order to observe the impressions on the paper, I provide means for accomplishing this without disturbing the position of the pawl 34.

Referring to Fig. 13, it will be noted that the links 35 swing from the main frame of the typewriter carriage and support at their lower ends the supplemental frame 5, in which latter frame is journaled the platen. This frame 5 carries a lever 37 provided with a forwardly extending handle whereby, when said handle is lifted, the frame 5 is first moved forwardly so as to disengage the platen-ratchet from the pawl 34 (the links 35 permitting such forward motion), after which the upward pull on the handle extension of lever 37 swings the frame 5 and its carried platen about the axis of the rod 38 on which the links 35 are mounted.

*Controlling the position of the forward totalizers from the typewriter carriage.*—Referring to Fig. 12, it will be seen that the main frame of the typewriter carriage carries a scale bar 39, the rear edge of which is notched. On this scale bar are one or more adjustable blocks 40, the details of construction of which are best illustrated in Figs. 20 and 21. The lower face of block 40 is provided with a way to receive the scale bar 39. 41 indicates a pin mounted in the block 40, said pin being provided with a striking point 42 at its rear end and also with a tooth 43 which is designed to fit in the notches of the bar 39. A spring 44 bears against a projection on pin 41 and tends to hold the tooth 43 in its notch. By pressing the pin 41 rearwardly the teeth 43 may be disengaged from the notch and the block adjusted along the bar 39. Releasing the pin causes the tooth 43 to enter a notch and lock the block in its adjusted position. There are two of these blocks 40, as shown in Fig. 2, and the projections 42 carried thereby are designed to coöperate with a tappet 45 mounted on a sliding bar 46. This bar is connected at its rear end to an escapement lever 47, which escapement lever, when vibrated, permits the forward totalizers to move from right to left. In order to better understand this construction reference should be had to Fig. 56, wherein it will be seen that the shaft 48 on which the forward totalizers are mounted finds bearings in two frame plates 49 pivoted at their rear ends on a shaft 50.

51 indicates a lever which may be pivoted to the end of shaft 50, the free end of said lever being connected to the end of shaft 48. A spring 52 tends to draw the lever 51 toward the left looking from the front of the machine (or toward the right, as shown in Fig. 56, looking from the rear of the machine), and consequently whenever the lever 47 is vibrated its escapement teeth 47ª will coöperate with projections 48ª on rod 48 and permit said rod and its carried totalizer wheels to move under the action of spring 52. Thus, if the typewriter carriage is moving toward the left and one of the projections 42 should strike the inclined face of the tappet 45, the bar 46 would be forced rearwardly, throwing the front tooth 47ª in the path of the pin 48ª on shaft 48, the release of the tappet causing the escapement lever 47 to move forwardly under the impelling action of a spring 47ᵇ connected therewith, so as to cause the rear tooth 47ª to be located in the path of the next projection 48ª on the rear side of shaft 48. In this position of shaft 48 the left group of totalizer wheels will be displaced with respect to their actuators and the middle group of totalizer wheels will be placed in position with respect to said actuating devices. If, now, the next block 40, in the continued step-by-step movement of the typewriter carriage to the left, should have its projection 42 strike the inclined face of the tappet 45, the escapement bar 47 would again be vibrated so as to permit spring 52 to move the middle group of totalizer wheels out of position with respect to the actuators and place the right-hand group of totalizer wheels in position with respect to said actuating devices. Thus by means of the blocks 40 and their carried parts it will be obvious that the bar 47 may be vibrated in different positions of the typewriter carriage, depending upon the adjusted position of the blocks 40.

Figure 1:
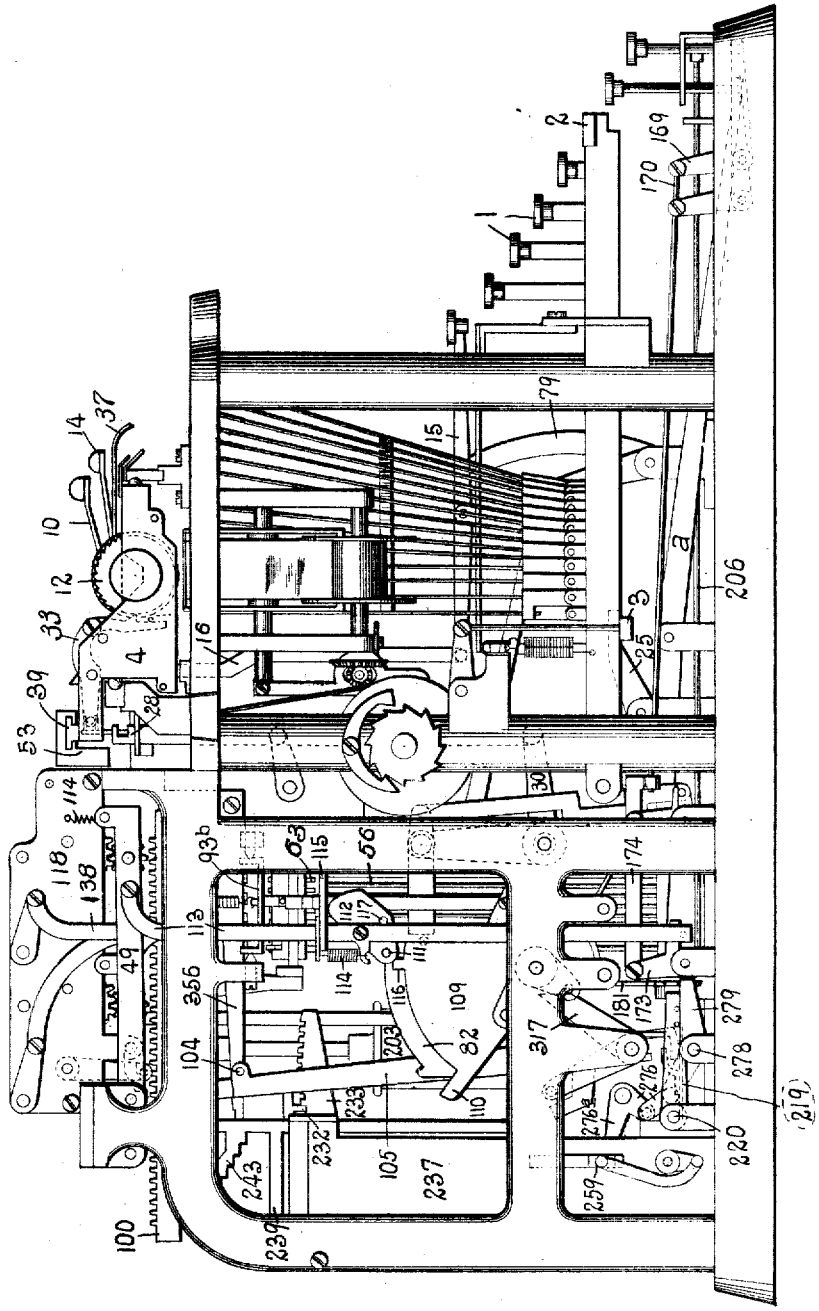
Figure 1 is a side elevational view of my improved calculating machine.

As it is necessary to restore the groups of totalizer wheels to their initial position when the typewriter carriage is restored, means are provided for accomplishing this, which means consist of a block 53 similar, so far as its adjustable feature is concerned, to the blocks 40 except that the block 53 is not provided with a projecting tooth 42. Block 53, however, is provided with a downward extension, see Fig. 1, which downward extension coöperates with the end of a rod 54 mounted in suitable guides 55 secured to the top frame plate of the typewriting machine. This rod 54 is connected at its end to the shaft 48 and consequently when the typewriter carriage is moved from left to right the downward extension on block 53 engages the rod 54 and moves the totalizers to their position at the right.

As the typewriter carriage travels from right to left the blocks 40 will coöperate with the tappet and properly position the left-hand, middle or right-hand group of totalizer wheels in operative relation to their actuating devices. If it is desired not to position the forward groups of totalizers upon the movement of the typewriter carriage it is obvious that both blocks 40 could be moved to the extreme left-hand end of the scale bar 39, so that they would not coöperate with the tappet 45 in the movement of the typewriter carriage.

In the further description of the machine I will not distinguish between the groups of forward totalizer wheels as it is immaterial in the operation of the adding machine which particular group might be in operative position with respect to the actuating devices.

As before stated, the keys in group A constitute what might be termed the adding keys, and these keys are mounted upon the ends of key bars *a* which are pivoted at 21. The rear ends of these key bars are preferably deflected as shown in Fig. 5, and terminate respectively under the lower ends of vertical bars 56. Bars 56 are guided in their vertical movement by suitable guide plates and terminate at their upper ends beneath setting-up devices in a transversely movable carriage.

*Setting-up devices.*—The details of this carriage are best seen in Figs. 37 to 40, t where it will be observed the carriage consists of a frame 57 provided with rollers mounted in tracks 58. These tracks are pivoted at one end to the framing of the machine, see Fig. 33, the opposite end of said track frame being supported upon a post 59 extending from one of the cross bars of the framing.

60 indicates a spring drum arranged at the free end of the track frame and over which passes a cable 61, said cable being connected to the transversely movable carriage, as shown in Figs. 33 and 37. This spring drum constantly exerts an energy tending to move the setting-up carriage toward the left. The arrangement of the digit keys and their key bars is such that the rearmost vertical bar 56 is identified with the zero digit, the next bar with the "1" digit, etc., the forward bar being identified with the "9" digit key.

The setting-up devices in frame 57 consist of a series of pins 62, each of which is provided with recessed portions 63 and 64 forming shoulders. The upper ends of the pins are also provided with inclined faces 65 which coöperate with a top flange 66 of the channel-shaped pin housing of the carriage. Springs 67 are connected to pairs of pins 62 so as to force the same laterally in opposite directions and hold them in proper position in the top and bottom parts 66 of the pin housing.

A series of pins constitutes setting-up devices for each denomination up to the capacity of the machine and is designed in the movement of the carriage to successively aline with the bars 56. For instance, if it were designed to introduce an item 123, the corresponding keys in group A would be successively struck, which would cause the bars 56 identified therewith to successively coöperate with the series of pins 62 commencing with the second or "1" pin in the left-hand series, then with the third or "2" pin in the next series, and the fourth or "3" pin in the next adjacent series. Means are provided for stepping the carriage from right to left, said means being actuated upon the depression of each key, and these will be referred to later.

After the pins have been raised so that their upper ends project above the top plate 66, it is obvious that said pins must be restored before another example can be introduced into the machine. The restoration of the pins 62 is accomplished by means of a restoring bar 68 which is mounted on track frame 58. This restoring bar is provided with cam faces forming substantially entering points 69 whose function is to force the pins 62 laterally so as to disengage the upper shoulder of recess 64 from the part 66. Then, as the carriage moves toward the right the upper end of the pin engages an inclined face 70 on the lower side of the restoring bar 68, which face 70 forces the pin 62 down to its home position or until the cam face 65 engages with the side edge of its opening, which cam face 65 on the pin will restore it home. This extra movement resulting from cam face 65 is necessary in order that the pins 62 may be depressed so as to clear the restoring bar 68. By this construction it will be noted that when any of the pins 62 are raised said pins will be locked in their raised position and remain so locked until the carriage is moved toward the right, in which event the restoring bar 68 will depress all of the elevated pins. These pins 62 constitute the setting-up devices and are located between the key-board and the stops which directly control the movement of the adding machine parts.

To set up an item in the setting-up devices it is only necessary, therefore, to strike the keys in succession beginning with the highest denomination, when the pins 62 corresponding to the example introduced on the key-board, will be elevated and locked in their elevated position.

*Preventing movement of the idle rack bars.*—As shown in Figs. 33 and 34, the traveling carriage normally occupies a position at the right, and the series of setting-up pins at the extreme left-hand side of the carriage lie under the series of stops at the extreme right-hand side of the stop field, which latter series of pins 93 are identified with the decimal rack bar. In this manner, if a key in group A is struck and the "D" (decimal) key is operated simultaneously therewith, the traveling carriage will not be moved and, when the handle is pulled the setting-up pin will lift the stop pin identified with the decimal rack bar. This decimal rack bar is so-called because each of the printing type carried thereby is provided with a decimal point in front thereof.

57ª indicates a stop-pin-lifting projection which is secured to the traveling carriage 57 and which normally lies under all of the zero stop pins from and including the unit denomination up to the highest denomination in the machine. The purpose of this stop-lifting device is to raise all of the zero stop pins to the left of the highest series containing an actuated pin, whereby all of the rack bars of higher denominations are prevented from movement, and only those which are to be active are permitted to move forward to positions determined by the elevated stop pins of a higher order than zero.

By referring to Figs. 39 and 40, it will be seen that the restoring bar 68 is provided with a groove in its under face alining with the stop-pin-elevating bar 57ª whereby said lifting device may pass under said bar 68. Means hereinafter described other than the lifting device 57ª are provided for preventing the forward movement of the decimal rack bar, said means, however, being operated to release said bar when said bar is to be brought into action.

*The escapement.*—Referring to Figs. 34 and 107, it will be seen that the operation of any of the keys in group A will rock the shaft 24 heretofore described. On this shaft 24 is mounted an escapement arm 71 which carries a fixed plate 72 occupying a position normally under the teeth of the toothed escapement segment 73. A pawl 74 is carried by arm 71 and normally engages the teeth of the segment 73. A spring 75 tends to force the pawl 74 to one side, the distance of one tooth, so that when the arm 71 is elevated the fixed plate 72 enters a space between two teeth, and the pawl 74 is released. When the arm 71 is depressed the pawl 74 enters the next adjacent space and permits the escapement segment, when the plate 72 is disengaged therefrom, to move the distance of one tooth. Thus the vibration of arm 71 enables the escapement segment 73 to rotate step by step. This segment 73 is fixed to a vertical shaft 76, which shaft carries at its upper end a segmental gear 77 meshing with a rack 78 on the traveling carriage 57. In view of the fact that the spring drum 60 is constantly exerting an energy to pull the setting-up carriage toward the left, it will be obvious that whenever a key in group A is depressed the traveling carriage will be held stationary by the fixed escapement plate 72, while the setting-up pin is being raised, and after the pin has been raised and when the key is released the depression of the arm 71 will permit the traveling carriage to move one step toward the left.

*Transferring from the setting-up pins to the stops.*—79 indicates an operating handle mounted on the frame of the machine and connected by a link 80 through a spring transmission to be hereinafter described, to a rock shaft 81. On this rock shaft 81 is mounted a cam 82, see Figs. 34 and 68, which cam, at its forward edge, carries a pin 83. In the path of this pin 83 is a detent 84 arranged on the end of a rock arm 85 pinned to a rock shaft 86. Shaft 86 carries a rock arm 87 on the end of which is connected a rod 89, the upper end of said rod terminating under the free end of the frame 58, see Fig. 36; thus, upon the initial movement of the handle the rod 89 is elevated, raising the frame 58 and its carried setting-up pins. The pin 83 traveling in an arc of a circle will only engage the detent 84 for a short part of its movement, and when said detent is released the frame 58 drops to normal position. When the pin 83 returns to normal position, as when the operating handle moves home, the pin 83 lifts the detent 84 without elevating the frame 58.

The raising of the frame 58 together with the carriage containing the setting-up pins operates the stop devices in the paths of the elevated pins, which stop devices are more clearly shown in Figs. 42 to 45 inclusive, and may be described as follows:

90 indicates frame bars which support cross bearers 91, on which cross bearers are channel-shaped supports 92 for the series of stop pins 93. These stop pins like the setting-up pins, are preferably connected together in pairs by springs and may be elevated, one in each longitudinal series, by the pins 62. The stop pins 93 are not, however, locked in their elevated positions, but held by friction under the energy of springs, as they only occupy such positions temporarily. The lower end of each stop pin or pair has a shoulder which extends toward its companion and between these pairs of stop pins are the fingers of a restoring plate $93^b$, said fingers being in the nature of the fingers of a comb, the plate proper being shown in Fig. 31, said plate being pivoted to the frame of the machine, as shown in Fig. 32. Means for operating this plate consists of a bar 94, see Figs. 34 and 63, the lower end of which bar is pivotally connected to an arm 95 loosely mounted on the shaft 86. The end of this bar 95 carries a spring-pressed detent 96 provided with an inclined forward edge. A plate 97 pinned to the shaft 81 is provided with a pin 98 at its upper end, which pin, when the operating handle is pulled, is designed to travel in an arc of a circle, and in whose path is included the detent 96. On the forward stroke of the handle, to wit, when the pin 98 moves forwardly, the detent 96 is idly vibrated and consequently the arm 95 is not actuated. However, as the handle returns home and the pin 98 moves back to its normal position said pin engages the inclined face of detent 96 and depresses the arm 95, which, by means of the bar 94, depresses the plate $93^b$ and restores the stop pins to their normal or lowered position. Plate $93^b$ and its connected parts are held in an elevated position by means of a spring 98, see Fig. 34.

From the above it will be observed that the positioning of the stop pins 93 is so timed with relation to the other parts that it occurs upon the initial movement of the handle, and that the restoration of said stop pins is deferred until just before the handle has completed its final or return movement.

From the foregoing description it will be seen that when an example is introduced into the traveling carriage and the setting-up pins are elevated, the said traveling carriage has progressed step-by-step under the stop pins 93, so that when the completed item is set up on the key-board the traveling carriage with its setting-up pins occupies the proper relation with respect to the field of stop pins; that is, if the example was 123, the elevated setting-up pins will lie directly under the pins in the hundreds, tens and units columns in the field of the stop pins. When the frame 58 is elevated the setting-up pins will elevate corresponding stop pins 93 and position stops for the rack bars in exactly the relation to each other that the setting-up pins occupied. Thus, in the example 123, the stop pins 93 in the hundreds, tens and units columns will be positioned so as to arrest the rack bars in such position that this sum will be printed and registered in the totalizer wheels.

*Rack bars.*—100 indicates rack bars which are mounted in suitable slots in the cross bars of the frame of the machine, and which are capable of sliding motion longitudinally the machine. These rack bars are provided with shoulders 101 which are designed, on the forward movement of said bars, to engage with any of the stop pins 93 set up in the path of said shoulder. Means for actuating the rack bars consists of rocking levers 102 having a slot and pin connection with the bars, see Fig. 7. To these levers 102 are connected springs 103, which springs tend to pull the levers 102 and their connected rack bars forwardly.

104 indicates a restoring bar see Fig. 101 which coöperates with the levers 102 near their upper ends, said restoring bar being carried by levers 105 rigidly mounted on the shaft 106 upon which the levers 102 are loosely mounted. One of the levers 105 is provided with a roller 107 which extends in a cam groove in a cam 108 fixed on the shaft 81, whereby when the shaft 81 is rocked by the operating handle the levers 105 and their restoring bar are also rocked. When the restoring bar 104 moves forwardly the rack bars, or such of them as have been released, are also permitted to move forwardly until arrested by the pins 93. Of course, it will be understood that the bar 104 at each stroke of the handle moves to such position as to permit a full stroke of the rack bars, to wit, their full forward or "9" position. When the restoring bar 104 moves rearwardly incident to the return movement of the handle, said restoring bar picks up all of the levers 102 and their rack bars which may have moved forwardly and restores said levers and said rack bars to their normal position.

In normal operation the released rack bars 100 move forward idly under the impelling action of their connected springs, when the restoring bar 104 permits them to do so. Said bars may thus occupy one of nine different positions, depending upon the position of the elevated stop pin in the series controlling the forward movement of said bar. The "0" or home position of said bar is controlled by the zero stop pins, and with regard to this it may be said that when the zero stop pins are elevated either as a result of the operation of the zero key in group A, or by the lifting device 57ª, the rack bars do not work.

When the operating handle and the restoring bar 104 are at the limit of their forward movement means are provided for engaging the totalizer wheels with the rack bars, whereby when said rack bars are restored said totalizer wheels will be rotated in proportion to the distance of movement of the rack bars. I will first describe the ordinary operations of the machine in which items set up on the keys in group A are registered in any one of the forward group of totalizer wheels which may be in operative relation to the rack bars.

*Accumulating numbers in the forward totalizers.*—Fixed on the shaft 81 is a rocking plate 109, see Figs. 66 and 67, which is vibrated at each operation of the operating handle. The rear end of this plate is provided with a shoulder 110, which when the plate is nearing the limit of its forward movement, comes in contact with a pin 111 carried by a tappet 112 mounted on a bar 113 normally held in raised position by a spring 114, see Fig. 1. 115 is a plate fixed to the framing of the machine and against which the upper cam edge of the tappet 112 rests. When the shoulder 110 strikes the pin 111 the tappet is rocked on its fulcrum on the bar 113, its cam face forcing the bar 113 downwardly and positioning the tappet as shown in Fig. 66, in which position the parts remain until the plate 109 is nearing its home position as shown in Fig. 67, at which time a shoulder 116 engages the pin 111 and forces the tappet to assume its normal position. The cam face of the tappet is such that in being restored by the shoulder 116 the action of the spring 114 in lifting the bar will cause the tappet to move until a stop pin 117 carried thereby engages with the front end of the bar 113, in which (normal) position of the tappet, pin 111 is lifted above the shoulder 116 see Fig. 63. The plate 109 is cut away in front of the projection forming the shoulder 116 so as to permit the depression of the bar 113 without interference from the plate 109, as, for instance, in the taking of a total.

The bar 113 is connected at its upper end to the free end of the swinging forward totalizer frame 49 which, as before stated, is pivotally mounted on the bar 50. From the above description it will be obvious that upon the forward movement of the operating handle in the ordinary operations of the machine such of the rack bars as are active will be permitted to move forward until arrested by their stop pins, and that when the handle is returning to its home position, (the rack bars being in mesh with the totalizer wheels), the rack bars will actuate said wheels and register the number therein. As the handle approaches the final limit of its rearward movement the shoulder 116 engages the pin 111, permitting the spring 114 to lift the totalizer frame 49 and raise said totalizer wheels out of engagement with the rack bars.

*Means for preventing unnecessary forward movement of the rack bars.*—In taking a total the wheels 119 are meshed with the rack bars before the handle starts on its forward movement and consequently said wheels reversely rotate until the projections 120 strike on the underside of the pendents 121, when said wheels will be arrested in their zero positions. This arrest of the wheels positions the rack bars and carried type so that when the type hammers are operated a correct total will be printed. As the handle approaches the limit of its forward movement it is obvious that the restoring bar 104 is in advance of the levers 102 of all of the rack bars which have been arrested in other than the "nine" position, and consequently if the wheels 119 are now raised out of engagement with the rack bars the springs connected to the rack bars will pull them forward until the levers 102 strike the restoring bar 104. To prevent this, and to avoid the shock incident to such action, I provide pawls 208 for preventing such unnecessary forward movement of the rack bars, these pawls being forced into engagement with the teeth of the rack bars at the proper moment by means of springs 209. The free ends of these pawls are prevented from interfering with the movement of the rack bars, except when required, by means of a bar 210 supported by arms 211 pivotally mounted on a shaft 212. Bar 210 fits in a slot in a sliding plate 213 having shoulders 214 and 215 at its ends, see Fig. 103. These shoulders coöperate with a pin 216 on one of the levers 105 which supports the restoring bar 104. When the lever 105 is home the plate 213 is in such position as to rock the bar 210 and support all of the pawls 208 above the racks. However, at the extreme forward position of the levers 105 the plate 213 is moved and all of the pawls are permitted to engage their racks respectively, and remain so engaged until the levers 105 are about completing their return movement. In this manner, the pawls 208 engage the racks and prevent any unnecessary forward movement, said pawls remaining engaged with the racks until just before the levers 105 are in their home position. Plate 213 is prevented from accidental displacement by frictional contact with the frame 90.

*The carrying devices.*—118 are side frame plates arranged on the frame of the adding machine, which side frame plates form bearings for the several shafts on which are mounted the moving parts of the carrying mechanism. The carrying mechanism about to be described is common to the three groups of forward totalizer wheels and consequently in the following description no attention will be paid to any particular group, it being assumed that one group is in operative relation to the rack bars and coöperates with the carrying mechanism, while the two remaining groups are displaced with respect to said carrying mechanism and rack bars and are thus wholly inoperative.

Each totalizer wheel 119 has conjoined to it on the left-hand side a tripping projection or tooth 120 which is shown in Fig. 27. Each totalizer wheel, in view of the fact that the computations are intended to be made according to the decimal system, is provided with ten teeth, and consequently as each wheel makes a complete revolution the next adjacent wheel of higher order should be operated, *i. e.*, advanced one tooth. While the machine illustrated in the accompanying drawings is what is known as a decimal machine, it is obvious that the totalizer wheels 119 could be provided with more or less teeth to accommodate other systems, as, for instance, that employed in Great Britain where four farthings make one pence, twelve pence make one shilling, and twenty shillings one pound.

Assuming for purposes of illustration that units are being added in the unit wheel, and that in the second operation of adding units, in the units wheel, said wheel makes more than a complete rotation calculating from its starting or zero position: The tripping projection 120 will, in passing by a pendent pawl 121 pivotally mounted on a bar 122 carried by the totalizer frame 49, force said pawl forwardly, as shown in Fig. 28, so that its pin 121ª will engage the pendent projection 123 of a tripping lever 124 pivoted at 125. In this connection it will be noted that the totalizer wheels are rotated only when in mesh with the rack bars, and consequently the lever 124 is tripped when the wheels 119 are out of mesh with the toothed segments hereinafter referred to.

This tripping lever 124 carries a pin or projection 126 which lies under the forward end of a shouldered bar 127 whose forward end is mounted in a slot in the upper edge of a cross piece 128, and whose rear end has a slot and pin connection with a swinging toothed segment 129 pivotally mounted on a bar 130 and provided with a rearwardly extending finger 131. A spring 132 is connected to this toothed segment 129, and when the forward end of bar 127 is lifted so that its shoulder is out of engagement with the cross frame bar 128 a spring 134 forces the bar 127 slightly forward so that its shoulder rests in the bottom of the notch in bar 128.

The shouldered bar 127 occupies its forwardly displaced position until the totalizer wheels 119 are disengaged from the rack bars and thrown into mesh with the toothed segment 129, which, as before stated, occurs when the operating handle is approaching the limit of its rearward movement. This elevation and depression of the frame 49 and its carried totalizer wheels and pendants 121 does not disturb the position of the tripping levers 124, whose pendant portions 123 constitute tracks upon which the pins 121ᵃ ride in the movement of the totalizer frame. The tripping levers 124 are held down by light springs 133, and the bars 127 are impelled forwardly by light springs 134.

135 indicates rock arms mounted on a rock shaft 136 and carrying a bar 137 at their free ends, which bar is located under the rearwardly extending fingers 131. As this bar is vibrated it is obvious that any of the fingers 131 which stand depressed due to the forward displacement of the shouldered bar will be vibrated likewise. Means for vibrating the bar 137 consists of a rod 138 connected to a rock arm 139 on the end of shaft 136. The lower end of this rod 138 extends down through the plate 115 and is provided at its lower end with a tappet 140 having a pin 141, said tappet being held against a projection 142 on the bar by a spring 143, see Fig. 63, so that the lower end of said tappet may swing idly in a forward direction, but when the actuating part therefor moves rearwardly said pin 141 lifts the bar 138.

The cam 82 is arranged on shaft 81 and coupled to the plate 109 by a sleeve, see Fig. 47, for purposes hereinafter described, said sleeve being feathered on the shaft 81 so as to have sliding movement with respect thereto. This cam 82 is provided with a shoulder 145, which shoulder on the forward movement of the cam engages the pin 141 and idly vibrates the tappet. In its extreme forward position the cam releases the tappet, permitting it to return to its normal vertical position, and when the cam 82 starts on its return movement the cam face 146 engages the pin 141 and lifts the bar 138 and its connected parts so as to restore all of the toothed segments 129 which may, in the previous operation of the machine, have been operated. It will be noticed that this restoration of the toothed segments 129 and the shouldered bars 127 occurs when the handle is in its forward position and during the commencement of its return or backward movement. At this time, as before explained, the wheels 119 are in mesh with the rack bars, they having been thrown into mesh with the rack bars by the shoulder 110 just previous to the completion of the forward movement of the handle.

The heel of the cam portion 146 is for the purpose of swinging the toothed segments 129 rearwardly a greater distance than they normally occupy in order to locate the shoulder at the forward end of bar 127 behind the bar 128. This is necessary because of the slot and pin connection which, when the bar 127 is tripped, causes said bar to be forwardly displaced as before described, such displacement being equal to the length of its slot. After the heel portion 147 of the cam surface 146 passes under the pin 141, the pin 141 rides on the concentric portion of cam 82 between the heel 147 and the shoulder 145, and during the time that the pin 141 is riding on this concentric portion the wheels 119 are being operated and may elevate any of the bars 127. In the event that the bars 127 are elevated, as before described, the shouldered end is raised and the spring 134 forces said bar forward so as to locate the shouldered end above the bottom wall of the guiding slot. This releases the toothed segment controlled by the operated bar 127, and said toothed segment would move forward were it not prevented from doing so by the rearwardly extending finger 131 which rests upon the bar 137. As soon as the pin 141 leaves the concentric portion of cam 82 and drops in front of the shoulder 145, the bar 137 drops and in so doing all of the toothed segments supported thereby are permitted to move forward under the impelling action of their springs 132, such forward movement actuating the meshed wheels 119 the distance of one tooth. Thus, at the end of each handle stroke all of the wheels 119 stand fully carried, notwithstanding the fact that some of the carrying parts may stand in abnormal positions. However, this condition exists only during the forward movement of the handle, as upon its initial rearward movement the carrying devices are restored to normal position before any of the wheels 119 are actuated, and consequently before it is necessary to carry from one wheel to the other.

*Printing mechanism.*—Referring to Fig. 50, it will be seen that each of the rack bars 100 which is under control of a stop pin, including the decimal bar, carries at its forward end a series of independently movable type 148 having characters from "1" to "9," including the zero characters upon their upper ends respectively. There is no zero printing type on the decimal bar. These printing type normally lie side by side, the zeros being in the first bank, the ones in the second bank, etc., the nines being in the rearmost bank. The zero printing type normally lie in what might be termed the printing line, and each type bar is provided with a spring 149 for returning it to its lower position after it is raised to make a printing impression by the type hammers. These printing type are confined in suitable guide ways at the ends of the rack bars, which guide ways are provided by housing plates 150 secured to the rack bars.

Referring to Fig. 25, it will be seen that each rack bar which carries printing type is provided with a notch 151 on its under side, with which coöperates a selecting and restraining pawl 152. The rear end of this restraining pawl, when the rack bars are home, engages the member of a bell crank lever 153 whose forward member carries a pin 154 resting upon a tail piece 155 of the type hammer 156. Springs 157 preferably arranged in pairs are connected to the forward member of the bell crank lever so as to draw the same down whenever the rear member thereof is released by the restraining pawl 152. Each type hammer is provided with a pin or projection 158 which coöperates with the hooked end 159 of a bell crank lever which is held in its engaged position by a spring 160. This bell crank lever has a rearward extension 161.

Mounted on the shaft on which the bell crank levers 153 are mounted is a rock arm 162, said rock arm carrying a bar 163 which lies under all of the rearwardly extending projections 155 of the type hammers, said bar also traveling in a path into which extends all of the rearwardly extending projections 161 of the type hammer pawls. These arms 162 are provided with extensions in which is mounted a rod 164 to which one end of the hammer-actuating springs 157 is connected.

In operation, whenever a rack bar 100 moves forward the rear end of the restraining pawl 152 is raised out of engagement with the member 153 of the bell crank lever and consequently the pin 154, under the pulling action of the springs 157, bears upon the rearward extension 155 of the type hammer. As the operating handle moves forward and after all of the rack bars are positioned the bars 163 and 164 are depressed, the latter increasing the tension of the springs 157, and the former eventually striking the projections 161 and lifting all of the hooked pawls 159 out of engagement with the printing hammers. In this manner any of the printing hammers which may have been previously released by the restraining pawls 152 are thrown up against the type, forcing the type to make a printing impression on the paper supported by the platen in the typewriter carriage. As the bar 163 returns to its normal position, it will restore all of the actuated type hammers to normal position, reëngaging the hooked pawls 159 therewith, and at the same time swing all of the bell crank levers through the pins 154 so as to place the rear members of said bell crank levers in position to be engaged by the restraining pawls 152 when the rack bars are restored home.

The means for vibrating the arms 162, which arms carry the bars 163 and 164, consists of a rock arm 165 preferably arranged outside of the side frame plate which houses in the printing mechanism, and to which is connected a link 166, the lower end of said link being connected to a rock arm 167 loosely mounted on the shaft 86. This arm 167 is connected to a rearwardly extending arm 167$^a$ which carries a pin 167$^b$ arranged in a cam slot in cam 82 so that the vibration of said cam will operate said parts.

In view of the fact that when the zero key in group A is operated it sets up a stop which prevents any movement of a rack bar, it will be obvious that the zero type on said bar which is thus held stationary in while printing line, will not print unless the printing hammer identified with said bar is released. This is accomplished by means of a series of bent lips 168 which are provided at the upper rear edges of the restraining pawls 152. The lips of the several restraining pawls overlap their adjacent companions in the next higher order, and consequently if any pawl of higher order is released by its rack bar moving forward, said pawl will operate its companion in the next lower order and said companion will in turn operate the next pawl in the next adjacent lower order, and so on, releasing all the pawls 152 and consequently permitting all the printing hammers controlled by said pawls to be operated to the right of any actuated rack bar.

*Taking a total from the forward totalizer.*—The operations about to be described are applicable to the three groups of totalizer wheels 119, but for the sake of simplicity the description will be confined to any one of the three groups which happens to be in operative relation with the rack bars at the time the total is taken.

I have heretofore referred to the "T" key as the total key. This key is connected to a bell crank lever 169, which bell crank lever is connected by a rod 170 to a coupling 171 carried by the upper end of a rocking lever 172. A companion rocking lever 173 is pivotally mounted upon a lug secured to the base casting, and the upper ends of these rocking levers are connected by a link 174. The purpose of this construction is to impart parallel motion to link 174. Whenever the total key is depressed this link is moved forward and a projection 175 thereon is located in front of a plate 176 pivotally mounted on the framing of the machine. The purpose of this construction is to lock the total key in its depressed position while the operation of taking the total is being performed.

On the lever 173 there is a projection 177 which coöperates with a pin 178 on the lower end of the bar 113 heretofore referred to. Bar 113 is connected to the swinging totalizer frame 49, and in introducing items into the totalizer said bar is normally operated by the plate 109 as heretofore described. When, however, the total key is depressed the totalizer frame 49 is depressed so as to mesh the wheels 119 with the rack bars in order that said rack bars may rotate the wheels in a reverse direction and until the projections 120 strike under the pendants 121 to arrest the movement of the wheels and determine their zero positions.

In view of the fact that the totalizer frame 49 is depressed when the operating handle approaches the forward limit of its movement, by means of the plate 109 heretofore described, it is obvious that in taking a total this plate must be rendered inoperative with respect to the tappet 112 and this is accomplished in the following manner:

179 indicates a rearward extension from the lever 173 which lies under one member 180 of a bell crank lever, whose other member 181 lies between the end flanges of a sleeve 182 to which the cam 82 and the plate 109 are fixed, see Fig. 35. Thus, when the bell crank lever 180—181 is rocked the plate 109 is moved longitudinally the shaft 81 and out of line with pin 111 on tappet 112; consequently, when the handle is pulled the plate 109 idly vibrates.

The operation of pulling the handle in introducing an item from the setting-up pins in the carriage into the stop pins necessitates the raising of the frame 58 in which the carriage is mounted. This must be prevented in taking a total and by so preventing it, notwithstanding the fact that an item may have been set up on the setting-up pins and not communicated to stop pins 93, the depression of the total key will prevent the item in the traveling carriage from being communicated to the stop pins 93 or the zero stops from being raised, and thus interfering with the taking of the correct total. To prevent the frame 58 from being raised when a total is being taken, I provide the lever 172 with an extension 172ª, which extension lies under a pin 183, see Fig. 68. Pin 183 is carried by a rock arm 184 to guide it in its motion, and to the end of this rock arm is connected a link 185 whose upper end is connected to the tappet 84 carried by the rock arm 85. It will be recalled that in the ordinary operation of the machine pin 83 would strike this tappet 84 and rock the arms 85 and 87, lifting the bar 89 and raising the traveling carriage with its setting-up pins. However, when the total key is depressed arm 185 is depressed so as to raise the end of the tappet 84 out of the path of pin 83 and consequently the cam 82 carrying said pin may be vibrated without operating said tappet.

By preventing the carriage containing the setting-up pins from raising any of the stop pins 93, notwithstanding the fact that an example may be set up in the traveling carriage, it is apparent that when the rack bars are released and moved forward they may travel the full distance, to wit, to the "9" position, or in any position less than "9" in which they may be arrested by the tripping projection 120 engaging the pendant 121. It is obvious that if any of the wheels 119 stand in other than zero positions the rack bars will travel forward, but all of the totalizer wheels 119 which have not been actuated, and consequently stand at zero, or which may have been actuated and stand at zero, will so stand and prevent any movement of the rack bars in a forward direction in the taking of a total. In taking the total the printing mechanism will be operated the same as when the rack bars move forward to register and record an item.

In order to insure the taking of a total after the total key has been pressed and the handle started on its forward movement I provide the plate 109 with a pendent extension 186, see Fig. 35, which coöperates with one of a plurality of grooves 187 in a post 188 extending from the side frame of the machine. Thus when the sleeve 182 and its connected members, to wit, the cam 82 and plate 109, with its extension 186, are moved laterally upon the depression of the total key and the handle pulled, the extension 186 will enter the registering groove and consequently prevent any disturbance in the position of the parts until the handle is returned to its home position. For the sake of distinction it might be said that when the "T" key is pressed the plate 186 enters the middle groove, which may be called the second or middle position of the cam 82 and plate 109.

In the ordinary operations of the machine, the total key when pressed will be held down during the forward movement of the handle and released as the handle approaches the limit of its forward movement so as to disengage the wheels 119 from the rack bars. Thus the wheels stand at zero, and the totalizer is cleared, if the total key is permitted to rise when the handle reaches the limit of its forward movement. The means for holding the total key down during the forward movement of the handle consists of a hinged plate 176 before described, and in order to release this plate to permit the total key to rise when the handle reaches its forward position I provide a pin 186ª on the extension 186, which pin engages a bent portion of the plate and rocks the plate so as to release the projection 175. A spring 176ª holds the plate 176 on top of the bar 174, and a spring 172ª is connected to the lever 172 to restore the parts to normal position when the bar 174 is released. If it is desired to retain the total in the machine, the total key must be held down until the handle completes its rearward movement. This insures continued engagement between the wheels 119 and the rack bars, and consequently said wheels are rotated by the rack bars the same distance in retaining the total therein as they had previously been rotated when yielding the total.

*Cushioning and compelling a full stroke of the handle.*—The operating handle 79 is connected by a link 80 to a rock arm 189, see Fig. 104, which rock arm has a sleeved hub portion 190 see Fig. 47. mounted loosely on the shaft 81. The opposite end of this sleeve carries a lever 191 to the upper end of which are connected springs 200 whose energies are constantly exerted to return the handle 79 to normal position. The lower end of lever 191 carries a tappet 193 which rides over the notched upper edge of a plate 194 pivoted at 195. The rear or free end of this plate is supported in position by toggle links 196 which, when their pivotal points are in line, support the plate 194 in an elevated position. When this toggle joint is broken so as to depress the rear end of plate 194 the tappet may be reversed so as to permit the handle to return home. If, however, the toggle mechanism supports the plate the handle will be locked in its forward position. The means for breaking the toggle joint consists of a rack bar 197 mounted in suitable guide ways so as to slide longitudinally the machine. This rack bar has a projection 198 in the path of the lower end of a rock arm 199, which rock arm is fixed to the shaft 81 and has springs 192 connected to its lower end so as to force the arm 199 on the shaft 81 to follow the lower end of lever 191, thus causing the pin 201 on rock arm 199, to which the springs 192 are connected, to follow the lever 191 when the handle is pulled forward. Springs 200 are the master springs, that is, are of such strength that when the handle is released when in its forward position the tension of springs 192 will be overcome and the handle returned home.

202 indicates a rock arm fixed to the shaft 81, which rock arm supports a dash pot 203, said dash pot containing oil so as to regulate the movement of shaft 81 by means of a ported piston therein as is well understood. The piston rod from this dash pot is pivotally mounted upon a shaft 204 extending across the machine.

From the above description it will be obvious that should the handle 79 be pulled suddenly forward the lever 191 will leave the pin 201 and, under the action of springs 192, the shaft 81 will be rocked against the flow of liquid through the perforations of the piston in the dash pot. On the backward movement of the handle the lever 191 engages the pin 201, and must not only overcome the spring 192 and store power therein, but must operate against the liquid in the dash pot whose flow through the openings in the piston regulates the speed of movement of the machine. In this manner it may be said that the speed of movement of the shaft 81 is regulated and cushioned in both directions. When the handle is pulled forward the lower end of rock arm 199 engages the pin 198 on the rack bar 197 and forces said rack bar rearwardly so as to break the toggle joint and permit the plate 194 to be depressed in order that the tappet may reverse and allow the handle to return home. The means for breaking the toggle joint consist of a pin 197ª on the underside of the rack bar 197, which pin engages an inwardly projecting stud 196ª on the toggle pintle, see Figs. 5, 104, and 105. It is only necessary for pin 197ª to move the pintle stud 196ª slightly to the rear in breaking the toggle because as soon as the toggle links are moved out of their positions of dead center the tappet 193 will, when the handle starts rearwardly, engage the plate 194 and depress it as shown in Fig. 105. A spring is connected to the pintle lug 196ª, see Fig. 106, for the purpose of straightening the toggle and raising the plate 194. There is a stop for limiting the movement of the links under the action of said spring and holding the links with their centers in alinement. In returning home the tappet is forced to pass over the notches, and when started it cannot be again pulled forward before it reaches its home position and is freed from the plate 194 and allowed to assume its normal position in readiness for another stroke of the handle. The rack bar 197 is not only made to do the duty of breaking the toggle joint, but is also utilized to restore the traveling carriage containing the setting-up pins, as shown in Fig. 5.

The shaft 76 carries a segmental gear 205 which meshes with the rack bar 197, and consequently when the handle is moved forward the rock arm 199 engages said rack bar and the shaft 76 is rotated, and through the segmental gear 77 and the rack 78, restores the carriage to its home or normal position. Of course, to permit this the rack bar 197 must be free to slide in its ways when the shaft 76 is rotated in the step-by-step movement of the carriage or to the left.

I do not claim in this application the mechanism just above described for cushioning and compelling a full stroke of the handle as the same forms the subject-matter of a divisional application filed by me June 2, 1906, and serially numbered 319,945.

*Error key.*—206 is a rod slidingly mounted in the machine and whose front end is provided with a head designed to be pushed by the operator in correcting an example which might have been erroneously set up on the key board. This rod has a collar 207 located sufficiently far in advance of the rack bar 197 to permit the free movement of the rack bar when the carriage is moving step by step under the control of its escapement. When the rod 206 is pushed rearwardly, however, the collar 207 engages a pin depending from the front end of the rack and moves said rack and its controlled parts, including the traveling carriage, to normal position. This error or correction key also coöperates with the multiplying devices to take out a multiplier which might have been erroneously set up on the keys in group B.

*Placing a multiplicand in the multiplying devices.*—Operating any of the keys in group A and depressing the "R" key will place the number so set up on the keys in group A in the multiplying devices. This is accomplished as follows:

Each of the rack-operating levers 102 is provided with a pin 217, and each lever 102 has a companion lever 102$^a$ provided with a slot in its upper end adapted to engage the pin 217 whereby the levers 102 and 102$^a$ are locked together on their forward movement, but disconnected at the limit of such movement, the levers 102$^a$ remaining displaced, while the levers 102 are restored to their home position by the bar 104 which operates above the levers 102$^a$.

In order to elevate the levers 102$^a$ into engagement with the levers 102, said levers 102$^a$ are provided with slots in their lower ends which embrace the spacing spool mounted on shaft 106. 218 indicates an extension on lever 102$^a$, which extension rests on a plate 219 and under an overhanging plate 219$^a$ connected to the plate 219, see Fig. 69. The pivot rod 220 on which this plate is mounted is provided with a rock arm 221 whose free end is provided with pins 222 and 223, see Figs. 5 and 65. One of these pins 222 rests over a rearward extension 224 of a lever 225 connected to a bar 226 whose forward end is mounted on a lever 227 and connected to the "R" key by a rod 228. Thus, when the "R" key is depressed the plate 219 is raised and all of the levers 102 engaged with their companions. When the handle is pulled forward the levers 102 which are movable, carry with them levers 102$^a$ until the handle reaches the limit of its forward movement, when the plate 176 heretofore described as coöperating with the bar 174 is raised from behind a projection 229 on the bar 226, and consequently a spring 230 on the lever 227 permits the plate 219 to be restored to its normal position by a spring connected thereto, and the part 219$^a$ thereof being above the extensions 218 will draw all of the levers 102$^a$ out of connection with their companions.

Each lever 102$^a$ has a bar 231 pivotally connected to its upper end, which bar is provided with a tooth 232, and when the levers 102$^a$ are forced downwardly in their adjusted position this tooth enters the notches of a rack 233 extending forwardly from the frame of the multiplying devices. These racks are fixed, and there is one rack for each lever 102$^a$. The rear end of bar 231 is provided with two pins 234, which pins are located on each side of a sliding pendant 235 mounted on an extension 236 of the stepped stop bar 239. There is a pendant connected with each lever 102$^a$ and there are as many stepped stop bars as there are levers 102$^a$.

237 are the side plates of the housing in which the multiplying devices are mounted, and 238 is a cross bar forming a guide for the stepped stop bar 239 which is shown in detail in Fig. 77. This bar is held down by a spring 240. The end of the horizontal member 236 of this stepped stop bar is guided in a vertical groove in a plate 241. All of the rack bars which are controlled by stop pins are provided with pins or projections 242 at their rear ends which coöperate with shoulders on the under-side of the rearwardly extending stepped portion 243 of said stop bar. There are ten stopping faces including the rear edge of the bar which coöperate with the pin 242. It will be obvious that if the bar is raised so that the end of its extension 243 lies in the path of the pin 242 the bar, if released, cannot move forwardly because it then occupies a zero position. If, however, the bar is raised one step the pin 242 will coöperate with the first shoulder, and so on until the pin coöperates with the rear edge of the bar which is the "9" position of the stop bar. For convenience of reference, the shoulders of the stop bar in Fig. 73 have been numbered according to the positions they permit their coöperating rack bars to occupy when the pin 242 comes in contact with said shoulders.

Referring to Fig. 74, 244 indicates lifting bars mounted on one side of the multiplying mechanism and guided in its vertical movement by rollers 245 mounted near the top of the housing and by having their lower ends passed through a plate 246, the shoulders on the bars above the plate limit the downward movement of the lifting bars and position them. Each lifting bar, and there are ten of them, is provided with a cross arm 247 whose opposite end is guided in vertical grooves in the opposite side plate of the housing, and to the end of the zero lifting arm is secured a spring 248. These cross arms 247 coöperate with pendants 235 lifting the stepped stop bars whose pendants are located in the path of their movement, and said cross arms are in turn lifted by selecting devices which will now be described.

Remembering that the positioning of the pendants 235 is under the control of the operator, and that the number to be multiplied is set up in this field of pendants similar to the setting up of the stop pins 93, and that these pendants remain set in position in order that the number represented by them may be multiplied by any digit one or more times, it will be obvious that when the lifting arms 247 are raised such pendants as may be in the paths of said lifted arms will also be raised, and consequently stops will be placed in the paths of the pins 242 of the released rack bars so that said rack bars will be arrested in positions determined by the stepped stop bars.

I have illustrated a complete set of selecting plates in Figs. 78 to 96. With reference to these selecting plates it may be well to preface a description of their operation by stating that whenever a number is set up in the field of pendants all of the lifting arms 247 are raised twice, the distance of their movement being controlled by the selecting plates. For each digit in the multiplier, with the exception of zero, there are two selecting plates complementary to each other to the extent that one plate represents the tens of the partial product, and the other the units of the partial product, the two partial products being added together to produce the correct product. For convenience of reference I have marked each plate with the digit it represents in the multiplying operations, and in addition to this will say that the plates in Figs. 79 to 87 are the tens plates; the plate shown in Fig. 78 is the zero plate; and the plates shown in Figs. 88 to 96 are the units multiplying plates. As stated before, in the operation of multiplication the handle is pulled twice for each digit in the multiplier except the zero, and in this connection I will say that the first pull of the handle lifts the released tens plate identified with the digit key of the multiplier in group B which may have been operated, while the second pull of the handle operates the released units plate associated with its tens plate.

If it is desired to multiply, say 654 by 9, the operation is as follows: "654" may be set up on the keys in group A, the "R" key pressed, and when the handle is operated this number will be registered in the forward totalizer and also set up in the field of pendants 235. The "9" key in group B is then depressed and the handle operated twice. To obtain the product the "P" key is depressed and the handle operated once.

When any of the keys in group B are depressed said keys, by means of their connecting rods 250, operate a plate 251, see Fig. 7, whose rear end is provided with a vertically disposed slot in which fits a pin 252 on the lower end of a tripping pawl 253. The upper end of this pawl normally rests under the rearward extension 254 of a pivoted shoulder plate, which, when released, is pressed forward by a spring 255, the limit of movement permitted by a pin 256 on the tens multiplying plate on which said shoulder plate is mounted which passes through a slot in said pivoted shoulder plate, determining its forward position. Each of the tens multiplying plates consists of a vertical stem 257 mounted in suitable guides and a stepped head portion 258. This stepped head portion of the tens multiplying plates is so constructed in each plate that the shoulders thereof will lift the cross arms 247 to a predetermined position depending upon the digit key in group B struck. As, for instance, in the multiplication of any number by another the product is units alone or units and tens. These tens multiplying plates only have to do with the tens partial product; as, for instance, when "4" is to be multiplied by "9," the product contains three tens and six units; when "5" is multiplied by "9" the product contains four tens and five units; and when "6" is multiplied by "9" the product contains five tens and four units. This statement applies particularly to the example under consideration but is also true with regard to all of the tens plates, as, for instance, when "2" is multiplied by "2" there are no tens but four units; or when "5" is multiplied by "3" there is one ten and five units. If there are no tens in the product, or if there are one or more tens in the product the tens plate is so constructed as to position the arms 247 accordingly irrespective of the particular pendant which may lie over said arms. Thus the stepped stop bars are accordingly positioned, and in the example under consideration the bars would be positioned by the tens plate to arrest the hundreds rack bar in the fifth position, the tens rack bar in the fourth position and the units rack bar in the third position. So, likewise, if "2" was multiplied by "4", the tens plate would operate all of the bars 247 where the number being multiplied by "4" contained tens in the product, to wit, 3 and higher numbers; but in the case of 2×4 there are no tens in the product and consequently the bar 247 in register with the third shoulder (including the first zero shoulder as one) would not be lifted.

The pivoted shoulder plate referred to is mounted on the stem portion of the plate. There is a tripping pawl 253 for each tens plate, see Figs. 97 and 98 and these pawls 253 are controlled respectively by the digit keys in group B. Consequently in the example under consideration when the "9" key in group B is depressed the pawl 253 controlled thereby is operated so as to depress the shoulder plate and locate the lower forward edge of said plate over a vertically movable lifting bar 259 guided in slots in the side plates of the housing. The ends of this bar are connected by links 260 to rock arms 261 fixed to a shaft 262 which carries a pinion 263 meshing with a segment 264 mounted on shaft 106. This segment is provided with an extension having a pin 265 which coöperates with a cam 266 mounted on shaft 81, see Figs. 104 and 105. By this means whenever the handle is operated shaft 262 is rocked and bar 259 lifted. In rising the bar engages the shoulder plate and lifts the tens multiplying plate carrying such the tripped shoulder plate, and consequently the tens multiplying plate is raised, carrying with it the cross arms 247 in the paths of its several shoulders.

By referring to Fig. 87, it will be seen that the "9" tens-multiplying plate is provided with a uniform series of steps, consequently, when this plate is raised the crossed arms 247 lie in substantially an inclined row and lift the particular stepped stop bars whose pendants are in their respective paths. Where the number 654 is being multiplied by "9," the stepped stop bars are positioned so as to arrest the rack bars and register 543 in the rear totalizer. The means for preventing movement of all of the rack bars except those which it is necessary to move to introduce the partial product as multiplied by "9" into the totalizer, consists of the stepped stop bars themselves, which are collectively raised so as to present the zero stop shoulders in the paths of the pins 242. This is accomplished as follows:

The heads of all of the tens and units multiplying plates are provided with extensions 267 which lie under the zero cross arm 247, the one to which the spring 248 is connected; consequently no matter which of the multiplying plates may be raised its final movement causes the extension 267 to engage the rearmost cross arm 247, the one over which all of the non-positioned pendants lie, and consequently all of these pendants are eventually engaged and all of the stepped stop bars to which they are connected are raised so as to present their zero stops in the paths of the pins 242 on their complementary rack bars.

The means for causing the rear totalizer to engage with the rack bars in the multiplying operations under consideration are as follows: 268 are the wheels of the rear totalizer, which wheels are provided with tripping projections coöperating with carrying mechanism the same as that heretofore described as coöperating with the front totalizer wheels, and therefore I deem it unnecessary to repeat the description thereof at this point. The rear totalizer wheels 268 are mounted on a shaft 269 which finds bearings in a rocking frame 270. This rocking frame is pivotally mounted on a shaft 271 and has a rod 272 connected to its free end. This rod carries a tappet 273 having a pin 274 at its lower end and a cam face at its upper end engaging the plate 115 and coöperating with said plate similar to the manner of the tappet 112 heretofore described, see Fig. 34.

By reference to Fig. 34, it will be noted that the rocking plate 109 normally occupies a position to engage the pin 111 of tappet 112. However, this plate, in the operation of multiplication, is shifted with its companion cam 82 so that the shoulders 110 and 116 coöperate with pin 274 of tappet 273, and vibrate the rod 272 similar to the vibration of the rod 113 connected to the forward totalizer frame, and in the same time relation with respect to the position of the operating handle, whereby the rear totalizer frame is rocked to engage the rear totalizer wheels with the rack bars when the handle approaches the limit of its forward movement, and disengaged from said rack bars as the handle approaches the limit of its rearward movement.

The means for shifting the plate 109 when any one of the multiplying keys in group B is operated, are as follows: Bar 251 which is moved longitudinally upon the operation of a multiplying key is provided with an upwardly extending projection 275 which coöperates with toggle links 276 connected to a rock arm 277 on a rock shaft 278. This rock shaft has a rock arm 279 arranged under the lower member of the bell crank lever 180 whose upper member 181 is connected to the sleeve 182 which carries the plate 109 and cam 82, see Fig. 5. In this manner when a multiplying key is depressed the plate 109 is shifted to what might be termed its third position in which it coöperates with the pin 274 of tappet 273 and rocks the rear totalizer frame. In this third position the extension 186 of plate 109 enters the outermost slot of post 188 and holds the parts in operative position until the handle has been pulled twice in the act of multiplying, see Fig. 35.

The means for breaking the toggle 276 and restoring the plate 109 to normal position is controlled by the units multiplying plates which are lifted upon the second pull of the handle in the following manner: Each of the units multiplying plates is provided with a stem portion 280 and a stepped head portion 281 whose shoulders are so constructed that when the unit plates are lifted they will engage the arms 247 and position the stepped stop bars properly to register the units partial products of the number to be added to the tens partial product in the rear totalizer. This partial product is added to the partial product composed of tens previously registered in the rear totalizer, but only after the rear totalizer has been shifted to the left one step so that the units partial product, when added to the tens partial product, will give a correct total product.

Extending from the stem of each tens plate is a bevel-ended projection 282 which, when the tens plate is raised, engages a pin or lateral projection 283 on a units tripping pawl 284 which normally engages the extension on a shoulder plate 285 similar to the shoulder plate 254, but which is mounted on the stem of the companion units multiplying plate. Thus, as shown in Figs. 97 to 100, when the tens multiplying plate is lifted the tripping pawl 284 of its companion units multiplying plate is operated so as to operate the shoulder plate 285 on the stem of the companion units multiplying plate, so that when the bar 259 descends it will ride under the shoulder plate 285 in readiness to lift the same and its connected units multiplying plate on the next operation resulting from the second pull of the handle.

A spring 286 is connected to the tripping pawl 253 so that when the tens multiplying plate is lifted said pawl is forced to a position under the projection 284 of the plate 254 so that when said tens multiplying plate is lowered the shoulder plate carried thereby will be returned to its normal position out of the path of bar 259, and consequently the next raising movement of said bar will not operate said tens multiplying plate. A spring 287 is connected to the tripping pawl 284 for the same purpose, and when the bar 259 has lifted the units multiplying plate the spring 287 will force said pawl inwardly so as to locate such shoulder under the projection on the shoulder plate 285 to withdraw said shoulder from its position over the bar 259 when the units multiplying plate is lowered.

When the units multiplying plate is lifted it will carry with it all of the cross arms 247 so that said arms will lie in a diagonal row, but in the opposite direction from that they formerly occupied when the tens multiplying plate was lifted, the final movement of the units multiplying plate picking up the zero arm 247 and lifting the pendants thereabove so as to prevent movement of the rack bars which are not to actuate the wheels of the rear totalizer.

Returning, now, to the example under consideration, where the number 654 is being multiplied by 9, it might be well perhaps to locate definitely the position of the several pendants which are associated with the stepped stop bars in coöperative relation with the units, tens, hundreds, etc., rack bars. The units pendant is located in the fifth position on account of the fact that the rearmost cross arm 247 is the zero cross arm and may be counted as the first or normal position of the pendant. Thus the unit pendant, while in the fifth position, represents "4"; the tens pendant for the same reason is in the sixth position and represents "5"; and the hundreds pendant is in the seventh position and represents "6". All of the other pendants are located over the units cross arm 247. When the tens multiplying plate is elevated on the first operation of the handle it will engage and lift all of the arms 247 because any number higher than "1" multiplied by "9" contains one or more tens. When the handle is restored the number thus indicated would be registered in the rear totalizer, to wit, "543", which is the tens partial product of 654 multiplied by 9, said partial product being obtained from the tens multiplying plate. The units multiplying plate is operated on the second pull of the handle, as before described, and will register the units partial product in the rear totalizer, which product in this instance is "456". After the tens partial product has been registered in the rear totalizer said totalizer is stepped one step to the left and then the units partial product is added to the tens partial product formerly obtained from the tens multiplying plate, in the rear totalizer, and consequently the rear totalizer will show a complete product, that is, 5886, which is the correct result obtained from multiplying 654 by 9.

After the first pull of the handle in the operation of multiplying, the rear totalizer is stepped to the left one space. This also occurs when multiplying by zero where it is only necessary to pull the handle once which is equivalent to raising the tens partial product to its appropriate normal position in the problem. This stepping to the left of the rear totalizer is necessary in order to properly register the partial products therein because said partial products represent divisions in tens and units of the completed product. To illustrate this in the example under consideration, the number 543 represents the tens partial product of 654 multiplied by 9, and this partial product may be said to be in the tens division because it is the result of the positioning of the parts by the tens multiplying plate.

In the machine shown in the drawings the rear totalizer has four wheels to the right of the units rack bar and consequently multiplications may be carried on to this extent in this machine. By increasing the number of wheels to the right it is obvious that the capacity of the machine would be correspondingly increased. In starting, therefore, the units rack bar coöperates with the fifth wheel in the rear totalizer from the right, the tens rack bar with the sixth wheel and the hundreds rack bar with the seventh wheel. When the handle is operated in lifting the units multiplying plate, the rear totalizer is stepped to the left so as to position the fourth wheel over the units rack bar, the fifth wheel over the tens rack bar, and the sixth wheel over the hundreds rack bar. The following example will illustrate the necessity for this:

654
9
___

543 registered by first pull of handle.
456 registered by second pull of handle.
___

5886 product registered.

The means for stepping the rear totalizer to the left are the following:

Referring now to Figs. 56 to 62, it will be seen that the shaft 269 on which the rear totalizer wheels are mounted is provided with ratchet teeth 288 with which coöperates a pawl 289 mounted on the end of a lever 290 pivoted on a bracket extension 291 extending from the rear totalizer frame 270. A spring 292 holds the pawl 289 in engagement with the ratchet teeth. 293 indicates a bevel-ended tappet normally held in position to engage and vibrate the rear end of lever 290 by means of a spring 294, see Fig. 33. This tappet is mounted on the upper end of a rod 295 which is guided in its vertical movement in suitable ways by the cross bars secured to the housing plates of the multiplying plates.

Each of the units multiplying plates is provided with a shoulder 296 extending under a bar 297 fixed to the bar 295, see Figs. 74 to 76. Thus when any unit multiplying plate is lifted it will lift the bar 295 and vibrate the lever 290. This vibration of lever 290 occurs on the forward movement of the handle so as to step the rear totalizer wheels to the left before they are depressed into engagement with the rack bars.

As the units multiplying plates are operated upon the second pull of the handle, and as the bar 295 is controlled by the units multiplying plate, this bar is relied upon to break the toggle 276. To do this the upper link of the toggle is provided with an extension 276ᵃ to which is connected a slotted arm 276ᵇ in whose slot operates a pin arranged on the lower end of bar 295. When the toggle is straightened by the projection 275 connected to the operated key in group B, the slotted link 276ᵇ is depressed, and when the bar 295 is raised the pin on its lower end strikes the upper end wall of the slotted link, lifting the same and breaking the toggle, thus restoring the key connections to normal position.

Under the operating pawl 290 there is a second pawl 298 which serves to lock the totalizer shaft against movement when the pawl 289 is operated to take a new bite. Both of these pawls 289 and 298 are provided with extensions for coöperating with a pin 299 on the end of a lever 300 pivoted in a bracket on the frame 49. This lever coöperates with a tappet 301 mounted on the bar 51 so that when the typewriter carriage is moved to the right the tappet will vibrate lever 300 and release the pawls 289 and 298, see Fig. 56. The reason why the re-setting of the totalizer wheels for another operation is made dependent upon the typewriter carriage is because the operations of extensions always require the products to be printed in a column at the right of the columns containing the multiplicand and multiplier, and in positioning the typewriter carriage for these columns the stepping pawls for the rear totalizer are disengaged so as to permit the rear totalizer to be repositioned for a new operation.

To print the product registered in the rear totalizer it is only necessary to press the "P" key and pull the handle once. This operation of pressing the "P" key also places the product in the front totalizer which may be in operative relation with respect to the rack bars in that particular position of the typewriter carriage, and thus the product is not only printed but also registered in the totalizer as an item, so that if there are a number of products to be added together the front totalizer in which they are registered will, upon operation of the "T" key, enable the printing of the correct total of the products.

*Printing the product.*—A rod 302 is connected to the "P" key and extends rearwardly where it is connected to a lever 303, see Fig. 70 which lever has an extension 304 arranged above the pin 183 whereby when the "P" key is depressed the rod 185 is likewise depressed and the tappet 84 raised out of the path of the pin 83. Consequently, the track frame 58 which supports the traveling carriage is not lifted up so as to operate the stop pins 93. A bar 305 is connected to lever 303, and this bar has a projection 306 which coöperates with the plate 176, whereby the "P" key is held in its depressed position until the handle reaches the limit of its forward movement when said plate, as before described, is vibrated and the "P" key is released.

The rear end of bar 305 is connected to a lever 307, which lever has a forward extension 308 lying above pin 309 on the lower end of bar 272. Thus when the " P " key is depressed the bar 272 is likewise depressed, lowering the rear totalizer frame 270 and forcing the totalizer wheels into mesh with their rack bars. Lever 307 is provided with a rearward extension 310, which rearward extension lies under pin 223 on rock arm 221 mounted on shaft 220. Thus, when the " P " key is depressed shaft 220 is rocked and plate 219 raises all of the levers 102ᵃ, but not sufficiently high to engage them with the pins 217. All of the teeth 232 are thus disengaged from the rack 233, and consequently if the total key is permitted to rise when the handle reaches the forward limit of its movement all of the sliding bars which position the pendants 235 and which are connected to the upper ends of levers 102ᵃ will be restored to zero position.

Means for restoring the levers 102ᵃ consists of a bell crank lever 311 see Fig. 35 whose lower member is located over the rearward extension 310 of the lever 307, and whose upper member 312 engages a sliding collar 313 mounted on the shaft 106 and carrying an arm 314 in whose end is mounted a restoring bar 315. This restoring bar is located in front of extensions 316 with which each of the levers 102ᵃ is provided. Collar 313 also carries an arm 317 which, when the bell crank lever referred to is rocked, is placed in the path of a pin 318 mounted in an extension of the cam 82, see Fig. 63. When the handle is pulled the pin 318 engages arm 317, moving the restoring bar 315 rearwardly, which restoring bar engages the extensions 316 of the levers 102ᵃ, moving all of said levers back to zero position. Thus, whenever the " P " key is depressed and the handle pulled the product in the rear totalizer is printed, and if the " P " key is permitted to rise when the handle reaches the extremity of its forward movement the totalizer wheels will stand cleared. If the " P " key is held depressed by the operator until the handle returns to its rear position, it is obvious that the rear totalizer wheels will be kept in mesh with the rack bars and the amount of the product re-registered therein. Pressing the " P " key, however, and pulling the handle always restores the pendants to zero position in readiness for another operation. It will, of course, be obvious that when the levers 102ᵃ are again lowered when the " P " key rises, the teeth 232 engage their respective racks so as to locate the pendants in their zero position, and the pendants are then prevented from accidental displacement.

By referring to Fig. 70, it will be observed that the extension 310 is cut away where it passes under the member 180 of the bell crank lever which operates the plate 109 and the cam 82. Thus, when the " P " key is depressed these parts are not disturbed and consequently the product which appeared in the rear totalizer, which is printed, is registered in the forward totalizer.

*Preventing the printing of partial products.*—When any of the keys in group B is depressed, the cam 82 is moved laterally as before described, and this lateral movement causes the cam to become disengaged from the pin 167ᵇ, and thus the bar 163 of the printing mechanism is not vibrated and consequently the printing hammers are not operated.

*Correcting errors in the multiplying devices.*—If an example has been erroneously introduced into the multiplying devices, as for instance by operating the keys in group A, and then pressing the " R " key and operating the handle, said multiplying devices may be cleared by pressing the " P " key and pulling the handle as heretofore described. If an example is set up in the multiplying devices and the wrong key in group B is operated, this can be corrected, before operating the handle, by pressing the error key which is connected to the rod 206. This rod, as shown in Fig. 5, extends rearwardly beyond the rack bar 197, its end being in line with the lower member 319 of a bell crank lever, which bell crank lever is provided with a hooked extension 320 see Fig. 73 which embraces the projecting end of pivot bolt 321 of the toggle links 276. Thus when a key in group B is pressed and the toggle links 276 positioned so that their centers aline, the straightening of which toggle links, as before stated, moves the plate 109 and cam 82 laterally so as to position plate 109 in operative relation to the bar 272, the operation of the error key swinging the member 319 will cause the hooked extension 320 to engage the bolt 321 and break the toggle which results in restoring the plate 109 and cam 82 to normal position. At the same time the upper member 322 of the bell crank lever lifts bar 323 guided in its vertical movement by the housing plate of the multiplying mechanism, which bar carries an arm 324, which arm lies under the rearward extensions of all of the shoulder plates, and consequently, if any of said shoulder plates have been tripped they will be lifted and restored to position over their tripping pawls.

*Extending or setting up a number registered in a forward totalizer in the multiplying devices.*—This is accomplished by the "E" key to which is connected a rod 325. This rod also connects with a lever 326, see Fig. 71, which lever 326 is provided with a forward extension 327 lying over pin 183 heretofore referred to. Thus when the "E" key is depressed the rod 185 is pulled down, lifting the tappet 84 and preventing the track frame 58 and its traveling carriage from rising when the handle is pulled. To lever 326 is connected a bar 328, which bar is provided with a projection 329 designed to coöperate with plate 176 whereby the "E" key is locked in its depressed position until the handle reaches the limit of its forward movement. The rear end of bar 328 is connected to a lever 329, which lever 329 carries a forward extension 330 lying over pin 178 on the lower end of bar 113. Thus when key "E" is depressed the frame carrying the forward totalizers is likewise depressed, and the forward totalizer in operative relation with respect to the rack bars is thrown into mesh therewith, the same as in taking a total. Lever 329 is also provided with a rearward extension 331 which lies under pin 222 of rock arm 221. It will be noticed by referring to Fig. 65, that pin 222 lies nearer the axis of movement of the rock arm 221 than does the pin 223 on said arm 221, and the extensions 224 and 331 which coöperate with pin 222 move in a relatively greater arc than does the extension on lever 307 which coöperates with pin 223, and consequently when either of the levers 329 or 225 are operated by the "E" and "R" keys respectively, the rock shaft 220, through its plate 219, lifts the levers 102ᵃ up into full engagement with the pins 217; whereas, as before described, when the "P" key is operated and the shaft 220 rocked by the engagement of pin 223, the levers 102ᵃ are raised, but not sufficiently so that the slots in their upper ends will engage the pins 217. The action of the "E" key in engaging the levers 102ᵃ with the levers 102 will connect the pendants with the rack bars so that when the handle is pulled as in taking a total the rack bars will move forwardly and carry with them pendants, positioning said pendants in the positions of rest of their connected rack bars. When the handle approaches the limit of its forward movement the "E" key is released, which releases the levers 102ᵃ, permitting them to drop so that the teeth 232 will engage with the racks 233, thus locking the pendants in positions determined by the movements of the rack bars and registering in said pendants the number which had been registered in the forward totalizer.

If it is desired to clear the forward totalizer, the handle is permitted to return home; but if it is desired to retain the number formerly contained in the forward totalizer and now registered in the multiplying devices, the "T" key may be operated which will maintain relation between the forward totalizer wheels and the rack bars so that the restoring movement of the rack bars resulting from the backward movement of the handle will re-register the number in the forward totalizer. Whenever the "E" key is operated to transfer the number registered in the forward totalizer to the multiplying devices, the number will be printed by printing mechanism and the forward totalizer cleared, if the "E" key is permitted to rise at the end of the forward movement of the handle. By holding the "E" key down, the number, while registered in the multiplying devices and printed, will be taken out of the multiplying devices and re-registered in the forward totalizer.

*The decimal key.*—The decimal key, which bears the character "D," is connected to a rod 340 whose rear end is connected to a lever 341 see Fig. 72 carrying a rod 342 at its upper end, said rod being also supported by a lever 343. Rod 342 carries a shoulder 344 at its upper edge forming a track for raising the plate 176 when the "D" key is pressed, and thus if any of the other result keys, "E," "R," "T" or "P," have been operated and it is desired to release them, the "D" key may be operated to accomplish this purpose. It will be noted that the track 344 does not permit the "D" key to be locked in a depressed position because none of the devices under the control of the "D" key are ever permanently positioned in the machine.

The under-side of bar 342 is slotted to receive one member 345 of a bell crank lever whose other member 346 is connected thereto by a vertical shaft mounted in a suitable post, see Fig. 5. The upper member 346 is connected to a sliding sleeve 347 forming the hub of the arm 167 which is connected to the hammer-releasing arm 163, see Fig. 48. As before described, the arm 167 is rigidly connected to the arm 167ᵃ whose pin 167ᵇ operates in a slot in the cam 82. The purpose of maintaining operative relations between the pin 167ᵇ and the slot in cam 82 during the time that said cam 82 is displaced by the "D" key is to insure the operation of the printing mechanism notwithstanding the lateral displacement of cam 82. The arm 85 which carries the tappet 84 for effecting the lift of the track frame 58 is loosely mounted on the hub of arm 167 so that the arm 85 is also moved laterally with the arm 167 and maintains operative relation between the tappet 84 and its operating pin 83.

The lever 343 is provided with a rearward extension 348 which lies under the member 180 of the bell crank lever, whereby when said lever 343 is rocked the bell crank lever is operated so as to shift the plate 109 and cam 82 to the third position, wherein the plate 186 registers with the outermost slot in post 188 and insures the maintenance of the shifted position of plate 109 and cam 82 during the forward pull of the handle.

349 indicates a rod connected to the "D" key, which rod as shown in Fig. 5, is also connected to a rock arm 350 on which is mounted the plate 22 of the escapement yoke, which plate as before described lies over the rear ends of the bars of the keys in group A. These key bars, as shown in Fig. 110 are notched in their upper edges so that when the "D" key is depressed and plate 22 rocked forward, operation of keys in group A will not actuate the escapement mechanism which steps the traveling setting-up carriage from right to left. Thus, if it is desired to set up on the keys in group A 25.5 the keys for the whole number are operated and then the "D" key is pressed while the "5" key in group A is operated, which results in bringing into action a decimal rack bar 100ᵃ which lies at the right of the units rack bar 100 heretofore described. This decimal rack bar 100ᵃ, shown in the drawings, is not provided with a zero printing type because such would be useless and it may thus be distinguished in the several figures in the drawings. This decimal rack bar is normally inactive in the ordinary and usual operations of the machine, but is brought into action when the "D" key is operated by the arrest of the traveling carriage and the setting-up of a pin therein, which pin occupies a position one column order to the right of what it would occupy had the escapement mechanism operated. In other words, in the ordinary operation of the machine when a key in group A is depressed a pin 63 is set up in the carriage and then when the key is released the carriage travels one step to the left. In the example under consideration the "2" and "5" keys in group A have been operated and the proper setting-up pins in the first and second series at the left have been advanced under the tens and units rack bar. When the "D" key is depressed the escapement mechanism is thrown out of operation and consequently when the "5" key in group A is depressed the carriage cannot travel but will remain stationary with the setting-up pin in the third series to the right positioned under the decimal rack bar.

When the operating handle is pulled, the stop pins 93 are set, there being a series for the decimal rack bar as well as the rack bars identified with whole numbers, and consequently the decimal rack bar is moved forward and operates the same as the other rack bars. There is also a wheel in the totalizers for coöperating with the decimal rack bar. The printing type of the decimal rack bar are each preceded by a period as shown in Fig. 51, so as to indicate the fact that the number printed by the type characters on this bar are decimals.

If it is desired to strike a decimal into the machine and not strike a whole number before the decimal, it is obvious that the "D" key can be depressed and a key in group A operated, which will prevent the traveling carriage from moving. It has been stated before that the first series of setting-up pins at the left of the traveling carriage lie under the series of stop pins 93 which control the decimal rack bar.

I have illustrated only one decimal rack bar in the accompanying drawings and consequently the machine has the capacity for handling only tenths of a whole number. In view of the fact that the decimal rack bar is normally restrained from movement and is only brought into action under special circumstances, special means are provided for releasing said rack bar in order that it may move forward to its designed position. These means consist of a set of stop pins 93ᵃ which are located under the decimal rack bar. These stop pins are provided with lateral projections or shoulders at their upper ends which rest under a wing plate 351 pivoted at its side edge to one of the bars 90. The free edge of this wing plate has a projection 351ᵃ, as shown in Fig. 42, which projection coöperates with a latch bar 352 by entering into a recess in said bar. When any of the pins 93ᵃ are lifted the wing plate is raised and the latch 352 raised, which causes the upper end of said latch to move out of the path of a pin 353 on the decimal rack bar and place a recess in the side of the latch bar in the path of said pin, whereby the decimal rack bar may move forward under the impelling action of its spring. The upper edge of this recess, as shown in Fig. 46, is inclined so that when the rack bar is restored to normal position the pin 353 will engage said inclined portion, lifting the latch, which latch then drops to its normal position in front of the pin 353.

To print a decimal which may have been registered in the machine, it is obvious that some means must be provided to release the decimal rack bar in order that it may move forward, if a number is registered therein, and present the proper printing type into printing line. To do this a lever 354 is pivotally mounted upon the cross bar 91 and has one end projecting under a lateral extension 352ᵃ of the latch bar. The opposite end of this lever is provided with a pin which is located under an extension 355 on the bar 113 which depresses the forward totalizers in taking a total. Thus, when the "T" key is depressed and the handle pulled to take a total the latch bar 252 will be raised so as to release the decimal rack bar, and said decimal rack bar will move forward to present the proper printing type in printing line unless the tripping projection of its meshed totalizer wheel 119 stands at zero, in which event the bar will remain stationary.

In connection with the description of the parts controlled by this D or decimal key it may be well to state, in addition to the above, that where it is desired to use the rear totalizer as a totalizer primary in character and to the exclusion of the forward totalizers the keys in group A may be operated, and after the example has been set up on the keyboard the D key is depressed, which shifts the parts just above described, and upon the pull of the handle the item will be introduced into the rear totalizer. To obtain the total of a series of items so introduced into the rear totalizer the P key is depressed and the handle pulled. In using the D key to place an item in the rear totalizer it will be observed that the D key is not operated until after the item is set up on the keys constituting group A. Were the D key depressed before it was attempted to set up the item on the keys in group A, it is obvious that the throwing out of the escapement would prevent the movement of the carriage, and consequently the introduction of the items into the field of the setting-up pins.

However, after the complete item has been set up on the keys of group A, when the D key is depressed, the throwing out of the escapement mechanism is of no consequence because the carriage is already in a position of rest. Upon the depression of the D key the plate 82 and its connected plate 109 are displaced, and consequently the bar 113 which depresses the forward totalizers into mesh with the rack bars will not be operated. The bar 272, however, will be operated as the handle moves forward to throw the rear totalizer into mesh with the rack bars, the plate 109 coöperating with the pin 274 before described.

The extension 186 will enter the third or innermost groove in post 188, and thus the plates 82—109 will be held displaced during a full stroke of the handle. The rear totalizer will be thrown into mesh with the rack bars when the handle reaches its forward position by the operation of the plate 109 on rod 272. Then, by pressing the T key down, which T key, through the bell crank lever connections 173—177, directly engages the pin 178 on the lower end of the bar 113, see Fig. 68, the forward totalizers will be thrown into engagement with the racks notwithstanding the lateral displacement of the plates 82—109. In this manner an item may be simultaneously introduced into the rear totalizer and any one of the forward totalizers, and by repeating this operation and introducing items into the several forward totalizers the rear totalizer will of course exhibit the grand total of all the items at the end of such operations.

*Multiplying a decimal.*—In order to multiply a decimal we will assume that the proper key is struck in group A, as, for instance, the "4" key, and that the "D" key has been depressed to prevent the traveling carriage from moving. Thus ".4" is introduced into the machine. If the "R" key is now operated, when the handle is pulled this ".4" will be printed and also set up in the pendant connected with the stepped stop bar at the extreme right-hand side of the series and registered in the forward totalizer. If the key in group B is now depressed and the handle pulled twice it results in multiplying the decimal as heretofore described with respect to whole numbers. To multiply a decimal, it is obvious that some means must be provided for releasing the decimal rack bar, and these consist of a lever 356 pivoted to the frame plate 90 and lying under the projecting end of the lever 354 as shown in Fig. 45. The opposite end of this lever is connected to a vertical bar 357 guided in the frame of the multiplying mechanism, see Fig. 74, and which has a pin 358 extending under the bar 259 whereby said bar 259 will return the bar 357 to its normal position, see Fig. 7. Bar 357 is also provided with a cross arm 359 which coöperates with shoulders 296 on the units multiplying plates and also with shoulders 360 on the tens multiplying plates. The shoulders 360 are shorter than the shoulders 296 so that when any of the tens multiplying plates are lifted they will raise the bar 357 but will not disturb the bar 295 which effects a step-by-step movement in the rear totalizer. When any of the units multiplying plates are elevated their longer shoulders 296 will engage and lift the crossed arms of both arms 295 and 357, lifting said bars so as to effect the step-by-step movement of the rear totalizer, and also vibrate the lever 356. Thus it will be seen that lever 356 is vibrated and the decimal rack bar released every time a multiplying plate is raised. This is necessary as in multiplication the product of the decimal multiplied might contain both tens and units, and the decimal rack bar must be released in order to register the partial products in the rear totalizer.

*Decimating the product.*—In order to decimate the product, which means reducing it by tens for the purpose of eliminating unnecessary decimals, I provide a key 361 which, for the sake of convenience, I have shown as being located in the key-board of the typewriter, see Fig. 2. To this key 361 is connected a rod 362, (Fig. 41) the rear end of which is shown in Fig. 3. This rod is connected to a rock arm 363 mounted on a rock shaft to whose opposite end is pinned a rock arm 364. This rock arm 364 carries a bar 365 whose upper end is inclined and lies adjacent the frame 270 containing the rear totalizer, see Figs. 59 to 62. The pawls 289 and 298 are provided with extensions on their free ends which lie in the path of the inclined upper end of the bar 365. When bar 365 is lifted by the decimating key its straight edge will rise in front of a ratchet tooth 288 while its beveled edge will engage the pawls 289 and 298 and lift them out of engagement with their ratchet teeth. The spring 366 which tends to draw the rear totalizer to the right now moves said totalizer until the ratchet tooth behind the bar 365 is arrested. When the decimating key is released and the bar 365 lowered, the pawls 289 and 298 are freed and rest on top of the ratchet teeth respectively with which they formerly engaged and consequently when the bar 365 is withdrawn from its ratchet tooth the spring 366 will pull the rear totalizer a distance of one step to the right. This may be repeated as many times as it is desired to decimate the product in the rear totalizer.

In the machine shown in the accompanying drawings I have shown the rear totalizer as being provided with two extra wheels which may contain numbers in the product, which numbers may be eliminated and not appear in the printed product by reason of the fact that they have been stepped out of the desired answer. This elimination of unnecessary decimals from the product is desirable because in business transactions it is seldom that decimals are considered less than mills. While it may be desirable to compute these decimals of lower order in multiplication, and while they may appear in the product up to mills, the decimating key eliminates them from the answer, and brings the units, tens and hundreds wheels back to their proper positions.

This decimating key is useful in determining the price of articles of commerce based on a given rate per hundred weight or thousand pounds, as the case may be. In the first instance, the number of pounds can be multiplied by the price per hundred pounds and the decimating key operated twice, which will give the correct answer of the cost. At so much per thousand pounds the decimating key would be operated three times. This decimating key in stepping the rear totalizer to the right, may possibly leave numbers registered in said wheels stepped out of coöperative relation to the decimal units and tens bars, etc., which would play havoc when it was again desired to multiply and obtain a product. In other words, under such conditions a correct product could not be obtained in the rear totalizer. After decimating a product one or more times as desired the proper product may then be taken in the usual manner.

Means must be provided for clearing the rear totalizer wheels which contain numbers which have been eliminated from the printed product, but which have been registered therein. This means consists of as many rack bars as there are extra decimating wheels in the rear totalizer, said rack bars being numbered 100ᵇ. These rack bars, it will be noticed, by reference to Figs. 30 and 32 do not carry type at their forward ends and have no teeth which can engage the front totalizers. Said rack bars, which may be termed clearing bars, are provided with teeth which coöperate only with the wheels of the rear totalizer. These clearing rack bars are also provided with pins 367 which, like the pin 353 of the decimal rack bar, normally lie behind latch bars 368, which latch bars have arms 369 extending rearwardly therefrom. These arms 369 lie over the end of a lever 370, which lever is a companion to the lever 354, but the opposite end of lever 370 coöperates with a bracket extension 371 on the bar 272 which is connected to the frame carrying the rear totalizer. Whenever the bar 272 is operated to depress the rear totalizer into engagement with its rack bars it will be obvious that the clearing bars will be released.

When the "P" key is depressed to obtain a product the clearing bars together with the decimal rack bar are released, and when the handle is operated the product is printed and taken out of the rear totalizer and transferred into the forward totalizer and all of the actuated wheels of the rear totalizer cleared.

When it is desired to add one or more numbers to one or more products and separately totalize the several products, and also to totalize the sum of the products with the added numbers, the product in the rear totalizer must first be printed and registered in one of the forward groups of totalizers in the usual way, viz., by pressing the "P" key during the forward movement of the handle and holding said "P" key down during the return movement of the handle, whereby the product is not only registered in the forward totalizer, but re-registered in the rear totalizer. The number or numbers to be added to the given product are then struck on the keys in group A and the "D" key held down during the forward movement of the handle for each number so struck. The accumulated total in the rear totalizer may now be printed and registered in a separate set of forward totalizers by pressing the "P" key and holding it down while the handle makes a complete stroke. To hold the "P" key down during the forward movement of the handle it converts the rear totalizer into a complete totalizing mechanism. After the several numbers have been added to their given product and their totals totalized, and the several products totalized in another set of forward totalizers, their separate totals may be taken in the manner already described.

If at any time it is desired to totalize the numbers or totals in two or more of the forward sets of totalizers, it is only necessary to depress the "P" key during the forward movement of the handle, when taking each of the totals, or the numbers in the front totalizers. This will totalize the numbers in the rear totalizer as a grand total, which may then be printed and the rear totalizer cleared as when taking a product therefrom.

The clearing rack bars 100ᵇ have operating bars 102 connected to them similar to the type-carrying rack bars so that these rack bars are moved forward by springs and returned to normal position by the restoring bar 104.

The clearing bars are only released by their restraining latch bars during the printing of products. The latch which restrains the decimal rack bar and which is under the control of the lever 354 is released at every stroke of the handle. As this release occurs after the front totalizers have been thrown into mesh therewith, it will be seen that if the front totalizer wheel meshing with the decimal rack bar stands at zero said bar cannot move forward but will remain stationary, and before the totalizer wheel is disengaged therefrom the latch bar will have been restored to its normal position. However, should the totalizer wheel in engagement with the decimal rack not stand at zero, pawls 208 may be relied upon to prevent forward movement of said rack. The decimal rack bar and also the clearing bars each coöperate with their respective pawls 208, and these pawls prevent unnecessary and untimely movement of said rack bars. The movement of the decimal bar is dependent upon the actuation of one of its stop pins which raises its latch bar, and the decimal bar then moves forward before the front totalizer wheels are in engagement therewith, except of course when taking a total, in which latter event the decimal bar is released and operated as the other type-carrying bars of the machine.

*Locking the idle totalizer wheels against accidental displacement.*—375, see Fig. 56, indicates a bar coextensive in length to the distance of movement of the three groups of totalizers, said bar having an edge designed to coöperate with all of the idle totalizer wheels which are not in operative relation to their actuating rack bars. The edge of the bar is cut away as shown so as to permit rotation of the active totalizer wheels.

The rear totalizer is also provided with a bar 376, which bar is normally out of engagement with said rear totalizer wheels, but when said totalizer wheels are stepped to the left said bar successively engages the advancing wheels and locks them against displacement.

As the toothed carrying segments are spaced apart for mounting the bars 127 thereon, it might occur that the totalizer wheels in passing from one toothed segment to the other might be displaced, and to avoid this I widen the teeth of said segments as shown in Fig. 26, which results in providing practically a continuous way for the teeth of the laterally movable totalizer wheels.

In Figs. 101 and 102 I have shown a toothed bar 104ª, the teeth of which are pointed, said points being designed to enter between bars 102 and 102ª for the purpose of spacing said bars apart and holding them in their separated positions so that they will not frictionally contact with each other in operation.

With reference to the means for operating the parts of the adding machine, it will be understood that while I have shown and described an operating handle, other power such as a motor could be employed to rock the shaft 81, and for sake of distinction the said shaft 81 might be designated as the power shaft. The rear totalizer in its coöperative relation to the multiplying devices may also be designated as the product-totalizer in so far as in its function of adding the partial products together it will contain at the end of the multiplying operation the complete or total product.

I am aware that minor changes in the construction, arrangement and combination of the several parts of my device can be made and substituted for those herein shown and described without in the least departing from the nature and principle of my invention.

Several of the features shown in this present application have been heretofore disclosed in applications previously filed by me, to wit, No. 189,031, filed January 14, 1904; No. 225,758, filed September 24, 1904; and No. 249,369, filed March 10, 1905. My present application contains practically all of the most important features of my aforesaid applications, and may therefore be considered as a composite continuation thereof.

Having thus described the invention, what is claimed as new and desired to be secured by Letters Patent is:

1. In a calculating machine, the combination with two or more groups of totalizer wheels operating as separate entities and shiftable laterally with respect to the actuating device, a single set of actuating devices therefor, carrying devices common to all of said groups of totalizers, printing type for printing the items and the totals thereof, said printing type being positioned by said actuating devices, a paper carriage also laterally shiftable with respect to the actuating device so as to position a sheet of paper opposite said printing type for column printing, means for holding said groups of totalizer wheels in a laterally immovable position for repeated operations of said actuating devices, and means for collectively moving the groups of totalizer wheels laterally with respect to the actuating device so as to position a selected group in operative relation to said actuating devices.

2. In a calculating machine, the combination with two or more groups of totalizer wheels operating as separate entities and shiftable laterally with respect to the actuating device, a single set of relatively fixed actuating devices for each of the several wheels in a selected group, carrying devices common to all of said groups of totalizers, printing type for printing the items and the totals thereof, said printing type being positioned by said actuating devices, a paper carriage also laterally shiftable with respect to the actuating device so as to position a sheet of paper opposite said printing type for column printing, means for holding said groups of totalizer wheels in a laterally immovable position for repeated operations of said actuating devices, means for collectively moving the groups of totalizer wheels laterally with respect to the actuating device so as to position a selected group in operative relation to said actuating devices, and another totalizer coöperating with said actuating devices and independent carrying mechanism for said last mentioned totalizer, whereby the said last mentioned totalizer may be operated in conjunction with the shiftable totalizers to register the grand total of all the numbers registered in said shiftable totalizers.

3. In a calculating machine, the combination with two or more groups of totalizer wheels operating as separate entities and shiftable laterally with respect to the actuating device, a single set of relatively fixed actuating devices common to said totalizers, printing type for printing the items and the totals thereof, said printing type being positioned by said set of actuating devices, a paper carriage also laterally shiftable with respect to the actuating device so as to position a sheet of paper opposite said printing type for column printing, means for holding said groups of totalizer wheels in a laterally immovable position for repeated operations of said set of actuating devices, means for collectively moving the groups of totalizer wheels laterally with respect to the actuating device so as to position a selected group in operative relation to said set of actuating devices, means for locking the idle groups of totalizers against rotation, another totalizer coöperating with said actuating devices, and independent carrying mechanism for said last mentioned totalizer, whereby, the said last mentioned totalizer may be operated in conjunction with the shiftable totalizers to register the grand total of all the numbers registered in said shiftable totalizers.

4. In a calculating machine, the combination with alined groups of totalizer wheels operating as separate entities and shiftable laterally with respect to the actuating devices, a single set of actuating devices common to said totalizers, printing type which are positioned by said actuating devices for recording the items and the totals thereof, a paper carriage also shiftable laterally with respect to the actuating devices, paper-feeding mechanism mounted on said carriage and operable in any lateral position of the carriage, means for shifting the groups of totalizer wheels laterally so as to position a selected group in operative relation to said actuating devices, and means for locking the inoperative groups of totalizer wheels against rotation.

5. In a calculating machine, the combination with a series of actuating racks, of a swinging frame, a shaft slidingly mounted in said frame, groups of totalizer wheels mounted on said shaft and movable therewith, means for moving said shaft and its groups of totalizer wheels laterally with respect to said racks so as to position a selected group of totalizer wheels in operative relation to said racks and also position other groups of totalizer wheels out of operative relation to said racks, and means for causing engagement between the selected group of totalizer wheels and all of said racks; substantially as described.

6. In a calculating machine, the combination with a movable frame, of a shaft slidingly mounted in said frame, groups of totalizer wheels loosely mounted on said shaft and movable longitudinally therewith, actuating devices for said totalizer wheels, means for holding said groups in a laterally immovable position for repeated operations of said actuating devices, means for locking the totalizer wheels not in operative relation to said actuating devices, and means for moving said frame and its carried totalizers into and out of operative relation to said actuating devices; substantially as described.

7. In a calculating machine, the combination with laterally shiftable groups of totalizer wheels, of actuating devices for repeatedly operating all of the wheels of a selected group, yielding means exerting an energy to move said groups of totalizer wheels collectively in one direction, means for holding said groups in a laterally immovable position, and means for positively moving the groups of totalizer wheels in opposition to said yielding means so as to place a selected group of totalizer wheels in operative relation to said actuating devices and other groups of said totalizer wheels out of operative relation to said actuating devices; substantially as described.

8. In a calculating machine, the combination with two or more groups of totalizer wheels operating as separate entities, of a single set of actuating devices common to all of said totalizers, means for holding said groups of totalizer wheels in laterally immovable position for repeated operations of said actuating devices, yielding means for collectively moving the groups of totalizer wheels in one direction so as to place one group of totalizer wheels out of operative relation to said actuating devices, and another group of totalizer wheels in operative relation to said actuating devices, and an escapement mechanism for controlling the movement imparted to said groups of totalizer wheels by said yielding means; substantially as described.

9. In a calculating machine, the combination with a laterally movable paper carriage, of shiftable groups of totalizer wheels, actuating devices therefor, and means independently movable with respect to the carriage, but under the control of said carriage when said carriage is moving in one direction, for shifting said group of totalizer wheels; substantially as described.

10. In a calculating machine, the combination with a laterally movable paper carriage, of shiftable groups of totalizer wheels, actuating devices therefor, yielding means independent of the carriage and tending to move said groups of totalizer wheels in one direction, an escapement mechanism operated by said carriage for controlling such movement, and adjustable means on the carriage whereby said escapement may be operated in different lateral positions of the carriage; substantially as described.

11. In a calculating machine, the combination with a laterally movable paper carriage, shiftable groups of totalizer wheels, actuating devices therefor, yielding means tending to move said groups of totalizer wheels in one direction, escapement mechanism for controlling such movement, a tappet connected to said escapement mechanism, adjustable stops on the carriage for coöperating with said tappet whereby when said carriage moves in one direction said escapement mechanism is operated, and when said carriage moves in the opposite direction said escapement mechanism is indirection said escapement mechanism is inoperative, and means on the carriage for positively moving the groups of totalizer wheels in a direction opposite to the direction in which it is moved by said yielding means; substantially as described.

12. In a calculating machine, the combination with alined groups of totalizer wheels, a single set of actuating devices common to said totalizers, key-controlled stops therefor, means for moving said groups of totalizer wheels laterally so as to position a selected group in operative relation to said actuating devices, means for locking the inoperative group of totalizer wheels against operation, and carrying devices in operative relation to the free totalizer wheels; substantially as described.

13. In a calculating machine, the combination with a movable frame, of a shaft slidingly mounted in said frame, groups of totalizer wheels loosely mounted on said shaft and movable longitudinally therewith, actuating devices for said totalizer wheels, means for locking the totalizer wheels not in operative relation to said actuating devices, means for moving said frame and its carried totalizers into and out of operative relation to said actuating devices, and carrying devices for coöperating with the operative totalizer wheels to operate said totalizer wheels when out of engagement with said actuating devices; substantially as described.

14. In a calculating machine, the combination with totalizer wheels carrying tripping projections, of actuating rack bars therefor, a swinging frame in which said totalizer wheels are mounted, carrying devices for operating said totalizer wheels when the latter are out of mesh with their actuating rack bars, and pendants mounted in said swinging frame for coöperating with the tripping projections of the totalizer wheels, said pendants when actuated by said tripping projections rendering the carrying devices controlled thereby operative; substantially as described.

15. In a calculating machine, the combination with totalizer wheels, of rack bars for actuating the same, tripping projections on said totalizer wheels, pendants coöperating with said tripping projections, tripping levers in operative relation to said pendants, shouldered bars which are operated by said tripping levers, and toothed segments to which said shouldered bars are connected by a slot and pin connection, said toothed segments having operative relation to said totalizer wheels; substantially as described.

16. In a calculating machine, the combination with totalizer wheels having tripping projections, of actuating rack bars therefor, spring-impelled toothed segments in operative relation to said totalizer wheels, a shouldered bar connected to each segment by a slot and pin connection for preventing movement thereof in one direction, means operated by the totalizer wheels for tripping said shouldered bars so that said segments may move under the action of their respective springs, and a vibrating bar engaging said segments for temporarily restraining movement thereof, said vibrating bar finally permitting movement of said segments under the action of their respective springs, and then restoring said segments and shouldered bars to normal position in readiness for another operation; substantially as described.

17. In a calculating machine, the combination with totalizer wheels and their carrying devices, of a vibrating bar for restraining movement of said carrying devices, and restoring the carrying devices to normal position, a rod for vibrating said bar, a tappet on said rod, and a cam which coöperates with said tappet; substantially as described.

18. In a calculating machine, the combination with totalizer wheels and their carrying devices, of a vibrating bar for restraining movement of said carrying devices, and restoring the carrying devices to normal position, a rod for vibrating said bar, a tappet on said rod, and a cam which coöperates with said tappet, said cam being provided with a heel portion and a concentric portion whereby said rod is lifted when the cam is moving in one direction and permitted to drop slightly and be held in an elevated position during the major portion of movement of the cam; substantially as described.

19. In a calculating machine, the combination with totalizer wheels, of carrying devices coöperating therewith, a vibrating bar, a rod for said vibrating bar, a tappet on said rod, and a cam which coöperates with said tappet, said cam when moving in one direction not operating the bar, but when moving in the opposite direction coöperating with said tappet to initially lift the bar to an abnormally high position, and then permitting the bar to drop slightly and hold it in an elevated position, and finally permitting the bar to descend to its lowermost position; substantially as described.

20. In a calculating machine, the combination with totalizer wheels and their actuating rack bars, of restoring mechanism for said rack bars, and pawls coöperating with said rack bars for preventing unnecessary movement thereof, said pawls being controlled in their operative relation to the rack bars by said restoring mechanism; substantially as described.

21. In a calculating machine, the combination with actuating devices, of two independently operable groups of totalizer wheels in operative relation to said actuating devices, one of which groups is laterally shiftable, means for shifting said group so as to displace the same laterally with respect to said actuating devices, and means whereby both groups may be engaged with and operated by said actuating devices; substantially as described.

22. In a calculating machine, the combination with actuating devices, of two independently operable groups of totalizer wheels in operative relation to said actuating devices, one of which groups is laterally shiftable, means for shifting said group so as to displace the same laterally with respect to said actuating devices, and means whereby both groups may be simultaneously engaged with and operated by said actuating devices; substantially as described.

23. In a calculating machine, the combination with actuating devices, of key controlled stops therefor, two independently operable groups of totalizer wheels in operative relation thereto and normally disengaged therefrom, means for engaging both groups of totalizer wheels with said actuating devices, whereby a number registered in one group may be transferred into the other group, and means for disengaging the totalizer wheels originally containing said number from said actuating devices, whereby said totalizer wheels stand at zero when the number has been transferred to the other totalizer wheels; substantially as described.

24. In a calculating machine, the combination with actuating devices, of key controlled stops therefor, two independently operable groups of totalizer wheels in operative relation thereto and normally disengaged therefrom, means for engaging both groups of totalizer wheels with said actuating devices whereby a number registered in one group may be transferred to and registered in the other group, and means for maintaining the engagement between the group of totalizer wheels originally containing said number with said actuating devices, whereby said number will be re-registered in the group of totalizer wheels originally containing said number; substantially as described.

25. In a calculating machine, the combination with actuating devices, of key controlled stops therefor, two independently operable groups of totalizer wheels in operative relation thereto and normally disengaged therefrom, means for engaging one group of totalizer wheels with said actuating devices for the purpose of positioning said actuating devices, and means for engaging the other group of totalizer wheels with the positioned actuating devices; substantially as described.

26. In a calculating machine, the combination with toothed actuators, key means for controlling the amount of movement of said actuators, two independently operable groups of totalizer wheels in operative relation to said actuators, means for introducing items into one or both totalizers, said means being under control of the operator, and means for transferring numbers from either totalizer to the other; substantially as described.

27. In a calculating machine, the combination with two groups of totalizer wheels, of key positioned stops for controlling the movements thereof, and means under control of the operator for transferring the number registered in either group to the other; substantially as described.

28. In a calculating machine, the combination with two groups of totalizer wheels, of key operated means under control of the operator for consecutively registering items into either group, and means for transferring items accumulated in either group to the other; substantially as described.

29. In a calculating machine, the combination with two groups of totalizer wheels, of key positioned means for introducing a series of numbers to be added together into one or both groups, and means for transferring the numbers so accumulated in either group to the other group of totalizer wheels; substantially as described.

30. In a calculating machine, the combination with two groups of totalizer wheels, of key operated means under the control of the operator for rendering either group primary in character, and means for transferring the number from the primary group of totalizer wheels to the other group of totalizer wheels; substantially as described.

31. In a calculating machine, the combination with two groups of totalizer wheels, of key operated means for separately introducing items consecutively or alternately in either of said groups of totalizer wheels, and means for transferring the total of items from either group to the other; substantially as described.

32. In a calculating machine, the combination with two groups of totalizer wheels, of actuating devices therefor, key operated means for rendering either of said groups of totalizer wheels operative with respect to said actuating devices in additive operations, means for obtaining separate totals from said groups respectively, and means for transferring a total from one group to the other; substantially as described.

33. In a calculating machine, the combination with two groups of totalizer wheels, of actuating devices therefor, key operated means for rendering either of said groups of totalizer wheels operative with respect to said actuating devices in additive operations, means for obtaining separate totals from said groups respectively, and means for transferring a total from either group to the other and adding said total to the number already registered in the receiving totalizer; substantially as described.

34. In a calculating machine, the combination with two groups of totalizer wheels, of actuating devices therefor, key operated means under the control of the operator for consecutively introducing items into either of the groups of totalizer wheels, and means whereby in obtaining a total of said items the other group of totalizer wheels is automatically thrown into operative relation to said actuating devices, whereby the said total is registered therein; substantially as described.

35. In a calculating machine, the combination with two groups of totalizer wheels, actuating devices therefor, means for accumulating items in one group of totalizer wheels, and means for obtaining a total of said items, which operation clears the group of totalizer wheels in which said total was registered and introduces said total into the other group of totalizer wheels; substantially as described.

36. In a calculating machine, the combination with shiftable groups of totalizer wheels, of actuating devices therefor, means for shifting the groups of totalizer wheels so as to position a selected group in operative relation to said actuating devices, and a group of totalizer wheels normally in operative relation to said actuating devices, whereby numbers registered in any of the shiftable groups may be transferred to and accumulated in the normally positioned group of totalizer wheels; substantially as described.

37. In a calculating machine, the combination with shiftable groups of totalizer wheels, of actuating devices therefor, means for shifting the groups of totalizer wheels so as to position a selected group in operative relation to said actuating devices, another group of totalizer wheels normally in operative relation to said actuating devices, and means under the control of the operator for engaging any desired group of totalizer wheels with the actuating devices for introducing a number therein; substantially as described.

38. In a calculating machine, the combination with actuating devices, of a group of totalizer wheels normally in operative relation thereto, shiftable groups of totalizer wheels, one of which is in operative relation to said actuating devices, and means whereby the two groups in operative relation to said actuating devices may be simultaneously engaged with and operated by said actuating devices; substantially as described.

39. In a calculating machine, the combination with a group of totalizer wheels normally in operative position, of shiftable groups of totalizer wheels, one of which is normally in operative position, and means under control of the operator for transferring a number registered in either operative group to the other; substantially as described.

40. In a calculating machine, the combination with a group of totalizer wheels normally in operative position, of shiftable groups of totalizer wheels, one of which is normally in operative position, means under control of the operator for consecutively registering items in either operative group, and means for transferring items accumulated in one group to the other; substantially as described.

41. In a calculating machine, the combination with a group of totalizer wheels normally in operative position, of shiftable groups of totalizer wheels, one of which is normally in operative position, and key controlled means for introducing a series of numbers to be added together into one or both groups of totalizer wheels; substantially as described.

42. In a calculating machine, the combination with actuating devices, of key controlled stops therefor, two independently operable groups of totalizer wheels in operative relation thereto and normally disengaged therefrom, one of which groups is laterally shiftable, means for shifting said group so as to displace the same laterally with respect to said actuating devices, and means for engaging said groups of totalizer wheels with said actuating devices, whereby a number registered in one set of totalizer wheels may be transferred to the other set of totalizer wheels; substantially as described.

43. In a calculating machine, the combination with a laterally movable paper carriage, of shiftable groups of totalizer wheels, actuating devices in operative relation to one of said groups of totalizer wheels, another group of totalizer wheels constantly in operative relation to said actuating devices, and means under the control of said laterally movable paper carriage for shifting the shiftable groups of totalizer wheels; substantially as described.

44. In a calculating machine, the combination with a laterally movable paper carriage, of shiftable groups of totalizer wheels, actuating devices in operative relation to one of said groups of totalizer wheels, another group of totalizer wheels constantly in operative relation to said actuating devices, separate carrying mechanisms for each of the groups of totalizer wheels in operative relation to said actuating devices, and means under the control of said laterally movable paper carriage for shifting the shiftable groups of totalizer wheels; substantially as described.

45. In a calculating machine, the combination with a laterally movable paper carriage, of alined groups of totalizer wheels, actuating devices for the group of totalizer wheels in operative relation thereto, yielding means under the control of the laterally movable carriage for moving said groups of totalizer wheels step-by-step in one direction, means on said totalizer carriage for positively moving said totalizer wheels in the opposite direction, another group of totalizer wheels constantly in operative relation to said actuating devices, and separate carrying mechanisms for each group of totalizer wheels in operative relation to said actuating devices; substantially as described.

46. In a calculating machine, the combination with two groups of totalizer wheels, one of which is laterally displaceable, and the other of which is substantially fixed with relation to the actuating devices, actuating devices, printing type which are positioned by said actuating devices, and printing mechanism coöperating with said positioned printing type; substantially as described.

47. In a calculating machine, the combination with actuating devices, of key controlled stops for determining the excursions thereof, two independently operable groups of totalizer wheels in operative relation to said actuating devices, one of which is laterally displaceable, and the other of which is substantially fixed with relation to the actuating devices, printing type which are positioned by said actuating devices, and means for causing said type to make a printing impression whereby a record is made of the number registered in either of said groups of totalizer wheels; substantially as described.

48. In a calculating machine, the combination with actuating devices, of two key controlled stops for determining the excursions thereof, independently operable groups of totalizer wheels in operative relation to said actuating devices, means whereby both groups may be engaged with and operated by said actuating devices, whereby a number registered in either group of totalizer wheels may be transferred to the other group of totalizer wheels, printing type which are positioned by said actuating devices, and means for causing said type to make a printing impression and make a record of the number which is transferred from one totalizer to the other; substantially as described.

49. In a calculating machine, the combination with actuating devices, keys for controlling the amount of movement of said devices, printing type which are positioned by said actuating devices, means for causing said type to make a printing impression, two independently operable groups of totalizer wheels in operative relation to said actuating devices, means for introducing items into one or both of said groups of totalizers and making a record of said items, said means being under control of the operator, and means for transferring numbers from either totalizer to the other and making a record of the number transferred; substantially as described.

50. In a calculating machine, the combination with actuating devices, keys for controlling the amount of movement of said devices, printing type which are positioned by said actuating devices, means for causing said type to make a printing impression, two independently operable groups of totalizer wheels in operative relation to said actuating devices, means under control of the operator for transferring the number registered in either group to the other, and make a record of the number transferred; substantially as described.

51. In a calculating machine, the combination with actuating devices, means for controlling the amount of movement of said devices, printing type which are positioned by said actuating devices, means for causing said type to make a printing impression, two independently operable groups of totalizer wheels in operative relation to said actuating devices, means under control of the operator for consecutively registering items in either group and making a record of said items, and means for transferring items accumulated in one group to the other and making a record of the number transferred; substantially as described.

52. In a calculating machine, the combination with shiftable groups of totalizer wheels, of actuating devices therefor, means for shifting the groups of totalizer wheels so as to position a selected group in operative relation to said actuating devices, another group of totalizer wheels normally in operative relation to said actuating devices, printing type which are positioned by said actuating devices, and means for causing said type to make a printing impression irrespective of the particular group of totalizer wheels with which said actuating devices may be coöperating; substantially as described.

53. In a calculating machine, the combination with a laterally shiftable paper carriage, laterally shiftable totalizers whose position is controlled by said paper carriage, actuating devices for said totalizers, printing type positioned by said actuating devices, and means for causing said printing type to make a printing impression of the items in separate columns on a sheet of paper in the laterally movable paper carriage, which items are introduced into the different groups of totalizers; substantially as described.

54. In a calculating machine, the combination with a laterally shiftable paper carriage for supporting a sheet of paper and positioning said sheet with respect to the printing type of said calculating machine, shiftable groups of totalizer wheels whose position is controlled by said laterally shiftable carriage, actuating devices for coöperating with the group of totalizer wheels in operative relation thereto, printing type whose position is controlled by said actuating devices, whereby items registered in said shiftable groups of totalizers may be printed in parallel columns on a sheet of paper and separately totalized in said groups of totalizers, another group of totalizer wheels in operative relation to said actuating devices and in which items or totals introduced into any of the shiftable groups of totalizers may be registered, and means for printing the grand total registered in such other group of totalizer wheels; substantially as described.

55. In a calculating machine, the combination with a traveling carriage containing setting-up devices, keys for positioning said setting-up devices, means controlled by the keys for causing said carriage to travel step by step from lower to higher orders, and stop pins which are positioned by said setting-up devices; substantially as described.

56. In a calculating machine, the combination with keys, of a movable field of setting-up devices, means for positioning said field to successively place denominational series of setting-up devices under control of said keys commencing with the lowest order, stop pins, and means for positioning said stop pins by the positioned setting-up devices; substantially as described.

57. In a calculating machine, the combination with keys, of a movable field of setting-up devices comprising shouldered pins which are lifted upon the operation of said keys and locked in their elevated position, and means for positioning said field to successively place denominational series of setting-up devices under control of said keys, stop pins, and means for positioning said stop pins by the elevated setting-up pins; substantially as described.

58. In a calculating machine, the combination with keys, of a movable field of setting-up devices comprising shouldered pins, each of said shouldered pins having a cam face in order that it may be moved laterally and locked in its elevated position, means for positioning said field to successively place denominational series of setting-up pins under control of said keys, and means for restoring said setting-up pins to their normal position; substantially as described.

59. In a calculating machine, the combination with keys, of a traveling carriage, an escapement mechanism for controlling the travel of said carriage, setting-up pins arranged in denominational series in said carriage, yielding means for exerting lateral pressure against said pins, whereby when said pins are elevated they are locked in position, and restoring means for displacing the elevated pins laterally to unlock said pins and depress them to normal position; substantially as described.

60. In a calculating machine, the combination with keys, of a traveling carriage, means for imparting a step-by-step movement to said carriage, shouldered pins arranged in said carriage, said pins being connected together in pairs by springs whereby said pins are locked in an elevated position, and means for restoring said pins; substantially as described.

61. In a calculating machine, the combination with keys, of a traveling carriage, means for imparting a step-by-step movement to said carriage, shouldered pins in said carriage arranged in denominational series which are successively placed under control of said keys, means for exerting lateral pressure against said pins to lock them in an elevated position, and restoring means for moving the elevated pins laterally and depressing them to normal position; substantially as described.

62. In a calculating machine, the combination with keys, of setting-up devices arranged in denominational series, means for successively placing each series under control of said keys, stop pins, and means for collectively positioning said stop pins by said setting-up devices; substantially as described.

63. In a calculating machine, the combination with totalizer wheels, of shouldered actuating devices therefor, a series of stop pins movable into the path of movement of each shoulder, means for positioning certain of said stop pins to arrest said actuating devices in one of nine different positions, and means for positioning other of said stop pins to hold said actuating devices against movement and in zero position; substantially as described.

64. In a calculating machine, the combination with totalizer wheels, of shouldered actuating devices therefor, a series of zero and digit stops movable into the path of movement of each shouldered actuating device, a traveling carriage containing a field of setting-up devices arranged in denominational series, keys, means for positioning said carriage to place said denominational series successively under control of said keys, and means on the carriage for positioning all of the zero stop pins identified with actuating devices of higher denomination than the positioned order stop pin of highest denomination; substantially as described.

65. In a calculating machine, the combination with totalizer wheels, of shouldered racks for actuating said wheels, zero and digit stop pins arranged and movable into series in the paths of movement of the respective shoulders on said racks, setting-up devices for elevating said stop pins into the path of movement of the shoulders on said racks, whereby said racks are either prevented from moving by the positioned zero stop pins or permitted to move until arrested by the positioned digit stop pins, means for elevating the setting-up devices so as to lift said stop pins into position, means for restoring said setting-up devices after the stop pins have been positioned, and means for restoring the stop pins after the racks have been arrested in their movement by the positioned stop pins; substantially as described.

66. In a calculating machine, the combination with totalizer wheels, of shouldered racks for actuating said wheels, stop pins for coöperating with the shoulders of said racks, and preventing movement thereof or permitting movement of said racks depending upon the location of the positioned stop pin, said stop pins being mounted in a stationary frame and means for collectively restoring said stop pins to normal position; substantially as described.

67. In a calculating machine, the combination with totalizer wheels, of shouldered racks for coöperating therewith, stop pins for determining the movement of said racks, shoulders on said stop pins, a comb plate whose teeth engage said shoulders, and means for operating said plate to restore said stop pins to home position; substantially as described.

68. In a calculating machine, the combination with keys, of setting-up devices in denominational series which are successively placed under control of said keys, means for advancing said setting-up devices step-by-step, and means for bodily elevating said setting-up devices substantially as described.

69. In a calculating machine, the combination with a traveling carriage containing setting-up devices, a hinged track frame in which said traveling carriage is mounted, and means for raising and lowering said track frame; substantially as described.

70. In a calculating machine, the combination with a traveling carriage containing setting-up devices, a hinged track frame in which said carriage is mounted, means for advancing said carriage step-by-step along said track frame, means for raising and lowering said track frame and its supported carriage, and a restoring cam plate on the track frame for coöperating with the setting-up devices; substantially as described.

71. In a calculating machine, the combination with a traveling carriage containing setting-up devices, of a swinging frame on which said carriage is mounted, said carriage and its setting-up devices normally lying in an idle plane, keys for positioning said setting-up devices, means for bodily raising said setting-up devices, and means for restoring all of said setting-up devices to normal position immediately after they have been elevated and perform their work so as to place said setting-up devices in readiness to be re-positioned before the other parts of the machine may have completed their operations; substantially as described.

72. In a calculating machine, the combination with a handle and means for compelling a full stroke of the handle, and an error key for operating said means; substantially as described.

73. In a calculating machine, the combination with a handle and mechanism for compelling a full stroke of the handle, a traveling carriage containing setting-up devices, and an error key for operating the mechanism for compelling a full stroke of the operating handle and also for restoring the carriage and its handle to operative position; substantially as described.

74. In a calculating machine, the combination with a group of keys by which the multiplicand may be introduced into the machine, a group of multiplier keys, multiplying devices positioned by said last mentioned keys, and an error key for restoring said multiplier keys and multiplying devices to normal position; substantially as described.

75. In a calculating machine, the combination with keys, notched key bars connected to said keys, a plate coöperating with said key bars, and means for moving said plate into register with said notch, whereby when a key bar is operated said plate will remain stationary; substantially as described.

76. In a calculating machine, the combination with a laterally movable carriage, an escapement mechanism for causing said carriage to move laterally step-by-step, adding keys and their key bars, a traveling carriage containing setting-up devices which are positioned by said adding keys, means for causing said traveling carriage to move laterally step-by-step, and means under control of the operator for rendering the escapement which controls the lateral movement of the paper carriage operative or inoperative at will; substantially as described.

77. In a calculating machine, the combination with notched key bars, of a rocking frame, a plate carried by said rocking frame, and normally out of register with said notch, whereby the operation of any of said key bars will engage said plate and lift said rocking frame, means for moving the plate into register with said notches whereby the operation of any of said keys will not rock said frame, and an escapement mechanism controlled by said rocking frame; substantially as described.

78. In a calculating machine, the combination with keys, of laterally movable setting-up devices in denominational series which are successively placed under control of said keys, a stationary field of stops, and means for arresting movement of said laterally movable setting-up devices, whereby said laterally movable denominational series are prevented from being successively placed under control of said keys; substantially as described.

79. In a calculating machine, the combination with keys, of a traveling carriage containing setting-up devices, an escapement mechanism for controlling the travel of said carriage, said escapement mechanism being operated by said keys, and means for preventing said keys from operating said escapement mechanism; substantially as described.

80. In a calculating machine, the combination with a traveling carriage containing setting-up devices, digit keys, and escapement mechanism controlled by said digit keys for effecting a step by step travel of said carriage from lower to higher orders, and a decimal key for preventing the travel of said carriage; substantially as described.

81. In a calculating machine, the combination with totalizer wheels, racks for actuating said totalizer wheels, one of said racks being identified with the tenths column, a traveling carriage containing setting-up devices, means for advancing said carriage step-by-step so as to denominationally position said setting-up devices, and means for arresting the movement of said carriage whereby a setting-up device for the tenths rack bar will be positioned; substantially as described.

82. In a calculating machine, the combination with totalizer wheels, of actuating racks therefor, one of said racks being located in the tenths column, a traveling carriage containing denominational series of setting-up devices, the first of which normally lies in a vertical plane under the tenths column rack, keys for positioning said setting-up devices and advancing the carriage laterally so as to successively place a positioned setting-up device under the units, tenths, etc., racks, said escapement mechanism operating upon the depression of a key, and means for rendering the escapement mechanism inoperative, whereby when a key is depressed the positioned setting-up device will be located under the tenths rack bar; substantially as described.

83. In a calculating machine, the combination with totalizer wheels, of rack bars for actuating the same, said rack bars being located in the tenths, units, tens, hundreds, etc., columns, stop pins constituting the only means for controlling the movement of the units, tens, etc., rack bars, and a locking bolt for controlling the movement of the tenths rack bar; substantially as described.

84. In a calculating machine, the combination with totalizer wheels, of rack bars for actuating the same, said rack bars being located in the tenths, units, tens, hundreds, etc., columns, stop pins constituting the only means for controlling the movement of the units, tens, etc., rack bars, a locking bolt for controlling the movement of the tenths rack bar, and stop pins for determining the distance of movement of the tenths rack bar; substantially as described.

85. In a calculating machine, the combination with totalizer wheels, of rack bars for actuating the same, said rack bars being located in the tenths, units, tens, hundreds, etc., columns, stop pins constituting the only means for controlling the movement of the units, tens, etc., rack bars, a locking bolt for controlling the movement of the tenths rack bar, stop pins for determining the distance of movement of the tenths rack bar, and means operable independently of the movement of said stop pins for actuating said locking bolt and releasing the tenths rack bar; substantially as described.

86. In a calculating machine, the combination with totalizer wheels, of rack bars for actuating the same, said rack bars being located in the tenths, units, tens, hundreds, etc., columns, a locking bolt for restraining movement of the tenths rack bar, stop pins for determining the distance of movement of the tenths rack bar, a plate common to all of said stop pins and connected to said locking bolt, and means for positioning said stop pins whereby said locking bolt is operated to release said tenths rack bar; substantially as described.

87. In a calculating machine, the combination with totalizer wheels, of actuating rack bars therefor, which rack bars are normally out of engagement with said totalizer wheels, stops for determining the distance of movement of said rack bars, means for moving said rack bars against said stops, means for engaging the totalizer wheels with said rack bars, means for restoring said rack bars whereby said totalizer wheels are actuated, means for restoring said stops, and restraining pawls which are thrown into operative position with respect to said rack bars to prevent unnecessary movement thereof after said stops have been restored; substantially as described.

88. In a calculating machine, the combination with a swinging totalizer frame, a bar connected thereto for swinging said frame, a cam-faced tappet mounted on said bar, and means for operating said tappet; substantially as described.

89. In a calculating machine, the combination with a swinging totalizer frame, a bar connected thereto for swinging said frame, a cam-faced tappet mounted on said bar, and a shouldered locking plate for operating said tappet; substantially as described.

90. In a calculating machine, the combination with a swinging totalizer frame, of a bar connected thereto for swinging said frame, a cam-faced tappet mounted on said bar, and a plate with which the cam face of said tappet coöperates whereby when said tappet is rocked in one direction the cam face engages said plate and causes the bar and its connected swinging frame to be depressed, said parts remaining in such position until said tappet is restored to normal position; substantially as described.

91. In a calculating machine, the combination with a swinging totalizer frame, of a bar connected thereto for swinging said frame, a cam-faced tappet mounted on said bar and coöperating with a plate, and a rocking plate for operating said tappet, said plate having a shoulder which engages the tappet at one extremity of its movement, whereby the bar and its connected swinging frame are depressed and remain depressed until said rocking plate approaches the other extremity of its movement, when another shoulder thereon engages said tappet and restores the parts to normal position, such last-mentioned shoulder on the rocking plate moving past the tappet so as to permit the bar and its connected tappet to be depressed by other means; substantially as described.

92. In a calculating machine, the combination with totalizer wheels, of a swinging frame in which said wheels are mounted, rack bars for actuating the same, said rack bars being identified with the units, tenths, etc., columns, a locking bolt for restraining movement of the tenths rack bar, and means connected to said swinging frame for operating said locking bolt; substantially as described.

93. In a calculating machine, the combination with a decimal rack, of a totalizer wheel with which said rack coöperates, a swinging frame in which said wheel is mounted, a locking bolt for restraining movement of said rack, stop pins for determining the distance of movement of said rack, means operated by said stop pins for actuating the locking bolt and releasing said decimal rack, and means operated by said swinging frame for actuating said locking bolt and releasing the rack; substantially as described.

94. In a calculating machine, the combination with a decimal rack, of multiplying plates, and means controlled by said multiplying plates for releasing said decimal rack; substantially as described.

95. In a calculating machine, the combination with a decimal rack, means for normally holding said rack against movement, stop pins for determining the distance of movement of said rack, means controlled by said stop pins for releasing said rack, a totalizer, a swinging frame in which said totalizer is mounted, means controlled by said swinging frame for releasing said decimal rack, multiplying devices, and means controlled by said multiplying devices for releasing said decimal rack; substantially as described.

96. In a calculating machine, the combination with actuating devices, independently operable totalizers in coöperative relation to said actuating devices, swinging frames in which said totalizers are mounted, and means for independently swinging said frames so as to separately engage the respective totalizers with said actuating devices; substantially as described.

97. In a calculating machine, the combination with actuating devices, of independently swinging frames, a group of totalizer wheels mounted in each frame, an operating shaft, and keys connected to the respective frames for engaging one or the other of said groups of totalizers with said actuating devices before said operating shaft is actuated; substantially as described.

98. In a calculating machine, the combination with actuating devices, of independently swinging frames, a group of totalizer wheels mounted in each frame, an operating shaft, a key connected to one of said swinging frames for engaging the same with the actuating devices before the shaft is operated, and means operated by said shaft for automatically engaging the other of said groups of totalizers with the actuating devices; substantially as described.

99. In a calculating machine, the combination with actuating devices, of a swinging frame, a group of totalizer wheels in said swinging frame, an operating shaft, a key connected to said swinging frame for causing the totalizer wheels to be engaged with the actuating devices before the operating shaft is actuated, and means under control of said operating shaft for releasing said key and permitting said totalizer wheels to become disengaged from said actuating devices; substantially as described.

100. In a calculating machine, the combination with actuating devices, of a swinging frame, a group of totalizer wheels in said swinging frame, an operating shaft, a key connected to said swinging frame for causing the group of totalizer wheels to become engaged with said actuating devices, the key connection to said swinging frame including a shouldered bar, a plate for engaging the shoulder of said bar to hold said key depressed, and a part moved by said operating shaft to lift said plate out of engagement with the shoulder of said bar to release said key; substantially as described.

101. In a calculating machine, the combination with actuating devices, of multiplying devices, a register operated by said actuating devices to add together the tens and units partial products as determined by said multiplying devices to obtain the complete product in the register, and means for recording the complete product, said means, in recording said complete product, also clearing said register; substantially as described.

102. In a calculating machine, the combination with actuating devices, of multiplying devices, a register operated by said actuating devices to add together the tens and units partial products as determined by said multiplying devices to obtain the complete product in the register, means for recording the complete product, said means, in recording said complete product, also clearing said register, and means for preventing the operation of said recording mechanism during the time that the tens and units partial products are being obtained; substantially as described.

103. In a calculating machine, multiplying devices, a power shaft, a register, and means whereby one operation of said power shaft will register a partial product, and the next operation of said power shaft will register the other partial product and add the two partial products together in said register; printing devices operable by said power shaft to make a record of the complete product and means whereby when said power shaft is operated to make a record of the complete product, said product will be cleared from said register, substantially as described.

104. In a calculating machine, the combination with two groups or banks of keys and their connections, multiplying devices, means whereby upon the operation of keys in one group the numbers to be multiplied will be set up in said multiplying devices, means connected with the keys of the other group whereby the numbers set up in said group whereby the numbers may be multiplied, and multiplying devices may be multiplied, and a power shaft for effecting the multiplying operations by obtaining tens and units partial products, a register in which said partial products are added, printing mechanism and means operable from said power shaft for making a record of the complete product, said means simultaneously clearing said register and also clearing the multiplying devices of said multiplicand; substantially as described.

105. In a calculating machine, the combination with a totalizer in which a number may be registered, multiplying devices, and key controlled means whereby the number registered in said totalizer may be set up in said multiplying devices to be multiplied; substantially as described.

106. In a calculating machine, the combination with a totalizer in which a number of items may be introduced and totalized, multiplying devices, and key operated means for introducing the total of said items into said multiplying devices to be multiplied; substantially as described.

107. In a calculating machine, the combination with multiplying devices, of key controlled means for positioning the same, a register operating in conjunction therewith to add together the partial products obtained upon the operation of said multiplying devices, and printing mechanism which is effective to make a record of the complete product, said printing mechanism being ineffective during the multiplying operations of obtaining partial products; substantially as described.

108. In a calculating machine, the combination with a totalizer, actuating devices for said totalizer, key controlled stops for determining the excursions of said actuating devices, multiplying devices, means for connecting said multiplying devices to said actuating devices, whereby a number introduced into the totalizer will also be set up in said multiplying devices; substantially as described.

109. In a calculating machine, the combination with actuating devices, of two groups of totalizers in operative relation thereto, multiplying devices, and keys for connecting said multiplying devices with said actuating devices whereby a number introduced into one of said totalizers will also be set up in said multiplying devices; substantially as described.

110. In a calculating machine, the combination with actuating devices, of key controlled stops for determining the excursions thereof, two groups of totalizers in operative relation thereto, multiplying devices, and means for registering the product obtained from the operation of said multiplying devices in one of said totalizers; substantially as described.

111. In a calculating machine, the combination with two totalizers, of actuating devices therefor, key controlled stops for determining the position thereof, multiplying devices, means for simultaneously registering a number to be multiplied in one of said totalizers and setting up said number in said multiplying devices, and means for registering the product of said number multiplied by itself or another number in the other of said totalizers; substantially as described.

112. In a calculating machine, the combination with two totalizers, of actuating devices therefor, multiplying devices, means for obtaining partial products resulting from the operation of said multiplying devices, and means for connecting said actuating devices with said multiplying devices, whereby said partial products are added together in one of said totalizers; substantially as described.

113. In a calculating machine, the combination with actuating devices, of two totalizers in operative relation thereto, multiplying devices, means for connecting the multiplying devices with said actuating devices, whereby a number introduced into one of said totalizers will be set up in said multiplying devices, and means whereby the tens and units partial products are added together in the other of said totalizers; substantially as described.

114. In a calculating machine, the combination with actuating devices, of two totalizers in operative relation thereto, multiplying devices, a power shaft, key operated means for setting up a number to be multiplied in said multiplying devices and also simultaneously introducing said number into one of said totalizers, and means whereby one operation of said power shaft will register a partial product, and the next operation of said power shaft will register the other partial product, the two partial products being added together in the other totalizer; substantially as described.

115. In a calculating machine, the combination with actuating devices, of two totalizers in operative relation thereto, multiplying devices, means for setting up numbers in said multiplying devices, a power shaft, means for registering the product resulting from the operation of said multiplying devices in one of said totalizers, and means for transferring the product from said totalizer into the other of said totalizers; substantially as described.

116. In a calculating machine, the combination with actuating devices, of two totalizers in operative relation thereto, multiplying devices, two groups of keys, means controlled by said keys for determining the movement of said actuating devices, means for introducing an item into either of said totalizers, and means for setting up an item in the multiplying devices contemporaneously with the introduction of said item into one of said totalizers; substantially as described.

117. In a calculating machine, the combination with two groups of digital keys, one of which controls setting-up devices and the other of which controls the multiplying devices, actuating devices which are positioned by the setting-up devices controlled by one group of keys, multiplying devices, means for connecting said multiplying devices to said actuating devices, and means controlled by the other group of keys for rendering effective certain of said multiplying devices; substantially as described.

118. In a calculating machine, the combination with a group of keys and their connections for positioning setting-up devices, a totalizer, actuating devices for said totalizer, the movement of which actuating devices is controlled by said setting-up devices, multiplying devices, another group of keys and their connections for rendering operative certain of said multiplying devices, and means for connecting said actuating devices with said multiplying devices for setting up a number in the latter to be multiplied; substantially as described.

119. In a calculating machine, the combination with a group of keys through which a multiplicand is introduced into the machine and set up in the multiplying devices, multiplying devices, a group of multiplier keys and their connections for selectively rendering certain of said devices operative, and an error key and its connections for restoring said devices to normal position; substantially as described.

120. In a calculating machine, means for obtaining partial products, a register for adding said partial products together, printing means for making a record of the complete product and a second register in which said product is registered at the time it is recorded; substantially as described.

121. In a calculating machine, the combination with two groups of digital keys and their connections, multiplying devices, means for introducing the multiplicand in said multiplying devices by the operation of the keys in one group, printing mechanism for making a record of said multiplicand, means for introducing the multiplier into said multiplying devices by the successive operations of the keys in the other group, a power shaft for effecting the multiplying operations, and means for rendering said printing mechanism inoperative during the multiplying operations; substantially as described.

122. In a calculating machine, the combination with a totalizer in which a number may be registered, multiplying devices, and key operated means whereby the number registered in said totalizer may be set up in said multiplying devices to be multiplied, and printing means for making a record of the number to be multiplied; substantially as described.

123. In a calculating machine, the combination with a totalizer in which a number of items may be introduced and totalized, printing mechanism for making a record of the separate items, multiplying devices, and key operated means for introducing the total of said items into said multiplying devices to be multiplied, said printing mechanism being rendered effective for making a record of the total to be multiplied; substantially as described.

124. In a calculating machine, the combination with actuating devices, of two groups of totalizers in operative relation thereto, printing type which are positioned by said actuating devices, multiplying devices, key operated means for registering the product obtained from the operation of said multiplying devices in one of said totalizers, and means for causing a printing impression to be made to record the number set up in said multiplying devices; substantially as described.

125. In a calculating machine, the combination with two totalizers, of actuating devices therefor, printing type which are positioned by said actuating devices, multiplying devices, means for simultaneously registering a number to be multiplied in one of said totalizers and setting up said number in said multiplying devices, means for causing a printing impression to be made to record the number set up in said multiplying devices, and means for registering the product of said number multiplied by itself or another number in the other of said totalizers; substantially as described.

126. In a calculating machine, the combination with two totalizers, of actuating devices therefor, printing type which are positioned by said actuating devices, multiplying devices, means for obtaining partial products resulting from the operation of said multiplying devices, means for connecting said actuating devices with said multiplying devices, whereby said partial products are added together in one of said totalizers, and means for causing said type to make a printed record of the complete product, said printing means being inoperative during the time that the partial products are being obtained; substantially as described.

127. In a calculating machine, the combination with two totalizers, racks coöperating therewith, printing type which are positioned by said racks, a power shaft, a group of keys and their connections whereby an item may be introduced into one of said totalizers upon the operation of said power shaft, means connected to the power shaft for causing said printing type to make a record of said item, multiplying devices, means whereby the item introduced into one of said totalizers may also be set up in said multiplying devices, a second group of keys and their connections whereby certain of said multiplying devices may be selected to perform multiplying operations by obtaining tens and units partial products upon the operation of said power shaft, means for rendering said printing type inoperative during the multiplying operations, means whereby the product of said multiplying operations will be registered in the other of said totalizers, means for transferring the product registered in the product totalizer to a third totalizer, and means for causing said printing type to make a record of the transferred product; substantially as described.

128. In a calculating machine, the combination with a laterally movable paper carriage, of printing mechanism, multiplying devices, key operated means for setting up numbers therein to be multiplied and for making a printed record of said numbers, and means for making a printed record of the product; substantially as described.

129. In a calculating machine, the combination with a laterally movable paper carriage, of printing mechanism, multiplying devices, key operated means for setting up numbers therein to be multiplied and for making a printed record of said numbers, a totalizer in which the several products may be registered, means for making a printed record of the individual products, and means for making a printed record of the total products; substantially as described.

130. In a calculating machine, the combination with a laterally movable paper carriage, printing mechanism, multiplying devices, a plurality of totalizers coöperating with said multiplying devices, means whereby the numbers to be multiplied may be successively set up in said multiplying devices and a record made thereof, the items constituting said record appearing in a vertical column, and means whereby the individual products may be registered and printed in vertical column order, added together, and a total thereof printed; substantially as described.

131. In a calculating machine, the combination with a laterally movable paper carriage, of shiftable groups of totalizer wheels whose position is controlled by said carriage, actuating devices for said groups of totalizers, another group of totalizer wheels in operative relation to said actuating devices, multiplying devices, key operated means for setting up a number in said multiplying devices and registering said number in the group of shiftable totalizers in operative relation to said actuating devices, means for multiplying said number and obtaining a complete product thereof, which produce is registered in said second-mentioned group of totalizers, and means for transferring the product so registered into one of the groups of shiftable totalizers and clearing the product-totalizer in readiness for another operation; substantially as described.

132. In a calculating machine, the combination with actuating devices, of two totalizers in operative relation thereto, independent carrying mechanisms for each totalizer, and key controlled means for introducing an item into either of said totalizers, said means rendering the carrying mechanism of the other totalizer inoperative during said item-introducing operation; substantially as described.

133. In a calculating machine, the combination with actuating devices, of two totalizers in common operative relation thereto, carrying mechanism for each totalizer, means for rendering said carrying mechanisms operative when said totalizers are receiving numbers to be registered, and key operated means for rendering said carrying mechanisms inoperative when said totalizers are yielding the numbers registered therein; substantially as described.

134. In a calculating machine, the combination with actuating devices, of two totalizers, carrying mechanism for each totalizer, means for transferring numbers registered in one totalizer to the other totalizer, and key operated means for rendering the carrying mechanism for the yielding totalizer inoperative and the carrying mechanism for the receiving totalizer operative in such transferring operation; substantially as described.

135. In a calculating machine, the combination with a totalizer, of carrying mechanism in operative relation thereto, multiplying devices, means for transferring the numbers registered in said totalizer to said multiplying devices, and means for rendering said carrying mechanism inoperative during such transferring operation; substantially as described.

136. In a calculating machine, the combination with two totalizers, of actuating devices therefor, a carrying mechanism for each totalizer, multiplying devices, means for setting up a number in said multiplying devices, means for registering the partial products resulting from the multiplying operations in one of said totalizers, during which time the carrying mechanism connected therewith is operative, and means for transferring the product from said totalizer to the other totalizer, during which transferring operation the carrying mechanism identified with the product totalizer is rendered inoperative and the carrying mechanism identified with the other or receiving totalizer is rendered operative; substantially as described.

137. In a calculating machine, the combination with multiplying plates, of a totalizer in which partial products resulting from the operations of said multiplying plates are registered, and means for moving said totalizer laterally relative to said multiplying plates; substantially as described.

138. In a calculating machine, the combination with multiplying plates, of a laterally movable totalizer in which partial products are registered and added together, and means operable from said multiplying plates for effecting the lateral movement of said totalizer; substantially as described.

139. In a calculating machine, the combination with multiplying plates, of a totalizer in which partial products resulting from the multiplying operations are registered and added together, and means operable by the multiplying plates in obtaining the units partial product for effecting lateral movement of said totalizer; substantially as described.

140. In a calculating machine, the combination with multiplying plates, of a totalizer, a power shaft for separately obtaining tens and units partial products from said multiplying plates, and means controlled by the multiplying devices identified with the units partial products for moving the totalizer laterally one space so as to properly position said totalizer for the operation of the units multiplying plates; substantially as described.

141. In a calculating machine, the combination with multiplying plates, of a totalizer laterally movable with respect thereto, means for separately registering tens and units partial products in said totalizer, and a ratchet and pawl mechanism operable by said multiplying plates for moving said totalizer laterally step by step; substantially as described.

142. In a calculating machine, multiplying devices comprising complementary plates for the several digits, an actuating device common to all of said plates, and means for primarily engaging said actuating devices with one of said plates and then with its complementary plate; substantially as described.

143. In a calculating machine, the combination with tens multiplying plates and their complementary units multiplying plates, an actuating device common to all of said plates, means for selecting and primarily placing a tens multiplying plate under control of said actuating devices, and means operated by the active tens multiplying plate for placing its complemental units multiplying plate under control of said actuating devices; substantially as described.

144. In a calculating machine, the combination with tens multiplying plates and their complementary units multiplying plates, an actuating device common to all of said plates, pawls on said plates, means for tripping the pawl on a tens plate to place the same in a position to be engaged by said actuating device, whereby, when said tens plate is actuated, it trips the pawl on its complemental units plate, placing said tripped pawl in position to be engaged by the actuating device upon the next succeeding operation thereof, and means for restoring the pawl on the tens plate to normal position, whereby, when the complemental units plate is actuated, said tens plate remains idle; substantially as described.

145. In a calculating machine, the combination with complementary tens and units multiplying plates identified with the several digits, means for successively actuating any two selected complemental plates, and parts which are collectively positioned by said plates; substantially as described.

146. In a calculating machine, the combination with complementary tens and units multiplying plates identified with the several digits, means for successively actuating any two selected complemental plates, arms which extend across the entire series of plates, and are collectively positioned by said plates, and means for guiding said arms in their movements; substantially as described.

147. In a calculating machine, the combination with multiplying plates, parts which are collectively positioned by said plates, stop bars, and adjustable parts on said stop bars which coöperate with said first mentioned parts; substantially as described.

148. In a calculating machine, the combination with multiplying plates, cross arms which extend across the entire series of plates and are collectively lifted thereby, stop bars, parts adjustable on said stop bars for coöperating with said cross arms, racks whose movement is controlled by said stop bars, and register wheels coöperating with said racks; substantially as described.

149. In a calculating machine, the combination with multiplying plates, cross arms which extend across the entire series of plates and are collectively lifted thereby, stepped stop bars, pendants adjustable on said stop bars, means for locking said pendants in position over a selected cross arm, racks, and register wheels; substantially as described.

150. In a calculating machine, the combination with multiplying devices including stop bars, which stop bars are collectively actuated at each operation of said multiplying devices, racks coöperating with said stop bars, said racks being locked against movement, or permitted to move, depending upon the position of its complemental stop bar, and register wheels coöperating with said racks, said register wheels being normally out of engagement with said racks; substantially as described.

151. In a calculating machine, the combination with the multiplying mechanism, controlling devices therefor, means to adjust the controlling devices as required to operate the multiplying mechanism, and means to restore the controlling devices to idle position without operating the multiplying mechanism; substantially as described.

152. In a calculating machine, the combination with multiplying devices, of controlling pawls therefor, means to adjust the controlling pawls, and means to restore the controlling pawls to idle position without operating the multiplying plates to multiply; substantially as described.

153. In a calculating machine, the combination with multiplying devices, of controlling devices therefor, keys operable to adjust the controlling devices, an error key, and means controlled by the error key to restore said controlling devices to idle position; substantially as described.

154. In a calculating machine, the combination with key controlled multiplying devices, of keys, pawls connected to parts of said multiplying devices, means for adjusting said pawls to operating position when the keys are struck, and a manually controlled device operable to restore the pawls to idle position without operating the multiplying parts; substantially as described.

155. In a calculating machine, the combination with key controlled multiplying devices operable to multiply numbers, means for recording the products, and means for adding together a series of products and recording the total thereof; substantially as described.

156. In a calculating machine, the combination with multiplying devices, of wheels operable to receive the product produced by operation of the multiplying devices, means for recording the product, and means for adding a series of products and recording the total thereof; substantially as described.

157. In a calculating machine, the combination with separate key-controlled totalizers, of mechanism comprising movable racks and stops for converting one of the totalizers into a product register, and means for operating the racks to cause the totalizer to add the partial products; substantially as described.

158. In a calculating machine, the combination with multiplying key controlled devices and mechanism for introducing numbers therein, of racks, means for moving them, wheels operable by the racks, means adjustable in connection with the multiplying devices to limit movement of the racks to cause the product of the number in the multiplying devices multiplied by any other number to be introduced into the wheels, and means for printing a complete product and simultaneously clearing the product register; substantially as described.

159. In a calculating machine, totalizing mechanism, multiplying mechanism, devices for articulating the said two mechanisms to produce a product, a separate totalizing mechanism, and means for recording the product, and simultaneously introducing that product into the separate totalizing mechanism; substantially as described.

160. In a calculating machine, movable racks, stops adjustable to limit movement of the racks, multiplying mechanism for articulating the multiplying mechanism with the racks to introduce a number into said multiplying mechanism, totalizing mechanism, and means for operating the multiplying mechanism the racks and the totalizing mechanism together, to produce the product of the number represented in the multiplying mechanism times any other desired number; substantially as described.

161. In a calculating machine, movable racks, stops adjustable to limit movement of the racks, multiplying mechanism, and means for articulating the multiplying mechanism with the racks for introducing a number into the multiplying mechanism; substantially as described.

162. In a machine of the class described, typewriting mechanism having a platen arranged to carry paper, separate devices for printing numbers on said platen, mechanism to add the numbers printed, multiplying devices, means for introducing numbers from the adding mechanism into the multiplying devices, means for operating the multiplying devices to multiply any number represented therein, and means for operating the number-printing devices to record the product on the platen aforesaid; substantially as described.

163. In a calculating machine, two separate totalizing mechanisms, multiplying mechanism, key controlled devices for articulating one totalizing mechanism with the multiplying mechanism to introduce a number from the one to the other, and devices for operating the multiplying mechanism and for articulating the same with the other totalizing mechanism to produce and introduce therein a product; substantially as described.

164. In a calculating machine, key controlled parts adjustable to represent a number to be multiplied, devices to operate said parts and make them effective to register and add together the partial products of the number represented thereby multiplied by any other number, wheels operable to receive and represent the product, and mechanism for recording the product represented in the wheels, in combination with separate mechanism for printing words; substantially as described.

165. In a calculating machine, adding mechanism, multiplying mechanism, key controlled mechanical connection for transferring numbers from the adding mechanism to the multiplying mechanism, means for determining the product of each number so transferred multiplied by another number by operation of the multiplying mechanism, and means for introducing the product into the same adding mechanism or a part thereof designed for receiving and adding the products so produced; substantially as described.

166. In a calculating machine, multiplying mechanism, devices operable to record numbers, means for registering a number, when recorded, in the multiplying mechanism, key controlled means for multiplying such number by another number by operating parts of the multiplying mechanism, adding devices, and means for recording the product so produced and simultaneously introducing that product into the adding devices; substantially as described.

167. In a machine of the class described, typewriting mechanism having a platen arranged to carry paper, adding mechanism, multiplying devices comprising a mechanical representation of the products of the digits multiplied by themselves and by each other, means for operating the multiplying devices effectively to determine and introduce into the adding mechanism the product of any desired number multiplied by another number, and means for recording that product on the platen aforesaid; substantially as described.

168. In a machine of the class described, the combination with typewriting mechanism having a platen arranged to carry paper, of computing and recording mechanism comprising adding mechanism, multiplying devices embodying a mechanical representation of the products of the digits multiplied by themselves and by each other, means for operating the multiplying devices effectively to determine and introduce into the adding mechanism the product of any desired number multiplied by another number, means for recording the products as produced on the platen aforesaid, and means for adding together the products when they are recorded; substantially as described.

169. In a calculating machine, keys, adding mechanism operable to add numbers struck on the keys, multiplying parts, keys separate from the first mentioned keys controlling the multiplying parts, means for operating the multiplying parts to produce products, and printing mechanism operable in connection with the adding mechanism and also operable to record products produced by operation of the multiplying parts; substantially as described.

170. In a calculating machine, a series of pairs of multiplying devices normally inoperative, a key controlling one of each pair of said devices, a lever for moving the key controlled multiplying devices after each operation of their respective keys, and means whereby the other multiplying device of each pair will be rendered operative by the operation of the first device of that pair for the purpose specified.

171. In a calculating machine, an adding mechanism, a series of racks, multiplying devices, a series of members movable effectively to represent a number, means for operating the racks to adjust the said members to represent in the multiplying mechanism any number in the adding mechanism, and means for operating the multiplying devices to multiply any number so represented; substantially as described.

172. In a calculating machine, the combination with an adding mechanism, and key controlled multiplying devices operable mechanically to determine the product of two numbers multiplied together, of recording mechanism operable in connection with the adding mechanism and the multiplying devices as desired; substantially as described.

173. In a calculating machine, an adding mechanism, multiplying mechanism, key controlled means for operating the adding mechanism to cause any number therein to be represented in the multiplying mechanism, mechanical devices operable to produce the product of a number so represented multiplied by another number, and recording devices operable in connection with either the adding mechanism or the multiplying mechanism; substantially as described.

174. In a calculating machine, the combination with adding mechanism having keys, of multiplying mechanism, means for introducing numbers into the multiplying mechanism from the adding mechanism, and means for introducing numbers into the multiplying mechanism direct from the adding mechanism keys; substantially as described.

175. In a calculating machine, a series of pairs of devices, each pair representing the products of a digit multiplied by itself and by the other digits, wheels adapted to add partial products, movable racks for operating the wheels, and means controlled by each pair of devices to limit the movement of the racks to cause the correct partial products to be introduced into the wheels when said devices are operated, and means for printing a complete product and simultaneously clearing the product register; substantially as described.

176. In a calculating machine, the combination of total wheels and racks for operating them, stops to limit movement of the racks, a series of pairs of multiplying devices representing the products of the digits by themselves and by each other, means for operating said multiplying devices to multiply any predetermined number by another number, and means for operating the stops and racks to produce the product in the total wheels; substantially as described.

177. In a calculating machine, two groups of total wheels on separate shafts, a series of racks for operating both of said groups of total wheels, and means for operating both groups of wheels at one time so that the same number will be taken out of one group and introduced into the other group; substantially as described.

178. In a calculating machine, a plurality of groups of total wheels, key controlled means for operating said groups of wheels simultaneously or separately as desired, and means for recording the total in one group and simultaneously introducing that total into another group of total wheels; substantially as described.

179. In a calculating machine, a plurality of groups of total wheels, key controlled means for operating them, and means for dissipating a number from one group of wheels and simultaneously introducing that number into another group of wheels; substantially as described.

180. In a calculating machine, total wheels, racks to operate them, a frame, stops therein adjustable to limit movement of the racks, and a carriage having projections operable to adjust the stops; substantially as described.

181. In a calculating machine, total wheels, racks to operate them, stops to limit movement of the racks, a carriage, parts carried thereby to adjust the stops, means for moving the racks into engagement with the stops, and means for restoring the stops and racks to idle position; substantially as described.

182. In a calculating machine, total wheels, racks to operate them, stops to limit movement of the racks, a carriage, parts carried thereby to adjust the stops, means for recording the numbers added, and means for restoring the racks and stops to idle position; substantially as described.

183. In a machine of the class described, the combination with typewriting mechanism having a platen, of total wheels, a plurality of keys, mechanical means for determining and introducing into said wheels the products of different numbers multiplied together after each number has been struck once on the keys, and means for recording the product on the said platen; substantially as described.

184. In a calculating machine, the combination of wheels to add numbers, key controlled mechanism for receiving and automatically multiplying the total of numbers added by the wheels, means for totalizing a series of different products, and means for recording the products and the totals; substantially as described.

185. In a machine of the class described, the combination with a typewriting mechanism having a platen arranged to carry paper, of an adding mechanism having devices separate from the typewriting mechanism for recording numbers upon the said platen, a key controlled tabulating device adapted to position the platen to receive records of numbers in tabulated form, and means whereby separate totals of the different groups of tabulated numbers may be retained in the machine at one time; substantially as described.

186. In a calculating machine, two separate adding mechanisms having common key controlled actuating devices, multiplying parts, and means for articulating the same with one of the adding mechanisms as required to produce a complete multiplying mechanism; substantially as described.

187. In a machine of the class described, the combination with a typewriting mechanism having a platen arranged to carry paper, of adding mechanism, separate multiplying mechanism, and recording devices separate from the typewriting mechanism, operable in connection with the adding mechanism or the multiplying mechanism as desired to record numbers, totals and products on the said platen; substantially as described.

188. In a calculating machine, a series of racks, total wheels arranged in groups and adjusted to move across said racks and to engage therewith one group at a time, a device for tabulating numbers, and means controlled by the tabulating device for adjusting any group of total wheels to operative position relative to the racks; substantially as described.

189. In a machine of the class described, the combination with typewriting mechanism operable to print any desired words, of devices separate from the typewriter mechanism for recording numbers, and a series of sets of total wheels certain of which are idle while others are operating so that totals or other numbers may be retained therein while the other sets operate; substantially as described.

190. In a calculating machine, a plurality of sets of accumulating wheels on separate shafts, movable racks for operating said wheels, means for holding one set of accumulating wheels in engagement with the racks during movement of said racks in one direction, and automatic means for holding another set of accumulating wheels in engagement with the racks during movement of the latter in the opposite direction; substantially as described.

191. In a calculating machine, parts adjustable to represent numbers, totalizing devices to add the numbers represented by said adjustable parts, multiplying devices containing a mechanical representation of the products of the digits multiplied by themselves and by each other, means for causing the number represented by the said adjustable parts to be represented adjacent to the multiplying devices, mechanism for operating the multiplying devices effectively to multiply the numbers so represented, a platen, and means to record the product thereon in combination with typewriting mechanism operable to print any desired words on said platen; substantially as described.

192. In a calculating machine, multiplying mechanism, totalizing mechanism and recording mechanism, and an operating shaft, the combination therewith of a key operable to articulate the said three mechanisms during operation of the operating shaft; substantially as described.

193. In a calculating machine, the combination with multiplying mechanism having parts adjustable to represent numbers to be multiplied and wheels to receive and add the partial products produced during multiplication, recording mechanism and a handle controlling the multiplying mechanism and the recording mechanism, of a key operable to articulate the said wheels with the recording mechanism, and means controlled by said key to return to idle position those parts of the multiplying mechanism which had been adjusted to represent a number, if any parts had been so adjusted; substantially as described.

194. In a calculating machine, the combination with key controlled parts adjustable to represent numbers, a manually operable device to displace said parts after they have been adjusted to represent a number, and means to restore said parts to idle position after they have been displaced by said device; substantially as described.

195. In a calculating machine, the combination with key controlled parts adjustable to represent numbers, of an operating shaft, a manually operable device to displace said parts after they have been adjusted to represent a number, and means controlled by said manually operable device and operated by the operating shaft to move said parts to idle position after they have been displaced; substantially as described.

196. In a calculating machine, the combination with multiplying mechanism including displaceable multiplying plates operable to multiply numbers one by the other, of recording mechanism, and means for automatically rendering the recording mechanism inoperative during operation of the multiplying mechanism; substantially as described.

197. In a calculating machine, the combination with multiplying mechanism including displaceable multiplying plates operable to multiply numbers, one by the other, of recording mechanism, means for automatically rendering the recording mechanism inoperative during the operation of the multiplying mechanism to multiply, and means for operating the recording mechanism to record the product produced by operation of the multiplying mechanism; substantially as described.

198. In a calculating machine, the combination with multiplying mechanism including displaceable multiplying plates including parts adjustable to represent numbers and wheels to receive products, of recording mechanism, means for automatically rendering the recording mechanism inoperative during operation of the multiplying mechanism, and means for operating the recording mechanism to record the product produced by operation of the multiplying mechanism; substantially as described.

199. In a calculating machine, the combination with multiplying mechanism including displaceable multiplying plates, including devices to represent a multiplicand, including parts adjustable to represent numbers to be multiplied and wheels to receive products, of recording mechanism, means for rendering the recording mechanism inoperative during operation of the multiplying mechanism, means for operating recording mechanism to record the products produced by operation of the multiplying mechanism, and means for restoring to idle position the parts in the multiplying mechanism which had been adjusted to represent the number to be multiplied; substantially as described.

200. In a calculating machine, the combination with wheels to add numbers, key controlled mechanism operable to receive and automatically multiply the total of numbers added by the wheels, and means for recording the numbers, the totals, and the products; substantially as described.

201. In a calculating machine, the combination with the recording mechanism, operating devices therefor, and a group of wheels operable to add numbers when they are recorded, of key controlled means for holding stationary the operating device for the wheel in the lowest order when whole numbers are recorded, and means for causing the same to become operative and move laterally when fractions are recorded, as required to add such fractions to reduce the same to whole numbers; substantially as described.

202. In a calculating machine, the combination with the key controlled mechanism for recording whole numbers, mechanism for adding whole numbers when they are recorded, of laterally movable mechanism operable in connection with the said recording mechanism for recording fractions, and adding mechanism articulating with the said adding mechanism and operable by the fraction recording mechanism to add fractions; substantially as described.

203. In a calculating machine, the combination with key controlled mechanism for recording whole numbers, and mechanism for adding whole numbers when they are recorded, of means for recording fractions, adding mechanism operable by the fraction recording mechanism, and laterally movable means for operating the mechanism for recording and adding whole numbers without operating the mechanisms for adding and recording fractions; substantially as described.

204. In a calculating machine, the combination with adding mechanism comprising a group of wheels, operating devices therefor, carrying mechanism coöperating with said group of wheels, means for holding the wheel of lowest order in said group inoperative during total taking operations whereby only the wheels of higher orders will stand to represent a total, and means for printing items registered in said group of wheels and the totals thereof, excepting the number represented by the wheel of lowest order.

205. In a calculating machine, the combination with adding mechanism comprising a group of laterally movable wheels, key controlled operating devices, and carrying mechanism, of means for holding inoperative the wheel and operating device therefor, in the lowest order whenever whole numbers are being added, and means rendering said wheel and the operating device therefor operative whenever fractions are being added; substantially as described.

206. In a calculating machine, the combination with adding mechanism comprising a group of laterally movable wheels, key controlled operating devices, and carrying mechanism, of means for detaining inoperative or rendering operative, as desired, that part of the adding mechanism which, if operated, would represent a digit in the lowest order; substantially as described.

207. In a calculating machine, the combination with laterally movable adding mechanism and operating mechanism therefor, of key controlled means for holding inoperative that part of the adding mechanism and operating mechanism in the lowest order, or operating the same at will during operation of the remaining parts of said two mechanisms; substantially as described.

208. In a calculating machine, the combination with laterally movable adding mechanism and operating mechanism therefor, of key controlled means for holding inoperative part of the adding mechanism and operating mechanism in the lowest order during addition of any given numbers, and means for causing said part to operate whenever desired; substantially as described.

209. In a calculating machine, the combination with devices for recording numbers and mechanism for adding the numbers as recorded, of mechanism for adding fractions articulating with said first-mentioned adding mechanism, and key controlled means for holding idle the fraction-adding mechanism when desired during operation of the first-mentioned adding mechanism; substantially as described.

210. In a calculating machine, the combination with multiplying devices, of key-controlled parts for rendering the multiplying devices operative, and means for restoring the key-controlled parts to idle position without operating the multiplying devices effectively to multiply; substantially as described.

211. In a calculating machine, type-carriers, adjustable stops to limit the throw of said type-carriers, a carriage, and key-controlled devices therein for pre-arranging the stops to limit throw of the type-carriers; substantially as described.

212. In a calculating machine, type-carriers, adjustable stops to limit the throw of the type-carriers, laterally movable key-actuated devices for setting up the stops, and means for restoring said devices to idle position without moving the stops, as when error is made; substantially as described.

213. In a machine of the class described, the combination with mechanism operable to print any desired words, type-carriers and mechanism for operating them to print numbers, stops for the type-carriers, and laterally movable mechanism for adjusting the stops to limit the throw of the type-carriers; substantially as described.

214. In a calculating machine, the combination of type-carriers, stops therefor, keys, and laterally movable devices intermediate the keys and stops to adjust the corresponding stops when any number has been struck on the keys; substantially as described.

215. In a calculating machine, the combination with type-carriers and hammers automatically released when the type-carriers operate, of multiplying devices and means for holding the hammers when said devices operate; substantially as described.

216. In a calculating machine, the combination with hammers, and pawls holding them, of lever connections controlling the pawls, a cam communicating with the lever, and means for disconnecting the cam therefrom; substantially as described.

217. In a calculating machine, adding wheels and reciprocating racks for operating them, in combination with wheels separate from the said adding wheels operated by the racks, and devices for moving the latter wheels step by step toward the higher orders; substantially as described.

218. In a calculating machine, horizontally movable type-carriers, laterally movable means for controlling said type-carriers, total wheels operated thereby a platen, hammers for driving the type against the platen, levers controlling the hammers, and means for rendering the hammers and levers inoperative while the type-carriers are operating; substantially as described.

219. In a calculating machine, type-carrying parts, laterally movable means for controlling said type-carrying parts, a platen, hammers for driving the type against the platen, a shaft controlling the type-carrying parts and hammers, and means for operating the type-carrying parts without operating the hammers; substantially as described.

220. In a calculating machine, the combination with type and their supporting devices having reciprocating movement, of spring-actuated hammers for striking the type, and means for preventing movement of the hammers during reciprocating movements of the type-supporting mechanism and laterally movable means for controlling said type-supporting devices; substantially as described.

221. In a machine of the class described, the combination with word-printing mechanism employing a platen, of mechanism separate from the word-printing mechanism operable to print numbers on the said platen, and means including a laterally movable key-positioned pin carriage for accumulating separate totals of the numbers as recorded when so required and recording said totals on said platen; substantially as described.

222. In a machine of the class described, the combination with word-printing mechanism having a platen arranged to carry paper, of devices carrying type independent of the word-printing mechanism, means for making a printing impression, and a number of separate totalizers operable by a laterally movable key-positioned pin carriage to produce separate totals of the distinctive items recorded and recording said totals on said platen; substantially as described.

223. In a machine of the class described, the combination with word-printing mechanism employing a platen arranged to carry paper, of devices carrying type independent of the word-printing mechanism, means for printing the numbers by use of the type, means including a laterally movable key-positioned pin carriage for retaining separate totals of the distinctive items recorded and means for recording said separate totals on said platen; substantially as described.

224. In a machine of the class described, the combination with word-printing mechanism employing a platen arranged to carry paper, of devices carrying type independent of the word-printing mechanism, means including a laterally movable key-positioned pin carriage for producing separate totals of the distinctive items recorded, and key controlled multiplying devices; substantially as described.

225. In a machine of the class described, the combination with word-printing mechanism employing a platen arranged to carry paper, of key controlled devices separate from the word-printing mechanism for recording numbers, total wheels operable to add the numbers so recorded, means including a laterally movable key-positioned pin carriage for producing and retaining within the total wheels separate totals of the distinctive items so recorded, and automatic means for producing a grand total in addition to the said separate totals; substantially as described.

226. In a machine of the class described, the combination with word-printing mechanism having a platen arranged to carry paper, of devices carrying type independent of the word-printing mechanism, independent hammers operable to drive the type in the carriers against the platen, and total wheels operable to add the numbers recorded and means for recording said totals on said platen; substantially as described.

227. In a machine of the class described, the combination with word-printing mechanism having a platen, of devices carrying type independent of the word-printing mechanism, actuating and stop devices effective to position the type-carrying devices adjacent to the platen, means for recording items and totals thereof by use of the type after said devices have been so positioned, and separate groups of total wheels operable to produce and retain distinct totals of the different classes of items recorded; substantially as described.

228. In a machine of the class described, the combination with word-printing mechanism having a platen, of separate key controlled devices for printing items and totals thereof on the platen, and means for producing and simultaneously carrying in the machine distinct totals of the different classes of items printed; substantially as described.

229. In a calculating machine, the combination with a series of racks, and means for reciprocating them, of a group of total wheels, means for moving them into mesh with said racks when the latter move in one direction, a separate group of wheels adapted to add numbers, and means for meshing them with said racks when the latter move in the direction opposite from their movement when the first-mentioned wheels were in mesh therewith; substantially as described.

230. In a calculating machine, the combination with movable type-carriers, and hammers, of means for automatically preventing movement of the hammers during successive operations of the type-carriers in multiplying computations only; substantially as described.

231. In a calculating machine, the combination of type-carriers, means for operating them, hammers for driving the type to print, automatic means for preventing the hammers from moving when the type-carriers are operated; substantially as described.

232. In a calculating machine, the combination with wheels constituting a product register, key controlled means for indicating a desired portion of the product, and means for rendering wheels of lower order ineffective so that unnecessary portions of the product may not be indicated; substantially as described.

233. In a calculating machine, the combination with wheels constituting a product register, key controlled means for indicating a desired portion of the product, means for rendering wheels of lower order ineffective so that unnecessary portions of the product may not be indicated, and means for recording the desired product, substantially as described.

234. In a calculating machine, the combination with a product-totalizer, a decimating key, and means controlled by said key for dissipating unnecessary digits therein; substantially as described.

235. In a calculating machine, the combination with a product-totalizer, a decimating key, means controlled by said key for dissipating unnecessary digits therein, and means for recording the desired product; substantially as described.

236. In a calculating machine, the combination with a laterally movable totalizer in which partial products are registered and added together, means for moving said totalizer laterally in one direction in the operation of registering and adding together said partial products, and means for moving said totalizer laterally in the opposite direction for dissipating unnecessary digits therein; substantially as described.

237. In a calculating machine, the combination with multiplying devices, a laterally movable totalizer in which partial products are registered and added together, ratchet and pawl mechanism for moving said totalizer laterally in one direction in the operation of registering and adding together said partial products, and means co-operating with said ratchet and pawl mechanism for moving said totalizer laterally in the opposite direction for dissipating unnecessary digits therein; substantially as described.

238. In a calculating machine, the combination with a product-totalizer, means for dissipating the unnecessary digits therein, and clearing racks for restoring the wheels containing the dissipated digits to zero position; substantially as described.

239. In a calculating machine, the combination with a product-totalizer, type-carrying racks coöperating therewith, means for decimating the product contained in said totalizer, and non-type bearing racks for restoring the wheels containing the decimated numbers; substantially as described.

240. In a calculating machine, the combination with a product-totalizer, multiplying devices, type-carrying racks coöperating therewith, means for decimating the product contained in said totalizer, non-type bearing racks for restoring the wheels containing the decimated numbers, and means actuated by total obtaining devices for rendering said non-type bearing racks operative; substantially as described.

241. In a calculating machine, the combination with multiplying devices including tens and units multiplying plates, a totalizer for registering and adding together the partial products, means for dissipating the unnecessary digits from the desired product, devices for clearing the totalizer wheels of said unnecessary digits in readiness for another multiplying operation, and means operated by total obtaining devices for rendering said last-mentioned means operative; substantially as described.

242. In a machine of the class described, the combination with a totalizer, racks, type positioned by said racks, some of whose printing type are always in printing position, independently operable type-hammers for said type a laterally movable key-positioned pin carriage for controlling said racks a platen for supporting paper, and separate mechanism for printing words adjacent to and in line with said first-mentioned printing type; substantially as described.

243. In a machine of the class described, the combination with laterally shiftable groups of independently operable totalizers, a single set of actuating devices therefor, printing type controlled by a laterally movable key-positioned pin-carriage which are positioned by said actuating devices to print items registered in said totalizer, and the totals of said items, independently operable type hammers for said type, and separate mechanism for printing words adjacent to and in line with said first-mentioned type; substantially as described.

244. In a machine of the class described, the combination with a totalizer, actuating devices therefor in the form of actuating racks controlled by a laterally movable key-positioned pin-carriage, type which are positioned by said actuating devices and which are arranged to print side by side, and separate mechanism for printing words by the side of said first-mentioned printing mechanism; substantially as described.

245. In a machine of the class described, the combination with two totalizers, actuating devices therefor in the form of actuating racks controlled by a laterally movable key-positioned pin-carriage, multiplying devices, type which are positioned by said actuating devices to print side by side the products resulting from the operation of said multiplying devices together with numbers registered in said totalizers, and word-printing mechanism whose type are arranged to print by the side of said first-mentioned type; substantially as described.

246. In a calculating machine, the combination with multiplying devices, of keys for setting up numbers in the calculating machine, means under the control of the operator for collectively introducing said numbers into said multiplying devices, means under control of the operator for introducing said numbers in some other part of said calculating machine, and a power shaft for effecting the transfer of said numbers; substantially as described.

247. In a calculating machine, the combination with key controlled multiplying devices, a totalizer in which the product resulting from the operation of said multiplying devices is registered, means for making a printed record of said product, and means for retaining said product in said totalizer and adding other numbers thereto; substantially as described.

248. In a calculating machine, the combination with a laterally movable paper carriage, tabulating keys for positioning said carriage, a product-totalizer, means for making a printed record of the products contained in said totalizer in a desired column, and other totalizers coöperating with said printing devices whereby printed records may be made of numbers registered therein in other columns; substantially as described.

249. In a calculating machine, the combination with a laterally movable paper carriage, printing mechanism, a laterally movable key-positioned pin-carriage for controlling said printing mechanism, means for positioning said carriage whereby said printing mechanism will make printing impressions in different columns, a product-totalizer coöperating with said printing mechanism whereby products may be printed in one of said columns, and after said carriage has been positioned other numbers may be printed in different columns by said printing mechanism; substantially as described.

250. In a calculating machine, the combination with a laterally movable carriage, of a product-totalizer, means for moving the product-totalizer laterally in the operations of multiplying, and means controlled by said laterally movable carriage for restoring said product-totalizer to normal position; substantially as described.

251. In a calculating machine, the combination with a laterally movable paper carriage, a product-totalizer, a ratchet and pawl mechanism for stepping said totalizer laterally in the operations of multiplying, yielding means tending to draw said totalizer to normal position, and means operable from said laterally movable paper carriage for releasing said ratchet and pawl mechanism and rendering effective the said yielding means to restore said product-totalizer to normal position; substantially as described.

252. In a calculating machine, the combination with a laterally shiftable paper carriage, means for shifting the carriage laterally for column printing, means for line spacing the paper in the different positions of the carriage, independently operable totalizers shiftable by the movement of said carriage, a single set of actuating devices therefor, a single set of carrying devices for all of said totalizers, and means whereby separate totals may be retained in the machine; substantially as described.

253. In a calculating machine, the combination with a laterally shiftable paper carriage, means for shifting the carriage laterally for column printing, means for line spacing the paper in the different positions of the carriage, a series of actuating devices, total wheels arranged in groups and adapted to move across said series of actuating devices, and to engage therewith one group at a time, and means for moving any group of total wheels in operative position relative to said series of actuating devices; substantially as described.

254. In an adding machine, the combination with printing type, of actuating devices controlling them, a power shaft for moving said actuating devices, duplicate totalizers mounted for alternate engagement with said actuating devices, a longitudinally movable shaft on which the totalizers are mounted, and means for moving said shaft longitudinally to engage one totalizer or the other with said actuating devices; substantially as described.

255. The combination of a set of adding devices, stops for said devices to stop them and their operating means, when moving in the direction reverse to that of adding, as soon as such adding devices arrive at their zero position, operating means adapted to move said set of adding devices in said reverse direction, a second set of adding devices adapted to be so connected to said operating means that the movement of the first set of adding devices against their stops will be transmitted to the second set, whereby the total represented by the first set of adding devices may be added upon the second set; substantially as described.

256. The combination of a set of adding devices, stops for said devices to stop them and their operating means, when moving in the direction reverse to that of adding, as soon as such adding devices arrive at their zero position, operating means adapted to have a reciprocating movement and to be connected at the initial part of said movement with the set of adding devices to move them in said reverse direction, a second set of adding devices adapted to be connected with the said operating means on the return part of their movement, whereby the total represented by the first set of adding devices may be added upon the second set; substantially as described.

257. The combination of two sets of adding devices, stops for one set of such devices to stop them and the operating means when the adding devices reach their zero position, operating means adapted to be connected with both of said sets to transfer to one set the total standing upon the other set; substantially as described.

258. The combination of two sets of adding devices, stops for one set of said devices to stop them and their operating connections, when moving in the direction reverse to that of adding, on reaching their zero position, and operating means adapted to be connected with both of said sets to add upon one set the total standing upon the other; substantially as described.

259. In a machine for listing items in horizontal lines and printing the line-totals at the ends of the lines, and the grand total of all the line-totals, comprising printing devices for listing the items, the line-totals and the grand total, a set of line-item accumulator pinions, a set of line-total accumulator pinions, means for causing the items as listed to be accumulated in said set of item accumulator pinions, and means for causing the return of the said set of item accumulator pinions to zero position to set up type to print the line total accumulated therein and transfer such line-total to the line-total set of accumulator pinions to obtain a grand total; substantially as described.

260. A machine for listing items in vertical columns and printing the totals at the feet of said columns, and the grand total, comprising printing devices for listing items in the several columns, a plurality of item accumulator pinions corresponding to the several vertical columns of items to be listed, means for causing the items as listed to be accumulated upon the sets of item accumulator pinions, a set of column-total accumulator pinions, and means for causing the return of the item sets of accumulator pinions to zero position to transfer the total or column footing to the column-total set of accumulator pinions to obtain a grand total; substantially as described.

261. A machine for listing items in a plurality of columns side by side and printing the total of each column at the foot thereof, comprising printing devices for listing the items in the several columns, a paper carriage for supporting a sheet of paper and moving it transversely of the machine to bring successive vertical columns thereof opposite the printing type, a plurality of sets of accumulator pinions controlled by said paper carriage, one set for each of the several columns of items to be listed, means for accumulating upon each set of pinions the items of the corresponding columns as said items are listed, and means for causing the return of any set of pinions to zero position to set up the type and print the total of the corresponding column of items at the foot thereof.

262. A machine for listing items in a plurality of columns side by side and printing the total of each column at the foot thereof and also a grand total of all of the items in all of the columns comprising printing devices for listing the items in the several columns, a plurality of sets of accumulator pinions, one set for each of the several columns of items to be listed, means for accumulating upon each set of pinions the items of the corresponding column as they are listed, another set of accumulator pinions with means for accumulating upon them the aggregate total of all of the items in all of the columns, means for causing the return of any of the first mentioned sets of accumulator pinions to zero position to set up the type to print the total of the corresponding column of items at the foot thereof, and means for causing the return of the other set of pinions to zero position to set up the type to print a grand total of all of the items in all of the columns.

263. A machine for listing items in horizontal lines across a sheet of paper and printing the total of the items in each line at the end thereof and for printing a grand total of the line-totals at the end of operations, comprising printing devices for listing the items, a set of accumulator pinions with means for accumulating upon them the items in each horizontal line as listed, a second set of accumulator pinions, means for causing the return of the first mentioned set of pinions to zero position at the end of each line of items to set up the type to print the total of said line and to transfer said total to the second set of accumulator pinions, whereby the totals of successive horizontal lines of items may be accumulated upon said second set of pinions, and means for causing the return of said second set of pinions to zero position at the end of operations to set up the type for printing a total of all of the line-totals accumulated upon said pinions.

264. A machine for listing items in several successive series and printing the total of each series at the end thereof and a grand total of all of the items at the end of all of the series, comprising printing devices for listing the individual items, a set of accumulator pinions and means for accumulating upon said pinions the individual items of each series listed, a second set of accumulator pinions, means for causing the return of the first mentioned set of pinions to zero position at the end of any series of items to set up the type to print the total of such series of items and to transfer such total to the second set of pinions, and means for causing the subsequent return of the said second set of pinions to zero position to set up the type to print the grand total of all the series-totals accumulated upon said second set of pinions.

265. In an adding and listing machine, the combination, with key controlled means for listing a series of items and accumulating the total thereof, and means for printing such total at the end of the series and clearing the machine, of a supplemental accumulator, means for transferring to said supplemental accumulator the totals of the several series of items as said totals are printed at the ends of the respective series, so as to thereby accumulate upon said supplemental accumulator a grand total of all of the items in the several series, and means for printing such grand total from said supplemental accumulator.

266. In an adding and listing machine, the combination, with means for listing a series of items and an accumulator for accumulating the total thereof said listing means being under the control of a laterally movable key-positioned pin-carriage, and a total key and connections by depressing which key and operating the machine the total of the series of items may be printed, of a supplemental accumulator for accumulating in one grand total the amount of the items in several successive series of items, and a supplemental total key and connections by depressing which key and operating the machine a grand total may be printed from said supplemental accumulator.

267. In an adding and listing machine, the combination, with means for listing a series of items and an accumulator for accumulating the total thereof, and a total key and connections by depressing which key and operating the machine the total of the series of items may be printed and the accumulator cleared or reset to zero, of a supplemental accumulator for accumulating in one grand total the amount of all of the items in several successive series of items, and a supplemental total key and connections by depressing which key and operating the machine a grand total may be printed from said supplemental accumulator and the accumulator be cleared.

268. In an adding and listing machine, the combination, with means for listing a series of items and an accumulator for accumulating the total thereof, and a total key and connections by depressing which key and operating the machine the total of the series of items may be printed, of a supplemental accumulator means for transferring to said accumulator the totals of several series of items as said totals are successively printed at the ends of the respective series of items, so as to thereby accumulate upon said supplemental accumulator a grand total of all of the items in the several series, and a supplemental total key and connections by depressing which key and operating the machine such grand total may be printed through said supplemental accumulator.

269. In an adding and listing machine, the combination, with means for listing a series of items, an accumulator for accumulating the total thereof, and a total key and connections by depressing which key and operating the machine the total of the series of items may be printed and the accumulator cleared or reset to zero, of a supplemental accumulator, means for transferring to said accumulator the totals of several series of items as said totals are successively printed at the ends of the respective series, so as to thereby accumulate upon said supplemental accumulator a grand total of all of the items in the several series, and a supplemental total key and connections by depressing which key and operating the machine said grand total may be printed from said supplemental accumulator and the accumulator cleared.

270. In an adding and listing machine, the combination of printing type, accumulator pinions, actuators for the latter which also serve to set up the type, key controlled means for determining the extent of movement of the actuators, means for controlling the engagement between the actuators and accumulator pinions so as to accumulate the items upon said pinions as they are set up for printing and so as to cause the actuators to return the accumulators to zero position and set up the total to be printed when desired, an auxiliary or supplemental set of accumulator pinions, means for causing the total amount of all of the items to be accumulated upon said supplemental pinions, and means for causing the actuators to return said supplemental pinions to zero position and set up a grand total to be printed when desired.

271. In an adding and listing machine, the combination of printing type, accumulator pinions, actuators for the latter which also serve to set up the type, means for determining the extent of movement of the actuators, means for controlling the engagement of the actuators and pinions so as to cause the items to be accumulated upon the pinions as they are listed and so as to cause the actuators to return the accumulator pinions to zero position and set up the total to be printed when desired, an auxiliary or supplemental set of accumulator pinions, and means for controlling the coöperative relationship between the two sets of pinions, whereby when the first mentioned set is returned to zero position its accumulation may be transferred to and preserved upon the second set and whereby the latter is subsequently returned to zero position and a grand total printed therefrom.

272. In an adding and listing machine, the combination of printing type, the accumulator pinions, the reciprocating racks for operating the pinions and setting up the type, means for determining the extent of movement of the racks, means for controlling the engagement of the pinions and racks so as to cause them to accumulate items one by one upon the pinions as the items are listed and to return the pinions to zero at the end of a series of items and set up the type to print the total of such series, an auxiliary or supplemental set of accumulator pinions, and means whereby the total amount of several successive series of items may be accumulated and preserved upon said supplemental pinions and said pinions be returned to zero and said total printed therefrom when desired.

273. In an adding and listing machine, the combination of type, reciprocating racks, means for determining the extent of movement of the racks, two sets of accumulator pinions operated by said racks, and means for controlling the coöperative relationship of the two sets of accumulator pinions with the racks, whereby a series of items may be listed and accumulated upon one set of pinions and the racks be then caused to return said pinions to zero position and set up the total of the series of items printed, whereby the total amount of several successive series of items may be accumulated and preserved upon the other set of accumulator pinions and said pinions be returned to zero position and the type set up to print said total.

274. In an adding and listing machine, the combination of the printing type, the reciprocating racks, means for determining the extent of movement of the racks, two sets of accumulator pinions, means for controlling the coöperative relationship of the two sets of pinions with the racks so as to cause the items listed to be accumulated upon one or both sets of pinions, means for causing the racks to return one set of pinions to zero position and set up the total to be printed, without affecting the other set of pinions, and means for causing the racks to return the latter set of pinions to zero position and set up their total to be printed when desired, whereby the several successive series of items may be listed and the total of each series be printed at the foot thereof, and whereby a grand total of the items in all the series may be accumulated and preserved and to be printed at the end of the several series of items.

275. In an adding machine, the combination of a series of main levers, two sets of racks carried thereby, an accumulator coöperating with one set of racks, means for normally locking said racks, a plurality of accumulators coöperating with the other set of racks, mechanism arranged to rock the last mentioned accumulators into and out of coöperative relation with the last mentioned racks, means for controlling said mechanism, and means for releasing said locking means to enable a total to be transferred from any one of the plurality of accumulators to the first mentioned accumulators.

276. In an adding machine, the combination of a series of main levers, two sets of racks carried thereby, an accumulator coöperating with one set of racks, means for normally locking said racks, a plurality of accumulators coöperating with the other set of racks, mechanism arranged to rock the last mentioned accumulators into and out of coöperative relation with the last-mentioned racks, key-actuated means for controlling said mechanism, and means for releasing said locking means to enable a total to be transferred from any one of the plurality of accumulators to the first mentioned accumulators.

277. In an adding machine, the combination with the adding and printing mechanisms thereof and with its longitudinally movable paper carriage, of a platen mounted in the carriage and with which the printing mechanism coöperates, and a series of accumulators under the control of said paper carriage and arranged to be operated through connection with the actuator instrumentalities of said usual adding mechanism, for separate accumulations.

278. In an adding machine, the combination with the usual adding mechanism thereof and its actuating instrumentalities, of an independent accumulator arranged to be rocked in and out of operative relationship with the actuator instrumentalities of said usual adding mechanism, means for rocking the accumulator, and means for reversing the order of the rocking movements thereof when a total is transferred from the accumulator to the usual adding mechanism of the machine.

279. In an adding machine, the combination with the usual adding mechanism thereof and its actuating instrumentalities, of an independent accumulator arranged to be rocked in and out of operative relationship with the actuator instrumentalities of said usual adding mechanism, means for rocking the accumulator, and means under the control of the operator for reversing the order of the rocking movements thereof when a total is transferred from the accumulator to the usual adding mechanism of the machine.

280. In an adding machine, the combination with the usual adding mechanism thereof and its actuating instrumentalities, of an independent accumulator arranged to be rocked in and out of operative relationship with the actuator instrumentalities of said usual adding mechanism, means for rocking the accumulator, and key-controlled means for reversing the order of the rocking movements thereof when a total is transferred from the accumulator to the usual adding mechanism of the machine.

281. In an adding machine, the combination with the usual adding mechanism thereof and its actuating instrumentalities, of a series of independent accumulators arranged to be operated through connection with the actuator instrumentalities of the usual adding mechanism, a rocking frame in which said accumulators are mounted, means for rocking said frame, and means under control of the operator for reversing the order of the rocking movements thereof when a total is transferred from any accumulator to the usual adding mechanism of the machine.

282. In an adding machine, the combination with the usual adding mechanism thereof and its actuating instrumentalities, of a series of independent accumulators arranged to be operated through connection with the actuator instrumentalities of said usual adding mechanism, a rocking frame in which said accumulators are mounted, said frame being held in one direction with a yielding pressure to present its accumulators, one at a time to the machine, an operating arm, and means for moving said frame against its yielding pressure.

283. In an adding machine, the combination with the usual adding mechanism thereof and its actuating instrumentalities, of a series of independent accumulators arranged to be operated through connection with the actuator instrumentalities of said usual adding mechanism, a rocking frame in which said accumulators are mounted, said frame being held in one direction with a yielding pressure to present its accumulators one at a time to said actuator instrumentalities, and an operating arm adapted to move said frame against said yielding pressure.

284. In an adding machine, the combination with the usual adding mechanism thereof, and its actuating instrumentalities, of a series of independent accumulators arranged to be operated through connection with the actuator instrumentalities of said usual adding mechanism, a rocking frame in which the said accumulators are mounted, said frame being held in one direction with a yielding pressure to present its accumulators, one at a time, to the actuators, an arm for operating said frame, and a key-controlled device for rendering said arm operative or inoperative.

285. In an adding machine, the combination with the usual adding mechanism thereof and its actuating instrumentalities, of a series of independent accumulators arranged to be operated through connection with the actuator instrumentalities of said usual adding mechanism, a rocking frame in which said accumulators are mounted, said frame being held in one direction with a yielding pressure to present its accumulators, one at a time to its actuators, an arm for operating said frame, an actuating device operatively connected with the arm, and a pivoted arm arranged to reciprocate said device and thereby operate said arm.

286. In an adding machine, the combination with the usual adding mechanism thereof and its actuating instrumentalities, of a series of independent accumulators arranged to be operated through connection with the actuator instrumentalities of said usual adding mechanism, a rocking frame in which the said accumulators are mounted, said frame being held in one direction with a yielding pressure to present its accumulators, one at a time, to the actuators, an arm for operating said frame, an actuating arm operatively connected to said arm, and having a pin or stud, and a pivoted arm having a recess arranged to coöperate with said pin or stud and thereby reciprocate said actuating arm.

287. In an adding machine, the combination with the usual adding mechanism thereof and its actuating instrumentalities, of a series of independent accumulators arranged to be operated through connection with the actuator instrumentalities of said usual adding mechanism, a rocking frame in which the said accumulators are mounted, said frame being held in one direction with a yielding pressure to present its accumulators, one at a time, to the actuators, an arm for operating said frame, an actuating arm operatively connected to said arm and having a pin or stud, and a spring-pressed pivoted arm having a recess arranged to coöperate with said pin or stud and thereby reciprocate said actuating arm.

288. In an adding machine, the combination with the adding mechanism thereof and its actuating instrumentalities, including the usual accumulator, of a series of independent accumulators arranged to coöperate with the actuator instrumentalities of said usual accumulator, one at a time, to accumulate a part of the items of which the said usual accumulator accumulates the grand total, and key controlled means for transferring the accumulation of any one or more of such series of accumulators to said usual accumulator.

289. In an adding machine, the combination of a series of movable bars bearing type at one end, a set of racks at each end of the bars, a plurality of accumulators arranged to coöperate, one at a time, with the set of racks at the type-end of the bars, and a single accumulator arranged to coöperate with the other set of racks.

290. In an adding machine, the combination of a series of movable bars, a set of racks carried at one end of said bars, an accumulator in constant coöperation with said racks, a second set of said racks at the other end of said bars, a longitudinally movable shaft, and a series of independently operating accumulators strung on said shaft side by side and arranged to be placed, one at a time, into coöperative relation with said second set of racks.

291. In a calculating machine, means for printing items, separate totals of certain of said items, and a grand total of all the items, separate totalizers for contemporaneously registering the items constituting the separate totals, and the grand total, and means under control of the operator in form of keys for printing separate totals or a grand total as desired.

292. In a calculating machine, the combination with means for printing the items, separate totals of certain of said items and a grand total of all of the items, separate totalizers for registering the items constituting the separate totals, and the grand totalizer, and key controlled means whereby when the separate totalizers are yielding their totals and being re-set to zero the number registered therein will be introduced into the grand totalizer.

293. In a calculating machine, the combination with a plurality of independent totalizers, of key controlled means for registering numbers thereon, and means operated at will for transferring totals from a number of said totalizers to a single one of the same; substantially as described.

294. In a calculating machine, the combination with a plurality of independent totalizers, means for totalizing numbers thereon, and key controlled means for transferring the total from either of said totalizers to the other totalizer; substantially as described.

295. In a machine of the class described, comprising adding mechanism and printing mechanism, the latter, comprising separate type, separate means whereby they are individually propelled to record their respective figures, separate holding means for the propelling means, and releasing means to permit each propelling means to operate, the combination therewith of means adapted to automatically suspend temporarily the function of the releasing means during multiplying operations.

296. In a machine of the class described, comprising adding and printing mechanism, the latter comprising separate type, separate means whereby they are individually propelled to record their respective figures, separate holding means for the propelling means, and releasing means to permit each propelling means to operate, the combination therewith of means adapted to suspend temporarily the function of the releasing means.

297. In a machine of the class described, comprising a printing mechanism provided with type-bars and movable type, means for positioning the type bars, means by which each type is individually propelled to record its respective number, separate holding means for the propelling means and releasing means to permit each propelling means to operate, the combination therewith of means adapted to prevent the operation of the releasing means and thus prevent the propelling means from actuating the type, and a manually depressible key for actuating said preventing means.

298. In a machine of the class described, comprising adding and printing mechanism and means for actuating them, the printing mechanism being provided with type bars, hammers adapted to strike the type when released, the combination therewith of hooks for holding the hammers inactive until released, means adapted normally to release said hooks automatically when the accumulating mechanism of the machine is operated, means for preventing said release consisting of a manually operated key, and means for restoring said key to its initial position after its operation.

299. In a machine of the class described, comprising adding and printing mechanism and means for actuating them, the printing mechanism being provided with type bars, hammers adapted to strike the type when released, the combination therewith of hooks for holding the hammers inactive until released, means adapted normally to release said hooks automatically when the accumulating mechanism of the machine is operated, and means adapted to hold said releasing means inactive comprising a key adapted to be manually depressed and automatically raised after such depression.

300. In an adding machine, the combination, with the adding racks and their operating and controlling devices, of two sets of adding wheels associated in pairs with the same rack, means for normally transmitting the movement of the racks in one direction to one set of wheels only, and means operable at will to cause the racks automatically to first transmit their reverse movement to said set of wheels and then their opposite movement to the other set of wheels.

301. In an adding machine, the combination, with the adding racks and their operating and controlling devices, of two sets of adding wheels associated in pairs with the same rack, means for causing the racks to transmit their movement in one direction to either set of wheels at will, and means operable at will to cause the racks automatically to first transmit their reverse movement to such moved set of wheels and then their opposite movement to the other set of wheels.

302. In an adding machine, the combination, with the adding racks and their operating and controlling devices, of two sets of adding wheels associated in pairs with the same rack, means for causing the racks to normally transmit their movement in one direction to one set of said wheels, means operable at will to cause the racks automatically to first transmit their reverse movement to said set of wheels and then their opposite movement to the other set of wheels, and means for subsequently causing the racks to transmit their reverse movement to the last mentioned set of wheels.

303. In an adding and listing machine, the combination, with the adding racks and printing type and their operating and controlling devices, of two sets of adding wheels associated in pairs with the same rack, means for normally transmitting the movement of the racks in one direction to one set of wheels and listing the corresponding items, and means operable at will to cause the racks automatically first to return said wheels to zero position and print the total accumulated upon them, and then to correspondingly advance the other set of wheels for the purpose of preserving such total upon the latter set of wheels.

304. In an adding machine, the combination, with the adding racks and printing type and their operating and controlling devices, of two sets of adding wheels associated in pairs with the same rack, means for normally transmitting the movement of the racks in one direction to one set of wheels, means operable at will for causing the racks automatically to first return said set of wheels to zero position and print the total accumulated upon them, and then to correspondingly advance the other set of wheels, and means for subsequently returning the last-mentioned set of wheels to zero position independently of the other set and printing the total accumulated upon them.

305. In an adding machine, the combination, with the adding racks and their operating and controlling devices, of two sets of adding wheels associated in pairs with the same rack, means for normally transmitting the movement of the racks in one direction to one set of wheels, and a sub-total key and connections operable to cause the racks to transmit their reverse movement to said set of wheels and their opposite movement to the other set of wheels.

306. In an adding machine, the combination, with the adding racks and their operating and controlling devices, of two sets of adding wheels associated in pairs with the respective racks, means for normally transmitting the movement of the racks in one direction to one set of wheels, a sub-total key and connections operable to cause the racks to transmit their reverse movement to said set of wheels, and a total key and connections for causing the racks to transmit their reverse movement only to the latter set of wheels.

307. In a calculating machine, the combination with a computing mechanism, of a recording mechanism, and means for automatically rendering the recording mechanism inoperative during certain operations of the computing mechanism.

308. In a calculating machine, the combination with computing mechanism, of printing mechanism controlled by said computing mechanism for recording the computations thereof, and means for automatically rendering said printing mechanism inoperative during certain computations of the machine.

309. In a machine of the class described, comprising a printing mechanism, an adding mechanism and a non-printing key provided with a stem by the actuation of which printing may be prevented, a member moved by the stem, and a stop therefor, for automatically preventing the actuation of the preventing means when the printing mechanism has been partly operated.

310. In a machine of the class described, comprising a printing mechanism, an adding mechanism and a non-printing key provided with a stem by the actuation of which printing may be prevented, a member moved by the stem, and a stop therefor, for automatically preventing the actuation of the non-printing key after the adding mechanism has been partly operated.

311. In a machine of the class described, comprising a printing mechanism, an adding mechanism and a non-printing key provided with a stem by the actuation of which printing may be prevented, a member moved by the stem, and a stop therefor, for automatically preventing the actuation of the non-printing key after the printing operation has been commenced.

312. In a machine of the class described, provided with a printing mechanism comprising type hammers, detents normally holding the same out of action, a release bar adapted when moved to actuate the detents and a non-printing key adapted to prevent the movement of the release bar, means adapted to lock the non-printing key against movement after the release bar has commenced to move.

313. In a registering mechanism, the combination with a plurality of totalizers, each comprising a series of denominational elements, all mounted in lateral alinement, of differential movable totalizer operating elements also mounted in lateral alinement and equaling said totalizer elements in number, connections permitting sliding collective relative lateral movement between said totalizers and their operating elements, to provide an operative alinement of any one of said totalizers with their said operating elements, keys for determining the extent of differential movement of said operating elements, and type-carrying devices operatively connected to said operating elements.

314. In an adding and listing machine, the combination, with means for listing a series of items and accumulating the total thereof, and means for printing such total at the end of the series and clearing the machine, of a supplemental accumulator, means for transferring to said supplemental accumulator the totals of the several series of items as said totals are printed at the ends of the respective series, so as to thereby accumulate upon said supplemental accumulator a grand total of all of the items in the several series, said means being set for such purpose prior to the operation which prints the transferred total, and means for printing such grand total from said supplemental accumulator.

315. In an adding and listing machine, the combination, with means for listing a series of items and an accumulator for accumulating the total thereof, and a total key and connections by depressing which key and operating the machine the total of the series of items may be printed, of a supplemental accumulator, means for transferring to said accumulator the totals of several series of items as said totals are successively printed at the ends of the respective series of items, so as to thereby accumulate upon said supplemental accumulator a grand total of all of the items in the several series, said means being set for such purpose prior to the operation which prints the transferred total, and a supplemental total key and connections by depressing which key and operating the machine each grand total may be printed from said supplemental accumulator.

316. In an adding and listing machine, the combination of printing type, accumulator pinions, actuators for the latter which also serve to set up the type, means for determining the extent of movement of the actuators, means for controlling the engagement of the actuators and pinions so as to cause the items to be accumulated upon the pinions as they are listed and so as to cause the actuators to return the accumulator pinions to zero position and set up the total to be printed when desired, an auxiliary or supplemental set of accumulator pinions, and means for controlling the coöperative relationship between the two sets of pinions, whereby when the first mentioned set is returned to zero position its accumulation may be transferred to and preserved upon the second set and whereby the latter is subsequently returned to zero position and a grand total printed therefrom, both of said controlling means being set for the purposes recited prior to the operation of printing totals.

317. In a calculating machine, the combination, with toothed actuators, means for controlling the amount of movement, of said actuators, two independently operable groups of totalizer wheels in operative relation to said actuators, means for introducing items into one or both totalizers, said means being under control of the operator, means for transferring numbers from one totalizer to the other, and means for printing the transferred number, the transferring means being set prior to movement of the toothed actuators.

318. In an adding machine, the combination with the usual adding and printing mechanism thereof and with its longitudinally movable paper carriage, of a platen mounted in the carriage and with which the printing mechanism coöperates, and a series of accumulators under the control of said paper carriage in both directions of movement of the latter and arranged to be operated through connection with the actuator instrumentalities of said usual adding mechanism, for separate accumulations.

319. In a calculating machine, the combination with two or more registering devices, of key controlled means for accumulating a series of items in one of said devices, and means for transferring a total of said items so accumulated into another of said registering devices.

320. In a calculating machine, the combination of two or more sets of register wheels, of key controlled means for accumulating a series of items in one of said sets of wheels independently of any operation of any other set, and means for transferring the total, so accumulated, to another set of wheels.

321. In a calculating machine, the combination of a key-board for controlling a set of actuators, a set of key controlled actuators, a plurality of sets of register wheels in coöperative relation to said actuators, there being denominational control of said register wheels by said actuators whereby one set of register wheels may be placed in control of another independently of the key-board.

322. The combination of a plurality of sets of adding devices, stops for each set to stop them on reaching their zero position, when moving in the direction reverse to that of adding, but permitting free movement in the adding direction, operating means, adapted to be connected with any set of adding devices to move them either in their adding direction or against their stops, and a set of number-indicating devices controlling the extent of movement of said operating means for adding purposes, whereby any number represented by any number-indicating devices operated may be added upon any set of adding devices or the total standing upon any set of adding devices may be added to the total standing upon another set of the adding devices or be subtracted therefrom.

323. The combination of a plurality of sets of adding devices upon each of which any desired amounts may be successively added, and key operated means adapted to be connected with two of said sets to add upon one of said sets the total standing upon the other, whereby the total or totals standing upon one or more of said sets may be added upon another of said sets.

324. The combination of two sets of adding devices, means for adding upon said sets, stops for one set of such devices to stop them and the operating means on reaching their zero position, when moving in the direction reverse to that of adding, and operating means adapted to be connected with both sets to add upon one set the total standing upon the other.

325. The combination of two sets of adding devices, stops for one set of such devices to stop them and the operating means on reaching the zero position, when moving in the direction reverse to that of adding, operating means having a prescribed reciprocating movement and adapted to be connected to said set of adding devices to move them against their stops and be thereby limited in its initial movement and also adapted to be connected with the other set of adding devices on its return movement to transmit to the latter set of adding devices a movement in their adding direction equal to that imparted to the first set to bring them against their stops, whereby the total standing upon the said first set will be added to the second set.

326. The combination of a set of adding devices, stops for such devices to stop them and their operating means on reaching their zero position, when moved in the direction reverse to that of adding, operating means adapted to move said set of adding devices in said reverse direction, a second set of adding devices adapted to be connected to said operating means after the latter has moved the first set against said stops, and adapted to be moved in the adding direction by said operating means, whereby the total represented by the first set of adding devices may be added upon the second set.

327. The combination of a set of adding devices, stops for said adding devices to stop them and their operating means on reaching their zero position, when moved in the direction reverse to that of adding, operating means adapted to be connected with said set of adding devices to move them in either one of two directions, in one direction for adding purposes, in the other direction to move them against said stops, a set of number-indicating devices controlling the extent of movement of said operating means for adding purposes, a second set of adding devices adapted to be connected with said operating means after the latter has moved in the adding direction by said operating means, whereby the total represented by the first set of adding devices may be added upon the second set.

328. The combination of a set of adding devices, stops for said adding devices to stop them and their operating means on reaching their zero position, when moving in the direction reverse to that of adding, operating means adapted to be connected with said set of adding devices to move them in either one of two directions, in one direction for adding purposes, in the other direction to move them against said stops, a second set of adding devices, operating means, adapted to be connected with either one of said sets to move it in one direction for adding purposes or with both of said sets to move the first set in the reverse direction to that of adding until said stops are reached, and to move the second set in the adding direction to add the total on the first set to the total on the second set, and a set of number-indicating devices controlling the extent of movement of said operating means for adding purposes.

329. The combination of a set of adding devices, stops for such devices to stop them and their operating means, on reaching their zero position, when moving in the direction reverse to that of adding, but permitting them free movement in the adding direction, operating means adapted to move said set of adding devices in the direction reverse to that of adding, a second set of adding devices adapted to be connected to said operating means after the latter has moved the first set against said stops, and adapted to be moved in the adding direction by said operating means, whereby the total represented by the first set of adding devices may be added upon the second set.

330. The combination of a plurality of sets of adding devices, stops for each set to stop them, on reaching their zero position, when moving in the direction reverse to that of adding but permitting free movement in the adding direction, operating means adapted to be connected with any set or sets of the adding devices to move them in the adding direction or against their stops, a set of number-indicating devices controlling the extent of movement of said operating means for adding purposes, whereby any number, represented by any number-indicating devices operated, may be added upon any set of adding devices or the total standing upon any set of adding devices may be added to the total standing upon another set.

331. The combination of a plurality of sets of adding devices, stops for each set to stop them, on reaching their zero position, when moving in the direction reverse to that of adding, but permitting free movement in the adding direction, operating means adapted to be connected with any set or sets of the adding devices to move them in the adding direction or against their stops, a set of number-indicating devices controlling the extent of movement of said operating means for adding purposes, and indicating means adapted to indicate any number added or any total standing upon any set of the adding devices, whereby any number, represented by any number-indicating devices operated, may be added upon any set of adding devices or the total standing upon any set of adding devices may be added to the total standing upon another set, and such number or the sum of any such totals will be indicated by the indicating means.

332. The combination of a plurality of sets of adding devices, stops for each set to stop them, on reaching their zero position, when moving in the direction reverse to that of adding, but permitting free movement in the adding direction, operating means adapted to be connected with any set or sets of adding devices to move them either in their adding direction or against their stops, a set of number-indicating devices controlling the extent of movement of said operating means for adding purposes, and indicating means adapted to indicate any number added or any total standing upon any set of the adding devices, whereby any number represented by any number-indicating devices operated may be added upon any set of the adding devices, or the total standing upon any set of the adding devices may be added to or subtracted from the total standing upon another set of adding devices and such number added upon any set of adding devices or the sum or difference of any totals standing upon the sets of adding devices may be indicated by the indicating means.

333. The combination of three sets of adding devices, stops for said devices to stop them, on arriving at the zero position, when moving in the direction reverse to that of adding, means for transferring to one of the sets the complement of the total standing upon another of the sets, means for adding to the said complementary total upon the first mentioned set the total standing upon the third set of adding devices, and means for obtaining the complement of the sum of such total whereby the difference may be taken between the totals standing upon two of such sets of adding devices.

334. The combination of three sets of adding devices, stops for said devices to stop them on arriving at the zero position, when moving in the direction reverse to that of adding, means for transferring to one of the sets the complement of the total standing upon another of the sets, means for adding to such complementary total upon the first mentioned set the total standing upon the third set of adding devices, a set numeral devices and means for transferring to said set the complement of the sum of the totals standing on said first mentioned set of adding devices, whereby the condition of said set of numeral devices will represent the difference between the totals upon the second and third sets of adding devices.

335. The combination of three sets of adding devices, stops for such devices to stop them and their operating means, on reaching their zero position, when moving in the direction reverse to that of adding, and common operating means adapted to be connected with one or with two of said sets to move said set or sets either in the adding direction or in the reverse direction, whereby the difference may be taken between the sum represented by the adding devices of one set and that represented by another set.

336. The combination of a plurality of sets of adding devices exceeding three sets in number, stops for such devices to stop them and their operating means, on reaching their zero position, when moving in the direction reverse to that of adding, and common operating means adapted to be connected with one or with two of said sets to move said set or sets either in the adding direction or in the reverse direction, whereby the difference may be taken between the sum of the adding devices of one set and that represented by adding devices of the other set.

337. The combination of three sets of adding devices, and key controlled means for transferring to one of the sets the complement of the total of another of the sets, for adding to such complementary total the total of the third set, and for transferring the complement of the sum of such totals, to obtain the difference between the totals of the second and third of said sets.

338. The combination of a minuend set of adding devices, a subtrahend set of adding devices, and a reversing set of adding devices, stops for each set of adding devices, adapted to stop them, when moving in the direction reverse to that of adding, when such devices arrive at the zero point, operating means, means for connecting the operating means with the reversing set to move them in the adding direction to the point opposite to or reverse of their zero position, means for then connecting the operating means also to the minuend set to move both the reversing set and the minuend set in the direction reverse to that of adding until the latter are stopped at their zero position, whereby the position of the adding devices of the reversing set will represent the complement of the minuend total, means for then connecting the operating means with the subtrahend set to move the latter in the direction reverse to that of adding until the latter are stopped at their zero position, means for then connecting the operating means also with the reversing set to move both the subtrahend and reversing sets in the adding direction until the subtrahend set reaches its set position to add the subtrahend total to the complementary total standing upon the reversing set, and means for connecting the operating means with the reversing set and also with one of the other sets while the latter is standing at the position opposite to or the reverse of the zero position, to move both of said sets in the reverse direction to that of adding until the reversing set is stopped at its zero position, whereby the position of the adding devices of the set thus connected with the reversing set will represent the difference between the totals originally standing upon the minuend and subtrahend sets.

339. The combination of three sets of adding devices, stops for such devices to stop them and their operating means on reaching their zero position, when moving in the direction reverse to that of adding, and common operating means adapted to be connected with one or with two of said sets to move said set or sets either in the adding direction or in the reverse direction, yielding means for moving said common operating means a prescribed distance in one direction unless sooner stopped, and means for positively returning said common operating means to their original position, whereby the difference may be taken between the sum represented by the adding devices of one set and that represented by the adding devices of another set.

340. The combination of three sets of adding devices, stops for such devices to stop them and their operating means, on reaching their zero position, when moving in the direction reverse to that of adding, and common operating means adapted to be connected with one or with two of said sets to move said set or sets either in the adding direction or in the reverse direction, yielding means for moving said common operating means a prescribed distance in the direction reverse to that of adding unless sooner stopped by said stops, and means for positively returning said common operating means in the adding direction to their original position, whereby the difference may be taken between the sum represented by the adding devices of one set and that represented by the adding devices of another set.

341. The combination of three sets of adding devices, stops for such devices to stop them and their operating means, on reaching their zero position, when moving in the direction reverse to that of adding, and common operating means adapted to be connected with one or with two of said sets to move said set or sets either in the adding direction or in the reverse direction, yielding means for moving said common operating means a prescribed distance in one direction unless sooner stopped, number-indicating devices adapted, when operated, to limit the movement of the corresponding yielding means in said direction, in accordance with the value of the number-indicating devices operated, and means for positively returning said common operating means to their original position, whereby any sum may be added upon any set or sets of the adding devices and whereby the difference may be taken between the sum represented by the adding devices of one set and that represented by the adding devices of another set.

342. The combination of three sets of adding devices, stops for such devices to stop them and their operating means, on reaching their zero position, when moving in the direction reverse to that of adding, and common operating means adapted to be connected with one or with two of said sets to move said set or sets either in the adding direction or in the reverse direction, means for moving said common operating means a prescribed distance in one direction unless sooner stopped, number-indicating devices adapted, when operated, to limit the movement of the corresponding means in said direction in accordance with the value of the number-indicating devices operated, and means for returning said common operating means to their original position, whereby any sum may be added upon any set or sets of the adding devices and whereby the difference may be taken between the sum represented by the adding devices of one set and that represented by the adding devices of another set.

343. The combination of three sets of adding devices, stops for such devices to stop them and their operating means, on reaching their zero position, when moving in the direction reverse to that of adding, and common operating means adapted to be connected with any one or with two of said sets to move said set or sets either in the adding direction or in the reverse direction, and locking devices for holding the adding devices of any set in any position to which they may be moved, whereby the difference may be taken between the sum represented by the adding devices of one set and that represented by the adding devices of another set.

344. The combination of three sets of adding devices, stops for such devices to stop them and their operating means, on reaching their zero position, when moving in the direction reverse to that of adding, and common operating means adapted to be connected with any one or with two of said sets to move said set or sets either in the adding direction or in the reverse direction, and number-indicating devices to control the movement of the adding devices in the adding direction, whereby any sum may be added upon any set or sets of the adding devices and, whereby the difference may be taken between the sum represented by the adding devices of one set and that represented by the adding devices of another set.

345. The combination of a set of adding devices, stops for such devices to stop them, on arriving at the zero point, when moving in the direction reverse to that of adding, a set of numeral devices, and common operating means adapted to connect the set of numeral devices, when in the position opposite to or the reverse of their zero position, with a set of adding devices, to move both sets in the direction reverse to that of adding until stopped by said stops, whereby the complement of the total of the set of adding devices will be represented upon the set of numeral devices.

346. The combination of a set of adding devices, stops for said devices to stop them, on arriving at the zero point, when moving in the direction reverse to that of adding, a set of numeral devices, operating means, means for connecting the operating means with either or both of said sets, to move either or both in the adding direction or the reverse direction, whereby the numeral devices may first be moved to the position opposite to or the reverse of their zero position and the two sets be then moved in the direction reverse to that of adding until stopped by said stops, whereby the complement of the total of the set of adding devices will be represented upon the set of numeral devices.

347. The combination of three sets of adding devices, stops for such devices to stop them and their operating means on reaching their zero position, when moving in the direction reverse to that of adding, and common operating means adapted to be connected with any one or with two of said sets to move said set or sets either in the adding direction or in the reverse direction, number indicating devices adapted, when operated, to limit the movement of the corresponding operating means in the adding direction, whereby any sum may be added upon any set or sets of the adding devices and, whereby the difference may be taken between the sum represented by the adding devices of one set and that represented by the adding devices of another set.

348. The combination of a plurality of adding devices exceeding two in number, stops for each set to stop them, on reaching their zero position, when moving in the direction reverse to that of adding, but permitting free movement in the adding direction, operating means adapted to be connected with any one or simultaneously with two of said sets to move said set or sets either in the adding direction or in the reverse direction until arrested, a set of number-indicating devices controlling the extent of movement of said operating means for adding purposes, whereby any sum may be added upon any set of the adding devices and the total standing upon any set may be added to or be subtracted from the total upon another set.

349. The combination of a plurality of sets of adding devices exceeding two in number, stops for each set to stop them, on reaching their zero position, when moving in the direction reverse to that of adding, but permitting free movement in the adding direction, operating means adapted to have a prescribed reciprocating movement when free to move and adapted to be connected with any one or simultaneously with two of said sets to move said set or sets either in the adding direction or in the reverse direction to the limit of its movement in such direction unless sooner arrested by said stops, a set of number-indicating devices controlling the extent of movement of said operating means for adding purposes, whereby any sum may be added upon any set of the adding devices and the total standing upon any set may be added upon or be subtracted from the total standing upon any other set.

350. The combination of a set of adding devices, stops for said devices to stop them and their operating means, on reaching their zero position, when moving in the direction reverse to that of adding, a second set of adding devices, operating means, and connections, adapted to be automatically operated, to connect the operating means with said sets of adding devices in such way as automatically to move the first set against their stops in the direction reverse to that of adding and to transmit this movement to the second set to add upon the latter, whereby the total represented by the first set of adding devices may be automatically added upon the second set of adding devices.

351. The combination of two sets of adding devices, stops for one set of such devices to stop them and the operating means when moving in the direction reverse to that of adding, operating means having a prescribed reciprocating movement, when free to move, connections adapted to be automatically operated, to connect the operating means first with one set of adding devices to move the latter against their stops in the direction reverse to that of adding and thereby to limit the initial movement of the operating means and then to connect the operating means with the other set of adding devices on the return movement of the operating means, whereby the total standing upon the first set of adding devices will be automatically added upon the second.

352. The combination of two sets of adding devices, stops for one set of such devices to stop them and the operating means, when moving in the direction reverse to that of adding, operating means having a prescribed reciprocating movement, when free to move, connections to connect the operating means first with one set of adding devices to move the latter against their stops in the reverse direction of that of adding and thereby to limit the initial movement of the operating means and then to connect the operating means with the other set of adding devices on the return movement of the operating means, whereby the total standing upon the first set of adding devices will be added upon the second set.

353. The combination of three sets of adding devices, stops for such devices to stop them and their operating means, on reaching their zero position, when moving in the direction reverse to that of adding, and common operating means adapted automatically to be connected with any one or with two of said sets to move said set or sets either in the adding direction or in the reverse direction, whereby the difference may be automatically taken between the sum represented by the adding devices of one set and that represented by the adding devices of another set.

354. The combination of three sets of adding devices, operating means, and connections, adapted to be automatically operated, to connect the said operating means with one or more of the said sets in such manner and predetermined order as to transfer to one of the sets of adding devices the complement of the total standing upon any one of said sets, to add to such complementary total upon the first mentioned set the total standing upon the third set of adding devices and then to obtain the complement of the sum of said totals, whereby the difference may be taken between the totals standing upon two of said sets of adding devices.

355. The combination of a plurality of sets of adding devices exceeding three in number, stops for said devices to stop them, on arriving at the zero point, when moving in the direction reverse to that of adding, and common operating means adapted to be connected with any one or with two of said sets to move said set or sets either in the adding direction or in the reverse direction, connections adapted to be operated to connect the said operating means with one or more of the said sets in such manner and predetermined order as to transfer the complement of the total standing upon one set to another of the sets, to add the total standing upon still another set to the complementary total thus transferred, and to transfer the complement of the sum of said totals to the fourth set, to obtain the difference between the totals standing respectively upon the first and third of said sets.

356. The combination of a plurality of sets of adding devices exceeding two in number, stops for such devices to stop them on arriving at the zero point, when moving in the direction reverse to that of adding, operating means, connections, adapted to be operated, to connect the said operating means with one or more of the said sets in such manner and predetermined order as to move one set to the position the reverse of their zero position and to move simultaneously said set and another set in the direction reverse to that of adding, until stopped by the stops of the latter set, whereby the complement of the total of the second set will be transferred to the first set; to move still another set in the direction reverse to that of adding until stopped by its stops and to move the first set an equal distance in the adding direction, whereby the total of the third set will be added to the complementary total of the first set; and to move another set to the position the reverse of their zero position, and to move simultaneously the said last mentioned set and the first set in the direction reverse to that of adding until stopped by the stops of the said first set, whereby, the complement of the sum of the totals on the first set will be transferred to the other set and will constitute the difference between the totals standing upon the second mentioned set and the third mentioned set.

357. The combination of a plurality of sets of adding devices exceeding two in number, stops for such devices to stop them, in arriving at the zero point, when moving in the direction reverse to that of adding, operating means, connections adapted to be operated, to connect the said operating means with one or more of the said sets in such manner and predetermined order as to move one set to the position the reverse of their zero position and to move simultaneously said set and another set in the direction reverse to that of adding until stopped by the stops of the latter set, whereby the complement of the total of the second set will be transferred to the first set; to move still another set in the direction reverse to that of adding until stopped by its stops and to move the first set an equal distance in the adding direction, whereby the total of the third set will be added to the complementary total on the first set; and to move another set to the position the reverse of their zero position and to move simultaneously the said last mentioned set and the first set in the direction reverse to that of adding until stopped by the said first set, whereby the complement of the sum of the totals on the first set will be transferred to the other set and will constitute the difference between the totals standing upon the second mentioned set and the third mentioned set.

358. The combination of common operating means adapted to have a prescribed reciprocating movement unless limited by the number-indicating devices or the stops, hereinafter mentioned, three sets of adding devices adapted to be connected, any one set or sets at a time, with the common operating means when moving in either direction, whereby any one or more of said sets may be moved the whole or a part of the prescribed distance traversed by the operating means and in either direction, stops for each set of adding devices for stopping such devices, on reaching the zero point, when moving in the direction reverse to that of adding, number indicating means adapted to limit the movement of the common operating means in one direction in accordance with the value of the devices operated, whereby a number may be added on any set of the adding devices, or totals upon the different sets may be added together or be subtracted one from another.

359. The combination of a common operating means adapted to have a prescribed reciprocating movement unless limited by the number-indicating devices or stops, hereinafter mentioned, three sets of adding devices adapted to be connected, any one set or sets at a time with the common operating means when moving in either direction, whereby any one or more of said sets may be moved the whole or a part of the prescribed distance traversed by the operating means and in either direction, stops for each set of adding devices for stopping such devices on reaching their zero point, when moving in the direction reverse to that of adding, number-indicating means adapted to limit the movement of the common operating means in one direction in accordance with the value of the devices operated, and means for automatically controlling the connections between the sets of adding devices and the common operating means, whereby numbers may be added upon any set of the adding devices and totals upon the sets of adding devices may be added together or be subtracted one from another or may be both added and subtracted in a predetermined order.

360. The combination of a common operating means adapted to have a prescribed reciprocating movement unless limited by the number-indicating devices or the stops hereinafter mentioned, three sets of adding devices adapted to be connected any one set or sets at a time with the common operating means when moved in either direction, whereby any one or more of said sets may be moved the whole or a part of the prescribed distance traversed by the operating means and in either direction, stops for each set of adding devices for stopping such devices on reaching their zero point, when moving in the direction reversed to that of adding, number-indicating means adapted to limit the movement of the common operating means in one direction in accordance with the value of the devices operating, and indicating means connected with the operating means whereby numbers may be added upon set or sets of the adding devices and be indicated, totals may be taken and indicated, totals of different sets be added together and the sum thereof be indicated, or totals be subtracted from one another and the difference be indicated.

361. The combination of a common operating means adapted to have a prescribed reciprocating movement unless limited by the number indicating devices or the stops hereinafter mentioned, three sets of adding devices adapted to be connected any one set or sets at a time with the common operating means when moved in either direction, whereby any one or more of said sets may be moved the whole or a part of the prescribed distance traversed by the operating means and in either direction, stops for each set of adding devices for stopping such devices on reaching their zero point, when moving in the direction reversed to that of adding, number indicating means adapted to limit the movement of the common operating means in one direction in accordance with the value of the devices operated, and indicating means connected with the operating means, whereby numbers may be added upon any of the sets of adding devices, totals be taken, totals be added from one set to another or be subtracted, or all of said operations be performed in a predetermined order and the results of the computations be indicated in the order in which they are taken.

362. The combination of a plurality of adding devices, key controlled means for taking the totals thereon, and controlling means for controlling the totaling means to take the totals in a predetermined order.

363. The combination of a plurality of adding devices, means for taking the totals thereon, means for adding the totals of different sets of the adding devices together and key controlling means for controlling the total taking and total adding means, to cause the taking of the totals and the adding of the totals to be done in a predetermined order.

364. The combination of a plurality of sets of adding devices exceeding two in number, means for taking the totals thereon, means for subtracting the total of one set from the total of another set, and key controlling means for controlling the total taking and the subtracting means, to cause the taking of totals, the subtracting and the taking of the total of the difference to be done in a prescribed order.

365. The combination of a plurality of sets of adding devices exceeding two in number, means for taking the totals thereon, means for adding the totals of different sets together, means for subtracting the total of one set from the total of another set, key controlling means for controlling the total taking means, the adding of totals, the subtracting of totals and the taking of the totals of the resultant sum and the difference, to cause such operations to be taken in a predetermined order.

366. The combination of a plurality of sets of adding devices exceeding two in number, means for taking the totals thereon, means for adding the totals of different sets together, means for subtracting the total of one set from the total of another set, key controlling means for controlling the total taking means, the adding of totals, the subtracting of totals, and the taking of the totals of the resultant sum and difference, to cause such operations to be taken in a predetermined order.

367. The combination of a set of numeral devices adapted to be held at the position the reverse of their zero position, a set of adding devices, stops for said adding devices, to stop them, on reaching their zero position, when moving in the direction the reverse of that of adding, common operating means adapted to be connected simultaneously with the numeral devices and the adding devices, to move both sets until stopped by the stops of the adding devices and to be then disconnected from the numeral devices, and locking means for locking the numeral devices when thus released, whereby the complement of the total standing on the set of adding devices may be transferred to the numeral devices.

368. The combination of a plurality of sets of adding devices, common key controlled operating means, means coöperating with said common operating means and the adding devices adapted, when made operative, to connect the operating means with any one or more of the said sets to move them either way for purposes of computation or indication.

369. The combination of a set of numeral devices adapted to be set at the position opposite their zero position, a set of adding devices, stops to stop said adding devices, on reaching their zero position, when moving in the direction reverse to that of adding, operating means adapted to be connected with both the numeral devices and the adding devices to move the latter against their stops, and means for controlling the connection between the operating means and the numeral and adding devices so that the numeral devices will be disconnected from the operating means in advance of the disconnection of the adding devices from such operating means.

370. The combination of a set of numeral devices adapted to be set at the position opposite their zero position, a set of adding devices, stops to stop said adding devices on reaching their zero position, when moving in the direction reverse to that of adding, operating means adapted to be connected with both the numeral devices and the adding devices to move the latter against their stops, and means automatically actuated for automatically controlling the connection between the operating means and the numeral and adding devices so that the numeral devices will be automatically disconnected from the operating means in advance of the disconnection of the adding devices with such operating means.

371. The combination of a set of numeral devices, a set of adding devices, stops to stop said adding devices, on reaching their zero position, when moving in the direction reverse to that of adding, operating means adapted to be connected with both the numeral devices and the adding devices to move the latter against their stops, and means for controlling the connection between the operating means and the numeral and adding devices so that the numeral devices will be disconnected from the operating means in advance of the disconnection of the adding devices from such operating means.

372. The combination of a plurality of sets of adding devices, upon which any desired amounts may be successively added, key controlled means for connecting the sets and means for operating such connecting means in such manner as to add together the totals of the sets thus connected.

373. The combination of a plurality of sets of adding devices, upon which any desired amounts may be successively added, and key controlled means for operating any of the sets either alone or together for purposes of computation or indication.

374. The combination of a plurality of sets of adding devices upon which any desired amounts may be successively added, key controlled common operating means, connections between said common operating means and each set of the adding devices adapted, when made operative, to connect the operating means with any one or more of the said sets to move them either way for purposes of computation or indication.

375. The combination of a plurality of sets of adding devices upon each of which any desired amounts may be successively added, a key controlled common operating means adapted to be connected with two of said sets to add upon either set the total standing upon the other set, whereby the total or totals standing upon one or more of said sets may be added upon any other of said sets.

376. The combination of two sets of adding devices, means for adding any desired amounts successively on said adding devices, means for transferring from one set to the other set, said means having a predetermined maximum range of movement, means for connecting the transferring means with one set of adding devices so that the extent of movement of the transferring means will be determined by the condition of said set of adding devices, and means for connecting the transferring means with the other set of adding devices so that the same extent of movement communicated to the transferring means from the first set will be transferred to the second set, whereby the total standing upon one set of said adding devices, or the complement thereof, may be transferred to the other set.

377. The combination of a plurality of sets of adding devices, key controlled stops for limiting their movements, and means for automatically throwing one or more of the sets into operative engagement with another of the sets.

378. In a machine of the class described, the combination of differentially reciprocatory racks; two sets of accumulating pinions independently engageable with and disengageable from said racks; plural means for engaging and disengaging the racks and pinions, said means severally adjustable to vary the periods of engagement and disengagement between racks and pinions; and means common to said plural means for changing the adjustment of either.

379. In a machine of the class described, the combination of differentially reciprocatory racks; two sets of accumulating pinions independently engageable with and disengageable from said racks; plural means for engaging and disengaging the racks and pinions, said means severally adjustable to vary the periods of engagement and disengagement between racks and pinions; and each means adjustable to disable it from engaging its set of pinions with the racks; and means common to said plural means for changing their adjustment.

380. In a machine of the class described, the combination of differentially reciprocatory racks; two sets of accumulating pinions independently engageable with and disengageable from said racks; plural means for engaging and disengaging the racks and pinions, said means severally adjustable to vary the periods of engagement and disengagement between racks and pinions and each means adjustable to disable it from engaging its set of pinions with the racks and one normally so disabled; and means for enabling that one to engage its pinions with the racks and disabling the other from engaging its pinions with the racks.

381. In a machine of the class described, the combination of differentially reciprocatory racks; two sets of accumulating pinions independently engageable with and disengageable from said racks; plural means for engaging and disengaging the racks and pinions, said means severally adjustable to vary the periods of engagement and disengagement between racks and pinions and each means adjustable to disable it from engaging its set of pinions with the racks and one normally so disabled; means for enabling that one to engage its pinions with the racks and disabling the other from engaging its pinions with the racks; and means common to the said plural means for changing the adjustment of either of the latter to vary the periods of engagement and disengagement of its pinions and the racks.

382. In a machine of the class described, the combination of differentially reciprocatory racks, two sets of accumulating pinions independently engageable with and disengageable from said racks; plural means for engaging and disengaging the racks and pinions, said means severally adjustable to vary the periods of engagement and disengagement between racks and pinions and each means adjustable to disable it from engaging its set of pinions with the racks and one normally so disabled; means for enabling that one to engage its pinions with the racks and disabling the other from engaging its pinions with the racks; means for disabling the last-mentioned element of means to permit pinion-engaging action of the normally disabled member of the plural means; and means common to the said plural means for changing the adjustment of either of the latter to vary the periods of engagement and disengagement of its pinions and the racks.

383. In a machine of the character described, the combination of two sets of adding wheels, reciprocatory combined type carriers and wheel actuators, means for effecting engagement and disengagement of the actuators and the wheels with provisions whereby one set of wheels is engaged with the actuators during their advance and the other set of wheels during their return, and means under control of such provisions for preventing advance of certain actuators.

384. In a machine of the character described, the combination of two sets of adding wheels, reciprocatory combined type carriers and wheel actuators, means for effecting engagement and disengagement of the actuators and the wheels; controlling devices for causing one set of wheels to engage the actuators during their advance and the other sets of wheels during their return: and an obstructing member controlled by said devices, said member adapted to prevent advance of certain actuators.

385. In a calculating machine, means for setting up a number to be multiplied, means for obtaining partial products of said number, a register for adding said partial products together, and means for making a record of the complete product and simultaneously clearing said register of its product and the multiplying device of its multiplicand.

386. In a calculating machine, the combination of a product totalizer, key controlled actuating devices therefor, and means positioned by said actuating devices to represent a multiplicand, said means in turn controlling said actuating devices in product-obtaining operations.

387. In a calculating machine, the combination of a product totalizer, key controlled actuating devices, means positioned by said actuating devices to represent a multiplicand, said means in turn controlling said actuating devices in product-obtaining operations, and key positioned stops for controlling the movement of said actuating devices.

388. In a calculating machine, the combination of actuating devices, key controlled setting up devices for controlling said actuating devices and which are normally disengaged from said actuating devices, and means for effecting an engagement between said actuating devices and said setting up devices, substantially as described.

389. In a calculating machine, the combination of actuating devices, setting up devices for controlling said actuating devices and a key for effecting engagement between said setting up devices and actuating devices, substantially as described.

390. In a calculating machine, the combination of actuating devices, setting up devices for controlling said actuating devices, a key for effecting an engagement between said devices, and register wheels for determining the movement of said actuating devices, substantially as described.

391. In a calculating machine, the combination of a totalizer, actuating devices therefor, key controlled setting up devices for controlling said actuating devices and which are positioned by said actuating devices, and means for restoring said setting-up devices.

392. In a calculating machine, the combination of a totalizer, actuating devices therefor, setting-up devices for controlling said actuating devices and which are positioned by said actuating devices, and a sweep arm for restoring said setting up devices.

393. In a calculating machine, the combination of a totalizer, actuating devices therefor, key controlled setting up devices for controlling the movement of said actuating devices, means for causing engagement between said setting up devices whereby the setting up devices are positioned by the actuating devices, and means for restoring all of said setting up devices to their normal or zero position.

394. In a calculating machine, the combination of a totalizer, key controlled actuating devices therefor, setting up devices for controlling the actuating devices and which are positioned by said actuating devices, mechanism for restoring the same to normal position, and means for rendering said restoring mechanism operative.

395. In a calculating machine, the combination of a totalizer, actuating devices therefor, setting up devices positioned by said actuating devices and which setting up devices control the movement of said actuating devices, mechanism for restoring the said setting up devices to normal position, and a key for rendering said restoring mechanism operative.

396. In a calculating machine, the combination of a product totalizer, actuating devices therefor, setting up devices for controlling said actuating devices and which are positioned by said actuating devices, a product key, and means whereby when said product key is operated to obtain a product said setting up devices are restored to normal position, substantially as described.

397. In a calculating machine, the combination with a plurality of shiftable adding totalizers, a product totalizer, actuating devices for said totalizers, setting up devices positioned by said actuating devices for controlling said actuating devices, tens and units partial product plates for coöperating with said setting up devices in multiplying operations, and means whereby in product-obtaining operations said setting up devices are restored to their normal positions and the product totalizer and multiplying mechanism stands clear at the end of the product-taking operation, substantially as described.

398. In a calculating machine, the combination of two sets of primary totalizer wheels, a single set of key controlled actuating devices therefor, means for selectively placing either set of totalizer wheels under control of said actuating devices, and means for placing both sets of totalizer wheels under control of said actuating devices whereby one of said totalizers may be used to accumulate sub-totals, and the other of said totalizers to accumulate a grand total.

399. In a calculating machine, the combination of two sets of primary totalizers, a single set of actuating devices, key controlled means for placing either set of totalizer wheels under control of said actuating devices, and means for placing one set of totalizer wheels under control of the other set of totalizer wheels, through the medium of said actuating devices, whereby numbers may be transferred from one set of totalizer wheels to the other set of totalizer wheels.

400. In a calculating machine, the combination of two sets of totalizer wheels, a single set of actuating devices coöperating therewith, key controlled means whereby either set may be placed under control of said actuating devices, and total-taking means for placing one set of totalizer wheels in control of said actuating devices and said other set of totalizer wheels, whereby, the totals yielded by the controlling set of totalizer wheels will be accumulated in the controlled set of totalizer wheels.

401. In a calculating machine, the combination of two sets of totalizer wheels, a single set of key controlled actuating devices therefor, means whereby numbers may be introduced separately or successively into either set of totalizer wheels at the will of the operator, and means for transferring numbers from one set of totalizer wheels to the other, and total-taking means for placing one set of totalizer wheels in control of said actuating devices and the other set of totalizer wheels.

402. In a calculating machine, the combination of a main shaft, key controlled actuating devices therefor, two independent totalizers, separate carrying devices therefor, and means for making either of said totalizers primary in character, and to the exclusion of the other, substantially as described.

403. In a calculating machine, the combination of a main shaft, key controlled actuating devices, two independent primary totalizers, separate carrying devices therefor, and means under control of the operator for placing either totalizer under control of said main shaft and said actuating devices, to the exclusion of the other.

404. In a calculating machine, the combination of a main shaft, actuating devices, two independently movable frames carrying one or more groups of totalizers designed to coöperate with said actuating devices and key controlled means for placing either frame under control of the main shaft and one of its groups of totalizers in or under control of said actuating devices, to the exclusion of said other totalizer.

405. In a calculating machine, the combination of a main shaft, a plurality of independent totalizers, all of which may be made primary at the will of the operator, key controlled means for bringing any of said totalizers under control of said main shaft whereby items may be successively introduced thereinto directly from the keyboard, and means for taking the totals of certain of said totalizers and introducing said totals into another totalizer.

406. In a calculating machine, the combination of a main shaft, a plurality of totalizers, key controlled means for bringing any one of said totalizers under control of said main shaft to the exclusion of the other totalizers, and means for taking the totals of such excluded totalizers and registering said totals in the totalizer acting in its primary capacity.

407. In a calculating machine, the combination of a main shaft, groups of totalizers, key controlled actuating devices, means for introducing items into each of said groups, means for obtaining the separate totals from each totalizer and means for obtaining the grand total of the totals of all of the totalizers.

408. In a calculating machine, the combination of a given number of totalizers, actuating devices, key controlled means for introducing items so that each of said totalizers will contain a total, means for obtaining the separate total from each totalizer, and means in control of one of the totalizers containing a separate total for accumulating the grand total of all the totals, including the one which it contains.

409. In a calculating machine, the combination of a main shaft, two independent frames carrying totalizers, one of said frames being normally under control of the main shaft, and a key for selectively placing the other frame under control of the main shaft.

410. In a calculating machine, the combination of a main shaft, two independently mounted groups of totalizers, one of said groups being normally under control of the main shaft, and a key for selectively placing the other group under the control of the main shaft.

411. In a calculating machine, the combination of a main shaft, a plurality of independent groups of totalizers, actuating devices, and a key for placing two of said groups of totalizers under control of the actuating devices at the same time for totalizing purposes.

412. In a calculating machine, the combination of a main shaft, a plurality of independently mounted groups of totalizers, actuating devices therefor, and keys for placing two of the said independently mounted groups of totalizers under control of said actuating devices for transferring a total from one to the other group and for combining their totals in one of the said two groups of totalizers.

413. In a calculating machine, the combination of a main shaft, two independent primary totalizers, key controlled actuating devices, and means under control of the operator for placing both of said totalizers under control of said actuating devices for transferring and totalizing purposes.

414. In a calculating machine, the combination of a main shaft, independent frames, groups of totalizers mounted therein, key controlled actuators, means for introducing items into each of the said groups of totalizers, and means for introducing the total in each independent group of totalizers into one of said groups of totalizers.

415. In a calculating machine, the combination of a main shaft, independent frames, groups of totalizers mounted therein, key controlled actuators therefor, means for introducing items into each of the said groups of totalizers and means for recording and introducing the total in each independent group of totalizers into one of the said independent groups of totalizers.

416. In a calculating machine, the combination of a main shaft, independently mounted groups of totalizers, key controlled actuators therefor, means for introducing items into each of said groups, means for recording the total in each group, and means for introducing the total in each group into another group as recorded.

417. In a calculating machine, the combination of a main shaft, independently mounted groups of totalizers, key controlled actuators therefor, a keyboard, means for introducing items successively into each group from the keyboard, means for recording the total in each separate group of totalizers, and means for combining the totals in all of the separate groups in one of the said groups as recorded, for a grand total.

418. In a calculating machine, the combination of a main shaft, independently mounted groups of totalizers, actuators therefor, a keyboard, means for introducing items into each of said groups, means for taking and recording the total in each group, and means totalizing the said separate totals as recorded.

419. In a stop mechanism for adding machines, a stationary group of stops, a plurality of push pins, means for moving the field of push pins into position adjacent the various stops, and means for projecting said push pins against the stops.

420. In a stop mechanism for adding machines, a stationary group of stops, a movable support, a plurality of stop-setting members carried by said support, means for moving said support to carry said members into and out of operative relation to the various stops, and means for actuating said stop-setting members.

421. In a calculating machine, the combination with actuating devices, of two independently operable groups of totalizer wheels in operative relation to said actuating devices, one of which is substantially fixed, and the other of which is laterally shiftable, so as to be displaced, with respect to said actuating devices, and carrying mechanism individual to said respective groups; substantially as described.

In testimony whereof I hereunto affix my signature, in the presence of two witnesses, this seventh day of April, 1906.

HUBERT HOPKINS.

Witnesses:
F. R. CORNWALL,
GEORGE BAKEWELL.